United States Patent
Braker et al.

(10) Patent No.: US 9,696,137 B2
(45) Date of Patent: Jul. 4, 2017

(54) MULTIPLE CHANNEL LOCATING

(71) Applicant: Cognex Corporation, Natick, MA (US)

(72) Inventors: Benjamin Braker, Louisville, CO (US); Eric Moore, Boulder, CO (US); Daniel Feldkhun, Boulder, CO (US)

(73) Assignee: COGNEX CORPORATION, Natick, MA (US)

( * ) Notice: Subject to any disclaimer, the term of this patent is extended or adjusted under 35 U.S.C. 154(b) by 220 days.

(21) Appl. No.: 14/455,039

(22) Filed: Aug. 8, 2014

(65) Prior Publication Data

US 2015/0077764 A1     Mar. 19, 2015

Related U.S. Application Data

(63) Continuation of application No. 13/961,397, filed on Aug. 7, 2013, now Pat. No. 8,836,921, which is a
(Continued)

(51) Int. Cl.
*G01B 11/00* (2006.01)
*G01B 11/25* (2006.01)
(Continued)

(52) U.S. Cl.
CPC ........ *G01B 11/005* (2013.01); *G01B 11/2518* (2013.01); *G01B 11/2527* (2013.01);
(Continued)

(58) Field of Classification Search
CPC .......... G01S 17/00; G01S 17/08; G01S 17/42; G01S 7/48; G01S 7/497; G01S 7/481
See application file for complete search history.

(56) References Cited

U.S. PATENT DOCUMENTS 4,687,326 A     8/1987 Corby
4,705,401 A     11/1987 Addleman
(Continued)

FOREIGN PATENT DOCUMENTS

WO     WO2007043036     4/2007

OTHER PUBLICATIONS

Anna, Tulsi, et al., "Sinusoidal Fringe Projection System Based on Compact and Non-Mechanical Scanning Low-Coherence Michelson Interferometer for Three-Dimensional Shape Measurement," Optics Communications 282; 1237-1242, 2008.11.080.
(Continued)

*Primary Examiner* — Luke Ratcliffe
(74) *Attorney, Agent, or Firm* — Wilson Patent Law, LLC

(57) ABSTRACT

Methods, systems, and apparatuses are provided for estimating a location on an object in a three-dimensional scene. Multiple radiation patterns are produced by spatially modulating each of multiple first radiations with a distinct combination of one or more modulating structures, each first radiation having at least one of a distinct radiation path, a distinct source, a distinct source spectrum, or a distinct source polarization with respect to the other first radiations. The location on the object is illuminated with a portion of each of two or more of the radiation patterns, the location producing multiple object radiations, each object radiation produced in response to one of the multiple radiation patterns. Multiple measured values are produced by detecting the object radiations from the location on the object due to each pattern separately using one or more detector elements. The location on the object is estimated based on the multiple measured values.

30 Claims, 15 Drawing Sheets

Related U.S. Application Data continuation of application No. 12/499,758, filed on Jul. 8, 2009, now Pat. No. 8,531,650.

(60) Provisional application No. 61/079,128, filed on Jul. 8, 2008.

(51) Int. Cl.

| | | |
|---|---|---|
| G01S 7/481 | (2006.01) | |
| G01S 7/484 | (2006.01) | |
| G01S 7/486 | (2006.01) | |
| G01S 7/499 | (2006.01) | |
| G01S 17/48 | (2006.01) | |
| G01S 17/89 | (2006.01) | |
| G01C 3/08 | (2006.01) | |

(52) U.S. Cl.
CPC ............ *G01B 11/2536* (2013.01); *G01C 3/08* (2013.01); *G01S 7/484* (2013.01); *G01S 7/486* (2013.01); *G01S 7/4815* (2013.01); *G01S 7/4818* (2013.01); *G01S 7/499* (2013.01); *G01S 17/48* (2013.01); *G01S 17/89* (2013.01)

(56) References Cited

U.S. PATENT DOCUMENTS

| | | | |
|---|---|---|---|
| 5,825,933 | A | 10/1998 | Hecht |
| 6,057,892 | A | 5/2000 | Borer |
| 6,076,738 | A | 6/2000 | Bloomberg |
| 6,341,016 | B1* | 1/2002 | Malione ............ G01B 11/2509 345/419 |
| 6,441,888 | B1* | 8/2002 | Azuma ................... G01S 7/481 348/131 |
| 6,751,344 | B1 | 6/2004 | Grumbine |
| 7,002,699 | B2 | 2/2006 | Kong |
| 7,013,040 | B2 | 3/2006 | Shiratani |
| 7,103,212 | B2 | 9/2006 | Hager |
| 7,164,789 | B2 | 1/2007 | Chen |
| 7,433,024 | B2 | 10/2008 | Garcia |
| 7,768,656 | B2 | 8/2010 | Lapa |
| 7,804,997 | B2 | 9/2010 | Geng |
| 8,050,461 | B2 | 11/2011 | Shpunt et al. |
| 8,090,194 | B2 | 1/2012 | Golrdon |
| 8,150,142 | B2 | 4/2012 | Freedman |
| 8,208,719 | B2 | 6/2012 | Gordon |
| 8,350,847 | B2 | 1/2013 | Shpunt |
| 8,384,997 | B2 | 2/2013 | Shpunt |
| 8,538,166 | B2 | 9/2013 | Gordon |
| 8,717,417 | B2 | 5/2014 | Sali |
| 8,749,796 | B2 | 6/2014 | Pesach |
| 8,786,682 | B2 | 7/2014 | Shpunt |
| 8,908,277 | B2 | 12/2014 | Pesach |
| 8,982,182 | B2 | 3/2015 | Shpunt |
| 9,066,087 | B2 | 6/2015 | Shpunt |
| 2007/0268398 | A1 | 11/2007 | Raskar |
| 2010/0020078 | A1* | 1/2010 | Shpunt .................. G01B 11/25 345/420 |
| 2010/0201811 | A1 | 8/2010 | Garcia |
| 2010/0225746 | A1 | 9/2010 | Shpunt |
| 2012/0063672 | A1 | 3/2012 | Gordon |
| 2013/0250066 | A1 | 9/2013 | Abraham |
| 2014/0022348 | A1 | 1/2014 | Shpunt |

OTHER PUBLICATIONS

Chang, Ming, et al., "High Speed Three-Dimensional Profilometry Utilizing Laser Diode Arrays," Optical Engineering, vol. 42 No. 12, pp. 3595-3599 (Dec. 2003).
Chen, Frank, et al., "Overview of Three-Dimensional Shape Measurement Using Optical Methods," Optical Engineering, vol. 39, No. 1, pp. 10-22 (Jan. 2000).
Coggrave, C. R., "High-speed Surface Profilometer Based on a Spatial Light Modulator and Pipeline Image Processor," Optical Engineering, vol. 38, No. 9, pp. 1573-1581 (Sep. 1999).
Geng, Jason, "Structured-light 3D surface Imaging: a Tutorial," Advances in Optics and Photonics vol. 3, 128-160 (2011).
Gorthi, Sai Siva, et al., "Fringe Projection Techniques: Whither we are?" Optics and Lasers in Engineering vol. 48, No. 2:133-140, 2010.
Huang, Peisen S., et al. "Color-Encoded Digital Fringe Projection Technique for High-Speed three-dimensional Surface Contouring," Optical Engineering vol. 38 No. 6, pp. 1065-1071 (Jun. 1999).
Huang, Peisen S., et al., "High-Speed 3-D Shape Measurement based on Digital Fringe Projection," Optical Engineenng vol. 42, No. 1, pp. 163-168 (Jan. 2003).
Huntley, J.M., et al., "Shape Measurement by Temporal Phase Unwrapping and Spatial Light Modulator-based Fringe Projector," SPIE vol. 3100; Sep. 25, 1997; 0277-786X.
Kinell Lars, "Multichannel Method for Absolute Shape Measurement Using Projected Fringes," Optics and Lasers Engineenng vol. 41 (2004) pp. 57-71.
Li, E. B., et al., "Multi-Frequency and Multiple Phase-Shift Sinusoidal Fringe Projection for 3D Profilometry," Optics Express vol. 13, No. 5, pp. 1561-1569; Mar. 7, 2005.
Liu, Kai, "Dual-Frequency Pattern Scheme for High-Speed 3-D Shape Measurement," Optics Express, vol. 18, No. 5, pp. 5229-5244, Mar. 1, 2010.
Mermelstein, Michael S., et al., "Video-rate Surface Profiling with Acousto-Optic Accordion Fringe interferometry," Optical Engineering vol. 39, No. 1, pp. 106-113, Jan. 2000.
Pan, Jiahul, et al., "Color Phase-Shifting Technique for three-Dimensional Shape Measurement," Optical Engineering vol. 45, No. 1, 013602, Jan. 2006.
Peng, Xiang, et al., "Three-Dimensional Vision with Dual Acousto-optic Deflection Encoding," Optics Letters, vol. 30, No. 15, pp. 1965-1967, Aug. 1, 2005.
Sainov, Ventseslav, et al., "Real Time Phase Stepping Pattern Projection Profilometry," Proc. of SPIE, vol. 6341, Sep. 15, 2006.
Salvi, Joaquim, et al., "Pattern Codification Strategies in Structured Light Systems," Pattern Recognition the Journal of the Pattern Recognition Society, vol. 37 (2004), pp. 827-849.
Skydan, Oleksandr, et al., "Technique for Phase Measurement and Surface Reconstruction by Use of Colored Structured Light," Applied Optics, vol. 41, No. 29, Oct. 10, 2002.
Stoykova, Elena, et al., "Pattern Projection with a Sinusoidal Phase Grating," Hindawi Publishing Corporation EURASIP Journal on Advances in Signal Processing, vol. 2009, article ID 351626, 10 pages, May 13, 2008.
Wang, Yongchang, et al., "Maximum SNR Pattern Strategy for Phase Shifting Methods in Structured light Illumination," Journal Optical Society of America, vol. 27, No. 9, pp. 1962-1971, Sep. 2010.
Yin, Xuebing, et al., "Acoustic Grating Fringe Projector for High-Speed and High-Precision three-Dimensional Shape Measurements," Applied Optics, vol. 46, No. 15, pp. 3046-3051, May 20, 2007.
Zhang Song, "Recent progresses on Real-Time 3D Shape Measurement Using Digital Fringe Projection Techniques," Journal Optics and Lasers in Engineering, Elsevier, 0143-8166, Mar. 8, 2009.
Kazovsky, L G., "Beam position estimation by means of detector arrays," Optical and Quantum Electronics, vol. 13, p. 201-208. (May 1981).
Guan, Chun, Laurence G. Hassebrook, Daniel L. Lau, Veeraganesh Yalla, "Near-infrared composite pattern projection for continuous motion hand—computer interaction," Journal of Visual Communication and Image Representation, vol. 18, Issue 2, Apr. 2007, pp. 141-150, ISSN 1047-3203, http://dx.doi.org/10.1016/j.ivcir.2006.11.006.
Schirripa-Spagnolo, Giuseppe and Dario Ambrosini, "Surface contouring by diffractive optical element-based fringe projection," Measurement Science and Technology 12, N6 (2001).
Guo, Hongwei, Mingyi Chen, and Peng Zheng, "Least-squares fitting of carrier phase distribution by using a rational function in fringe projection profilometry: erratum," Opt. Lett. 32, 487-487 (2007).

(56) References Cited

OTHER PUBLICATIONS

Su, Wei-Hung, Cho-Yo Kuo, Chun-Chieh Wang, and Chung-Fan Tu, "Projected fringe profilometry with multiple measurements to form an entire shape," Opt. Express 16, 4069-4077 (2008).
Harding, Kevin, "Challenges and opportunities for 3D optical metrology: what is needed today from an industry perspective," Proc. SPIE 7066, Two- and Three-Dimensional Methods for Inspection and Metrology VI, 70660F (Aug. 29, 2008).
Handley, John C., Edward R. Dougherty, Maximum-Likelihood Estimation for the Two-Dimensional Discrete Boolean Random Set and Function Models Using Multidimensional Linear Samples, Graphical Models and Image Processing, vol. 59, Issue 4, Jul. 1997, pp. 221-231, ISSN 1077-3169, http://dx.doi.org/10.1006/gmip.1997.0432.
Wyant, J. "Computerized interferometric surface measurements [Invited]," Appl. Opt. 52, 1-8 (2013).

* cited by examiner

MULTIPLE CHANNEL LOCATING

CROSS-REFERENCES TO RELATED APPLICATIONS

This application is a continuation of pending U.S. patent application Ser. No. 13/961,397, filed Aug. 7, 2013, entitled "Multiple Channel Locating," which is a continuation of U.S. patent application Ser. No. 12/499,758, filed Jul. 8, 2009, entitled "Multiple Channel Locating," which is a non-provisional of, and claims the benefit of, U.S. Provisional Patent Application Ser. No. 61/079,128 entitled "Single-Shot Range Imagining System and Method and Non-Periodic Radiation Pattern Generation System and Method," filed Jul. 8, 2008, the entire disclosures of which are incorporated herein by reference for all purposes.

BACKGROUND

The present invention relates to apparatuses, systems, and methods for determining the three-dimensional location of one or more locations on the surface of an object. More specifically, the present invention relates to methods, systems, and apparatuses involving non-contact three-dimensional location estimating using multiple-channel pattern projection and multiple-channel image recording architectures.

Measurement of three-dimensional object surfaces may be needed for a number of applications, including quality insurance for manufacturing, reverse engineering, as-built documentation, facial recognition, machine vision, and medical applications. For many applications, it may be necessary or desirable to measure three-dimensional object profiles without making physical contact with the object under test. One approach to wide-field non-contact three-dimensional surface measurement is stereo vision, whereby a scene or object may be imaged from two or more points of view. With calibrated imagers, it may be possible to triangulate quantitative three-dimensional data describing the scene provided correspondences can be identified between the images. Such correspondences may include singular points, such as corners, or other distinguishable characteristics such as surface texture. For many objects and scenes, however, identifying correspondences may be a significant problem that may impede the use of stereo vision approaches for quantitative three-dimensional measurements. Also, because the quality of the three-dimensional reconstruction depends on recognition of correspondences, stereo vision systems may not provide a guaranteed level of accuracy or resolution that is independent of the scene being imaged.

On the other hand, some wide-field structured illumination approaches to three-dimensional surface measurement solve the correspondence problem by employing a projector capable of illuminating the object with patterned light. These wide-field pattern projection techniques are typically much faster than time-of-flight and laser spot scanning or line scanning approaches. In wide-field active illumination systems, the three-dimensional information describing the surface shape of the object may be encoded in the deformation of the illumination pattern as seen by an imaging camera offset from the projector. Some techniques may solve the correspondence problem by encoding the local angle of the projected illumination at each object location imaged by the camera using one or more patterns and then decoding the projection angles from the intensity data recorded by the camera. These projection angles may then be used, together with the known camera and pattern projector positions and orientations, to reconstruct the surface of the object by triangulation. For robust surface reconstruction, the pattern encoding may need to be faithfully decoded at each imaged location in the presence of optical noise, electronic noise, pattern distortion, object reflectivity and texture variations, illumination and lighting variations, discontinuities and shadowing on the object surface, and other potential sources of error. Robust encoding and decoding of the illumination angle for a wide range of objects and scenes is one of the foremost challenges in the field of three-dimensional surface measurement and profilometry.

The wide variety of wide-field structured illumination three-dimensional surface measurement techniques may be broadly categorized based on the dependence of successful pattern decoding at a given location on the object on the measured values of neighboring locations on the object. Location-dependent, (sometimes referred to as pixel-dependent) algorithms may require a neighborhood of locations to be measured to decode the projection angle and estimate the coordinates at a single location, while location-independent (sometimes referred to as pixel-independent) algorithms may determine the coordinates of each location independently from other locations. While some pixel-dependent approaches may require that the object surface is evenly illuminated, has uniform reflectivity, and contains no abrupt discontinuities due to holes, steps, spikes or shadowed regions, one of the most significant strengths of pixel-independent algorithms is that they may not need to make assumptions about the structure or reflectivity of the object, or about ambient lighting.

Some pixel-independent techniques may use direct encoding of the illumination angle at each location using variations in intensity or variations in wavelength across the illumination pattern, as in the multi-color technique that may be described in U.S. Pat. No. 6,937,348, incorporated herein by reference. Direct encoding techniques, however, may be very sensitive to optical and electronic noise, ambient lighting, detector linearity, as well as object texture, reflectivity and/or coloration. Alternatively (see, for example, Huntley and Saldner, Applied Optics, Vol. 32, 3047-3052, 1993, incorporated herein by reference), pixel-independent temporal phase unwrapping techniques may encode the projection angle in the phases and/or frequencies of time-varying sinusoidal patterns. Such approaches typically rely on projecting moving patterns or multiple stationary patterns and generally require multiple images to be acquired to reconstruct a three-dimensional surface. Some pixel-dependent approaches, such as the sinusoidal fringe phase-shifting method that may be described in U.S. Pat. No. 4,499,492, incorporated herein by reference, may also rely on multiple patterns and images.

Because temporal phase unwrapping approaches may need to project multiple patterns and/or acquire multiple images they may not be suitable for three-dimensional imaging of moving objects or stationary objects in a vibration-prone environment, since object motion relative to the illumination and/or the camera between the projection of successive patterns and acquisition of the corresponding images may corrupt the three-dimensional reconstruction. Furthermore, temporal phase unwrapping techniques may not be suitable for capturing three-dimensional measurements of high-speed single-shot events such as impacts, explosions, and momentary facial expressions that may occur much faster than multiple frames can be acquired. While direct encoding and pixel-dependent techniques may have the potential for high-speed surface profiling, they suffer from object-dependent, lighting-dependent and detector-dependent limitations as described above, and even the highest speed systems typically rely on pattern projection technology based on consumer electronics, such as liquid crystal and digital micromirror projectors, which may limit surface shape measurement speeds to approximately 60 frames per second (see S. Zhang, Optics and Lasers in Engineering, in press, doi:10.10.16/j.optlaseng.2009.03.008, incorporated herein by reference).

One impediment for high-speed pixel-independent three-dimensional shape measurement has been the projection technology. Approaches have utilized a projection paradigm wherein a single, reconfigurable projection channel is used to sequentially project multiple patterns. Such single channel projection techniques include projectors based on interferometers, as may be described in U.S. Pat. No. 6,690,474, incorporated herein by reference; liquid crystal spatial light modulators, as may be described in U.S. Pat. No. 6,208,416, incorporated herein by reference; and digital micromirror devices (see, for example, S. Huang et al., Opt. Eng. Vol. 42:1, 163-168, 2003, incorporated herein by reference). In these approaches, the sequential projection of multiple patterns may limit the speed at which a three-dimensional image can be acquired. On the other hand, a single-channel pattern projection technique using an acousto-optic device (see Mermelstein et al., Optical Engineering Vol. 39, 106-113, 2000, incorporated herein by reference) may be leveraged to project patterns at much faster rates. The speed of this technique, however, may be limited by the speed of acquiring multiple image frames. Although the shift from projection-limited to imaging-limited shape measurement speed is significant, when used with typical commercial cameras, this technique may not offer a large speed advantage over systems based on high-speed pattern projectors.

As a step towards parallelizing high-speed three-dimensional shape measurement, U.S. Pat. No. 6,788,210, incorporated herein by reference, may disclose a method for multiple simultaneous pattern projection and image acquisition using color multiplexing using the red, green, and blue (RGB) pixels of color video projectors and color cameras. Although three frames are typically not sufficient for pixel-independent three-dimensional shape measurement techniques, such RGB multiplexing may be used to implement a pixel-dependent phase-shift method and spatial phase unwrapping using a single frame. RGB multiplexing may also be used to reduce the number of image acquisitions in temporal phase unwrapping three-dimensional shape measurement techniques (see Kinell, Optics and Lasers in Engineering, Vol. 41, 57-71, 2004, incorporated herein by reference). However, the use of RGB pixels may be problematic for imaging of color objects. Furthermore, the use of standard RGB cameras rather than a custom-designed optical multiplexing system may provide only a limited improvement in image acquisition speed, may lead to problems with crosstalk among the channels, and may suffer from detection sensitivity imbalance among the RGB pixels. Moreover, because digital micromirror device (DMD) projectors typically used with RGB-multiplexed imagers generally utilize a single broadband source, a single modulating DMD device, and a spinning color filter wheel to produce patterns with different colors sequentially, the pattern projector may be a fundamentally a single-channel device rather than a parallel optical system and may limit the three-dimensional surface measurement speed regardless of parallelism in the imaging device.

While pixel-independent wide-field three-dimensional surface shape measurement systems may be more robust to variations in object structure and lighting conditions than stereo vision systems, they typically rely on bulky pattern projection systems using high-power illumination sources. On the other hand, emerging portable mobile electronic devices, such as telephones, laptops, PDA's, gaming systems, photographic and video cameras increasingly incorporate powerful processors, displays, and miniature integrated imaging devices and may become the platforms of choice for consumer three-dimensional imaging and object tracking applications that may stand to benefit from the strengths of wide-field structured illumination techniques over stereo vision. However, mobile three-dimensional imaging platforms using active illumination may not only require miniature low-power pattern projectors and cameras, but may also benefit from fast power-efficient data processing algorithms and high-speed pattern projection and data acquisition capabilities to avoid reconstruction artifacts due to object motion and mobile device vibration.

There is thus a need for tools and techniques that can provide robust high-speed, wide-field measurements of the shape of surfaces of three-dimensional objects and scenes for a wide range of objects and under a wide range of lighting conditions. There is also a need for tools and techniques that can measure shapes of surfaces of rapidly moving objects, including single-shot events, and can operate in vibration prone environments. To attain sufficient measurement speeds, such tools and techniques may need to parallelize the processes of pattern projection and image acquisition, instead of using a single sequential reconfigurable pattern generation device and a single sequential imaging system. There is also a need for robust methods and algorithms for measuring locations in a three-dimensional scene and reconstructing the shape of surfaces of three-dimensional objects in presence of optical noise, electronic noise, pattern distortion, object reflectivity and texture variations, illumination and lighting variations, discontinuities and shadowing on the object surface, and other potential sources of error. Furthermore, there is a need for high-speed, miniature, low-power active illumination three-dimensional imaging systems that may be integrated into mobile electronic devices for consumer applications and other three-dimensional surface shape measurement applications including robotics.

BRIEF SUMMARY

Certain embodiments of the inventions thus provide multiple channel locating tools and techniques that may address these needs. Some embodiments provide systems and methods for location-independent measurement of object surfaces and locations that may be robust to sources of error such as object discontinuities, surface properties including texture, reflectivity and coloration, lighting conditions, and noise propagation and may take advantage of multiple-channel pattern projection and imaging architectures. Some embodiments also provide multiple-channel locating systems that parallelize pattern projection and image acquisition using time, spectrum and/or polarization multiplexing and may attain higher three-dimensional measurement speeds than may be possible with conventional single-channel techniques that may rely on existing sequential pattern projection and image acquisition technology. Some embodiments may also enable three-dimensional surface shape measurement in high-speed single-shot events. Furthermore, some embodiments may provide compact, high-speed, low-power multiple-channel pattern projection and imaging systems that may be manufactured at low cost and may be integrated into mobile electronic devices for consumer applications and other three-dimensional surface shape measurement applications including robotics.

Some embodiments provide methods for estimating a location on an object in a three-dimensional scene. Multiple radiation patterns may be produced by spatially modulating each of a plurality of first radiations with a distinct combination of one or more modulating structures, each of the first radiations having at least one of a distinct radiation path, a distinct source, a distinct source spectrum, or a distinct source polarization with respect to the other first radiations. The location on the object may be illuminated with a portion of each of two or more of the multiple radiation patterns, the location producing multiple object radiations, each object radiation produced in response to one of the multiple radiation patterns. Multiple measured values may be produced by detecting the object radiations from the location on the object due to each pattern separately using one or more detector elements. The location on the object may be estimated based on the multiple measured values.

Some embodiments provide other methods for estimating a location on an object in a three-dimensional scene. The methods may include producing multiple radiation patterns, at least one of the patterns varying substantially continuously, substantially non-periodically, and substantially non-monotonically along one or more directions. The location on the object may be illuminated with a portion of each of two or more of the radiation patterns, the illumination being substantially distinct with respect to other locations on the object lying along said one or more directions from said location, and the location producing multiple object radiations, each object radiation produced in response to one of the multiple radiation patterns. Multiple measured values may be produced by detecting the radiation from the location on the object due to each pattern separately using one or more detector elements. The location on the object may be estimated based on the multiple measured values.

In some embodiments, two or more of the patterns are produced by shifting a first pattern along one or more directions of pattern variation. The first pattern may have a spatially varying period along the shifting direction that is substantially orthogonal to an illumination axis, the two or more shifted patterns may be directed at the object substantially along the illumination axis, and estimating the location on the object may include estimating a periodic function from the plurality of measured values; estimating with coarse angular resolution, using a period of the periodic function, an illumination angle between the illumination axis and a direction from a known location on the illumination axis to the location on the object geometrically projected onto an illumination plane, the illumination plane including the direction of the pattern variation of the first pattern and the illumination axis; estimating with fine angular resolution the illumination angle using a phase of the periodic function, the fine resolution estimate having an ambiguous angular offset; and resolving the ambiguous angular offset using the coarse angular resolution estimate. In some embodiments, the one or more detector elements detect radiation from the object directed substantially along an imaging axis, and estimating the location on the object may further include estimating a locating direction from a known location on the imaging axis to the location on the object using a known location of the one or more detector elements and estimating the location on the object from the estimated illumination angle, the estimated locating direction, and the known locations on the illumination and imaging axes by triangulation. In some embodiments, at least one of the radiation patterns varies along a plurality of directions. In some embodiments, at least two of the multiple patterns illuminate the location on the object from substantially different directions, the illumination being substantially distinct with respect to other locations on the object lying along the one or more directions of pattern variation from said location. In some embodiments, estimating the location on the object includes using a lookup table.

Some embodiments provide systems for estimating a distance to a location on an object in a three-dimensional scene. The systems may include one or more radiation sources for generating multiple first radiations, each of the first radiations having at least one of a distinct radiation source, a distinct radiation path, distinct source spectrum, or a distinct source polarization with respect to the other first radiations. Multiple modulating structures for spatially modulating the multiple first radiations may be provided, wherein each of the first radiations is modulated by a distinct combination of one or more of the modulating structures, producing multiple radiation patterns and the location on the object being illuminated with a portion of each of two or more of the radiation patterns, the location producing a plurality of object radiations, each object radiation produced in response to one of the multiple radiation patterns. The systems also may include one or more detector elements for detecting object radiations from the location on the object and producing multiple measured values. The systems also may include a processor in communication with the one or more detector elements, the processor estimating the location on the object based on the multiple measured values.

In some embodiments, systems for estimating a distance to a location on an object in a three-dimensional scene may include an integrated three-dimensional sensing system embedded in a mobile electronic device, wherein the integrated three-dimensional sensing system includes the one or more radiation sources, the plurality of modulating structures, and the one or more detector elements In some embodiments, the mobile electronic device include a mobile telephone, a laptop computer, a personal digital assistant, a portable gaming system, a photographic camera, and/or a video camera. In some embodiments, the processor further estimates a three-dimensional surface of the object from based on multiple locations. Some embodiments may include one or more displays for displaying the three-dimensional surface. Some embodiments may include two or more multiple-channel pattern projectors embedded at separate locations on the mobile electronic device. Some embodiments may include two or more multiple-channel imagers embedded at separate locations on the mobile electronic device, the two or more embedded multiple-channel imagers including the one or more detectors. In some embodiments, the one or more processors estimates the location on the object using a lookup table.

Some embodiments provide systems for estimating a distance to a location on an object in a three-dimensional scene. The systems may include means for generating multiple first radiations, each of the first radiations having at least one of a distinct source, a distinct radiation path, distinct source spectrum, or a distinct source polarization. The systems may include means for producing multiple radiation patterns that includes multiple modulating structures, where each of the first radiations is modulated by a distinct combination of one or more of the modulating structures. The systems may include means for illuminating the location on the object with two or more of the multiple radiation patterns, the location producing a plurality of object radiations, each object radiation produced in response to one of the multiple radiation patterns. The systems may include means for detecting radiations from the location on the object and producing multiple measured values. The systems may include means for estimating the location on the object based on the multiple measured values.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a hyphen and a second label or third label that distinguishes among the similar components. The second or third label may also be used merely to distinguish components that are part of different figures. If the first reference label is used in the specification, the description is applicable to any one of the similar components having the same first reference label irrespective of the second reference or third labels.

DETAILED DESCRIPTION

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
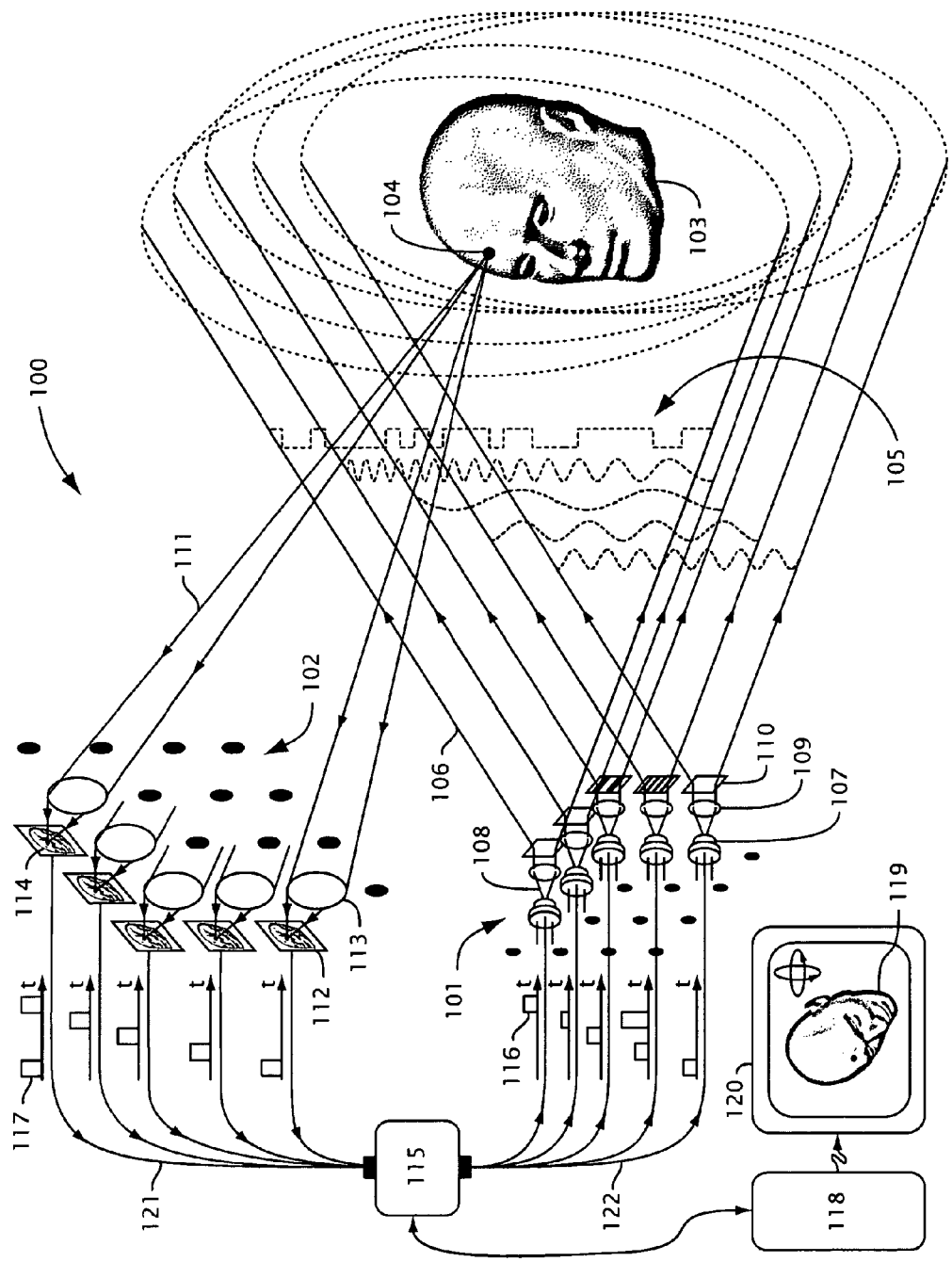
FIG. 1 illustrates a time-multiplexed multiple-channel locating system, in accordance with various embodiments.

FIG. 1 illustrates a time-multiplexed multiple-channel locating system 100 in accordance with various embodiments. In system 100, an object 103 that may be in a three-dimensional scene may be illuminated with a rapid sequence of patterns 105 generated using a multiple-channel pattern projector 101. The pattern projector 101 may comprise multiple radiation sources 107 producing first radiations 108, which may be collimated using lenses 109 and multiple modulating structures 110 modulating the first radiations 108 to produce the patterns 105. FIG. 1 shows five radiation sources 107, five first radiations 108, five lenses 109, and five modulating structures 110, however, other embodiments, may include more or less of these elements or aspects. Radiations 111 from a location 104 on the object 103 in response to the illumination 106 may be detected using a multiple-channel imaging system 102. The imaging system may include imaging lenses 113 that may produce images 114 of the object 103 on multiple detector arrays 112, which may integrate the images sequentially. A controller 115 may coordinate the timing 116 of the radiation sources and the timing 117 of the detector arrays and may be in communication with and pass image data from the detector arrays 112 to a processor 118. FIG. 1 shows five imaging lenses 113, five images 114, five detector arrays 112, five sources timings 116, and five detector timings 117, however, other embodiments may include more or less of these elements or aspects. Provided the image data 121, the projected patterns 105 and the locations and orientations of the multiple-channel pattern projector 101 and the multiple-channel imaging system 102, the processor may estimate the location 104 on the object 103 in the three-dimensional scene. By estimating additional locations on the object either in parallel or in sequence, the processor 118 may produce a three-dimensional representation 119 of the object on a display 120.

In some embodiments, each channel of the multiple-channel pattern projector 101 may comprise a separate radiation source 107 and a separate modulating structure 110 spatially modulating the collimated first radiation 108 to produce a radiation pattern. Additionally, a separate lens 109 may be included in the channel to substantially collimate the first radiation. The radiation sources may include, but are not limited to, laser diodes, light emitting diodes (LEDs), and/or may be derived from a single source, such as a fiber laser. The modulating structures may modulate the amplitude, phase, and/or polarization of the first radiation, may be continuous or may contain discrete features and may include diffractive optical elements such as gratings, Fresnel lenses, and/or holograms, which may be optically written and/or computer-generated. Furthermore, the modulating structures may comprise multiple layers. Merely by way of example, one layer may comprise a pattern mask, while a second layer may include as a Fresnel lens projecting the pattern onto the object. Each sequential pattern illuminating the object may be generated by one or more channels by activating multiple radiation sources simultaneously using the controller 115 as illustrated in the timing plots 116. Moreover, the relative strength of the illuminations produced by each channel may be varied by controlling the amplitude of each source via control signals 122. The pattern projector channels may be elements of an integrated compact multiple-layer array structure, which merely by way of example may comprise a layer of radiation sources, such as a vertical cavity surface emitting laser (VCSEL) array, a microlens array layer, and/or a diffractive element array layer.

In some embodiments, each channel of the multiple-channel imaging system 102 may comprise a separate detector array 112 and an imaging lens 113 producing an image of the object on the detector array. The image data 121 captured by each detector array may include a view 114 of the object from nearly the same perspective and may be registered with respect to each other by the processor 118, as in the system of FIG. 6 discussed below for example, to produce a record of sequential measurement values of the object radiations 111 for each location 104 on the object illuminated by the patterns 105. The detector arrays 112 may include, but are not limited to, charge coupled devices (CCDs), complementary metal-oxide-semiconductor (CMOS) imagers, bolometers, arrays of photodiodes, and/or other radiation sensing devices. Each imaging detector array may record the object radiations at a different time in synchrony with pattern projection timing resulting in an image of a different pattern on each detector array. In some embodiments, however, multiple detector arrays may integrate the object radiations simultaneously, as illustrated in the timing plots 117, since imaging of the same pattern from slightly different viewpoints may be useful in calibrating of the system 100 and/or achieving improved location estimation accuracy. The duration and starting time of the integration of each detector may be coordinated by a controller 115 and may be effected by using an external device such as a liquid crystal (LC) shutter, and electro-optic shutter, or by using the electronic shuttering capability of each detector array, such as a CCD, which may allow integration times as short as a few microseconds or even shorter. If external shutters are used, the detector arrays may comprise different regions of a larger single detector array.

It should be apparent to those skilled in the art that FIG. 1 represents just one of many possible embodiments of the invention. The modulating structures 110 may be transmissive or reflective, my be variable in time and may include reconfigurable devices such as a liquid crystal (LC) array or a digital micro-mirror device (DMD) array. In the case of a multiple-layer modulating structure, for example, one of the layers may comprise an LC array, whereas the other layer may include a Fresnel lens. The lenses 109 and 113 in the pattern projection and imaging systems 101 and 102 respectively are illustrated merely by a way of an example and may represent other optical systems, which may include but are not limited to lenses, mirrors, prisms, beam splitters, gratings, gradient index lenses, diffractive lenses, or waveguides. The first radiations may be only substantially collimated, may be diverging, or may be converging. Furthermore, the projector optical system 101 for each channel may include collimating optics as well as projection optics placed after the diffractive element. Alternatively, a single shared projection optical system, such as a lens, may be used to project radiation from each modulating structure 110 onto the object 103. The detector arrays 112 may be located in a Fourier plane of the imaging optics rather than in the image plane, or in any other location allowing images of the object to be computed.

The pattern projection timing 116 and/or image recording timing 117 may be synchronized with periodic changes in the object and/or the scene including object motion as well as changes in orientation, scaling, lighting, or the object's response to the illumination. The object may be macroscopic or microscopic. Merely by way of example, patterns generated using multiple channels 101 may be projected onto a microscopic object 103 using a microscope objective and object radiations 111 may be directed towards the detection system 102 using the same or a different microscope objective. The first radiations 108 may be visible and/or invisible, particulate and/or wavelike, polarized or unpolarized, may be temporally and/or spatially coherent, as in the case of laser radiation, may be partially coherent, as in the case of radiation from an LED or an incandescent source, and/or may have spectral distributions.

The multiple-channel locating system 100 may comprise multiple imaging systems as illustrated for example in FIG. 2 below to improve locating accuracy and avoid or reduce shadowing of regions on the object by other features of the object which may be inherent in single-perspective systems. To attain the same goals, the system 100 may instead include multiple time-multiplexed pattern projectors and a single time-multiplexed imaging system, as illustrated for example in the system of FIG. 3 below, or a combination of multiple time-multiplexed pattern projectors and multiple time-multiplexed imaging systems as in the system of FIG. 4 below for example. Furthermore, the object may be only partially illuminated by the patterns and some patterns may illuminate different portions of the object from other patterns.

The time-multiplexed multiple-channel locating system 100 may make it possible to project multiple patterns and to acquire the resulting images very rapidly, potentially in a matter of microseconds or faster compared to systems that rely on a single reconfigurable element to project multiple patterns and a single detector array to capture multiple images, This makes it possible to capture a rapidly moving or changing object or scene in three-dimensions. The image data may be processed to estimate each object location independently from other object locations in parallel to provide a three-dimensional representation of the object using algorithms such as those described FIG. 6, FIG. 9, FIG. 10 and FIG. 11 below. Moreover, one or more of the processing steps may be pre-computed for a variety of measurement values and stored in a lookup table, which may be rapidly accessed to estimate object locations 104 as they are being measured, making possible real-time three-dimensional locating and object surface measurement. Furthermore, the multiple-channel pattern projector 101 and imaging system 102 may be manufactured inexpensively as compact multiple-layer arrays of radiation sources 107, modulation structures 110, imaging devices 112, and other optical elements, 109, 113 that may consume little space and power and may be integrated into mobile electronic devices such as a mobile telephone, which may also comprise a processor 118 and a display device 120.

Figure 2:
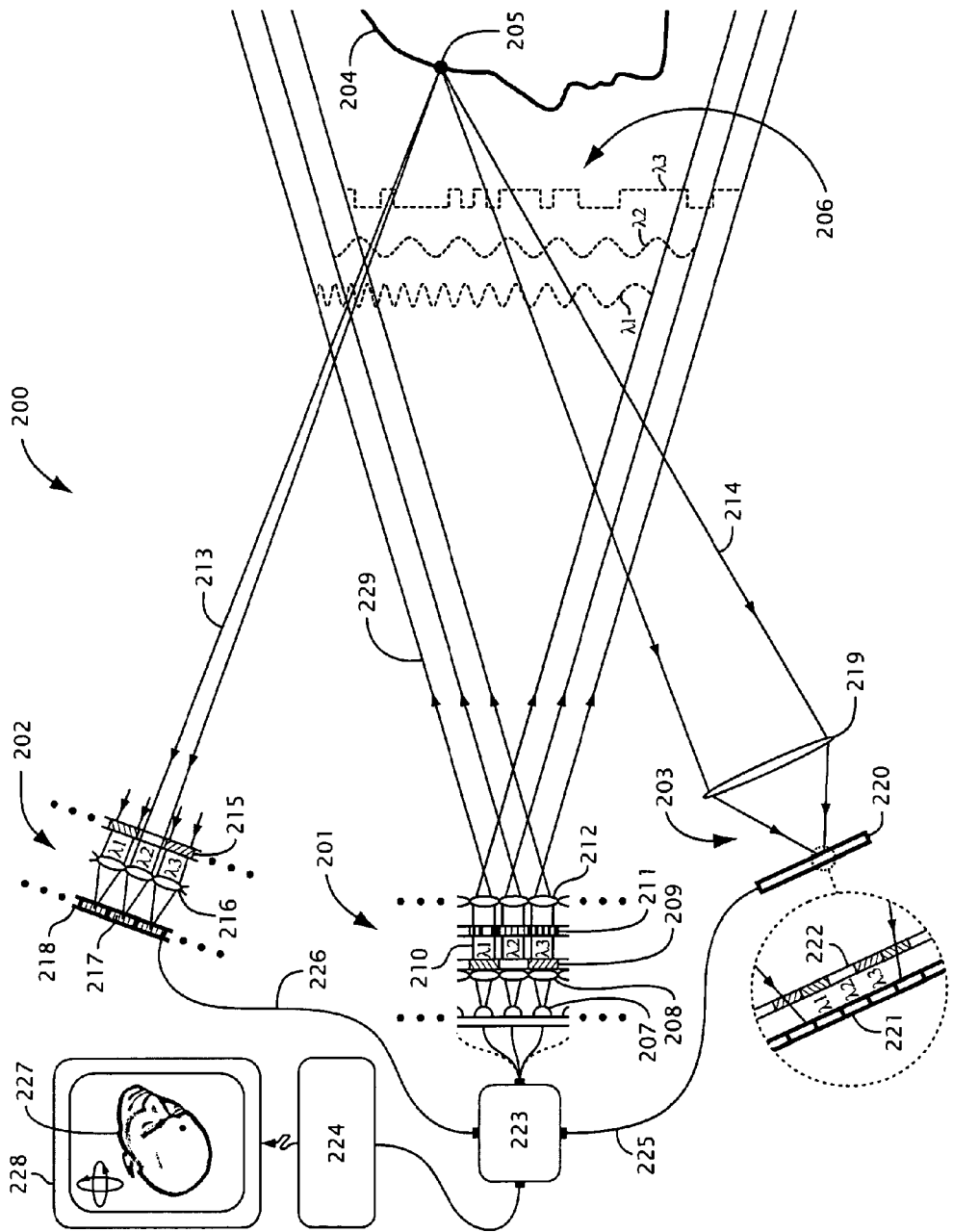
FIG. 2 illustrates a spectrum-multiplexed multiple-channel locating system, in accordance with various embodiments.

FIG. 2 illustrates a spectrum-multiplexed multiple-channel locating system 200 in accordance with various embodiments. In system 200, an object 204 that may be in a three-dimensional scene may be illuminated with multiple patterns 206 having different spectra generated using a multiple-channel pattern projector 201. The pattern projector 201 may comprise multiple broadband radiation sources 207 that may be substantially collimated using collimating lenses 208 and filtered using spectral filters 209 to produce first radiations 210 that may have different spectra. The pattern projector 201 may also comprise multiple modulating structures 211 modulating the first radiations 210 to produce the patterns 206, which may be projected onto the object 204 using projecting lenses 212. Object radiations 213 and 214 from a location 205 on the object 204 in response to the illumination 229 may be detected using one or more multiple-channel imaging systems such as 202 and 203. One imaging system 202 may include spectral filters 215 and imaging lenses 216 that may produce images with different spectra of the location 205 on different regions 217 of a single detector array 218. Another imaging system 203 may include a single imaging lens 219 that may produce an image of the location 205 on a multi-color detector array 220 comprising groups of pixels 221 with different spectral filters 222. A controller 223 may be in communication with and pass image data from the detector arrays 218 and 220 to a processor 224. Provided the image data 225 and 226, the projected patterns 206 and the locations and orientations of the multiple-channel pattern projector 201 and the multiple-channel imaging systems 202 and 203, the processor may estimate the location 205 on the object 204 in the three-dimensional scene. By estimating additional locations on the object either in parallel or in sequence, the processor 224 may produce a three-dimensional representation 227 of the object on a display 228.

In some embodiments, each channel of the multiple-channel pattern projector 201 may comprise a separate broadband radiation source 207 and a separate modulating structure 211 spatially modulating the first radiation 210 to produce an radiation pattern having a distinct spectrum. Additionally, separate lenses such as 208 and 212 may be included in the channel to substantially collimate the first radiation and/or to project an image of the modulating structure onto the object. A separate filter 209 may also be included in each channel to produce a first radiation with a spectrum that is distinct from other channels. The spectral pass-band of the filter may vary in time, as in the case of a tunable filter. The broadband radiation sources may include, but are not limited to, light emitting diodes (LEDs), lamps, and/or may be derived from a single broadband source such as an LED, a fluorescent lamp, or even a super-continuum laser source. The radiation sources may have different source spectra, in which case the spectral filters 209 may not be necessary. Furthermore, in some embodiments, the radiation sources may not be broadband and may be diode lasers with spectrally distinct emission lines, merely by way of example. The spectrum of each radiation source may be variable as in the case of a tunable laser and may contain discrete modes. The modulating structures 211 may modulate the amplitude, phase, and/or polarization of the first radiation and may comprise pattern masks or may include, but are not limited to, diffractive optical elements such as gratings, Fresnel lenses, and/or holograms, which may be optically written and/or computer-generated. The modulating structures may comprise multiple layers of a superstructure. The modulating structures may also be reflective or transmissive and may be reconfigurable. In some embodiments, the modulating structure 211 for each channel may comprise a distinct region of a reconfigurable liquid crystal (LC) array positioned in a focal plane shared by the collimating lens 208 and projecting lens 212. A pattern illuminating the object may be generated by one or more channels and two or more channels may have the same spectrum. Furthermore, in systems employing a combination of spectrum and time multiplexing, different groups of spectrally-encoded patterns may be projected at different times by controlling radiation sources, external shuttering devices, or reconfigurable filters or modulating structures using the controller 223. The pattern projector channels may be elements of an integrated compact multiple-layer array structure, which merely by way of example may comprise a layer of radiation sources, such as an LED array layer, several microlens array layers, a filter array layer, and a reconfigurable liquid crystal array layer.

In some embodiments, each channel of a multiple-channel imaging system 202 may comprise a separate region 217 of a single detector array 218 and an imaging lens 216 producing an image of the object on the detector array region. A separate filter 215 may also be included in each channel to produce an image with a spectrum that is distinct from other channels. The image data 226 captured by each detector array region may include a view of the object from nearly the same perspective and may be registered with respect to each other by the processor 224, as in the system of FIG. 6 for example, to produce a record of sequential measurement values of the object radiations 213 for each location 205 on the object illuminated by the patterns 206. In some embodiments, one or more separate detector arrays may be used in place of one or more detector regions, as in the system of FIG. 1. The detector array or arrays may include charge coupled devices (CCDs), complementary metal-oxide-semiconductor (CMOS) imagers, bolometers, arrays of photodiodes, and/or other radiation sensing devices. Each imaging detector array or array region may record the object radiations 213 simultaneously or, in the case of a combined time-multiplexed and spectrum-multiplexed system, at a different time in synchrony with pattern projection timing, resulting in an image on each detector array or array region of a different pattern illuminating the object. In some embodiments, multiple detector arrays or array regions may record images of the object illuminated by the same pattern simultaneously, since imaging of the same pattern from slightly different viewpoints may be useful in calibrating of the system 200 and/or achieving improved location estimation accuracy. In some embodiments, one or more dispersive elements such as a grating may be used instead of the filters 215, as in the system of FIG. 7 below for example. The filters or dispersive elements may be variable in time, as in the case of an acousto-optic device or a micro-electro-mechanical grating.

In some embodiments, each channel of a multiple-channel imaging system 203 may comprise a separate sub-array of a single detector array 220 interleaved with sub-arrays corresponding to other channels. A single imaging lens 219 may produce a single image of the object 204 on multiple interleaved sub-arrays. Each channel may comprise elements 212 covered by a different spectral filter 222 from the elements of other channels, as in the case of the pixels of a multi-color CCD or CMOS imager, merely by way of example. In some embodiments, radiation 214 from the location 205 on the object 204 may be imaged onto a region of the detector array 220 comprising at least one element from each imaging channel, as illustrated for the case of three channels. The image data 225 captured by each channel of the imaging system 203 may be registered with respect to image data from other channels, which may include imaging channels from the imaging system 202, by the processor 224, as in the system of FIG. 6 below for example, to produce a record of sequential measurement values of the object radiations 213 and 214 for each location 205 on the object illuminated by the patterns 206.

In some embodiments, the spectra associated with the pattern projection and imaging channels may be narrow and closely spaced, to keep the variation in the spectral response of the object 204 from channel to channel to a minimum. Merely by way of example, the radiation sources may be laser diodes with different but closely-spaced emission peaks, and the filters may be narrow-band filters with bandwidths of a few nanometers.

It should be apparent to those skilled in the art that FIG. 2 represents just one of many possible embodiments of the invention. The lenses 208, 212, 216, and 219 in the pattern projection and imaging systems are illustrated merely by a way of an example and may represent other optical systems which may include, but are not limited to, lenses, mirrors, prisms, beam splitters, gratings, gradient index lenses, diffractive lenses, or waveguides. Furthermore, depending on the design of the modulating structures, each channel of the pattern projection system 201 may not need to include collimating optics 208 or projection optics 212. The detector arrays may be located in a Fourier plane of the imaging optics rather than in the image plane, or in any other location allowing images of the object to be computed. Moreover, lens-free image-forming systems that may use pinholes or may rely on aperture synthesis may be employed instead or in addition to lens-based imaging systems such as those illustrated.

In some embodiments, a multiple-channel locating system may include any combination of spectrum multiplexing, time multiplexing, and polarization multiplexing. In the latter case, in analogy to spectrum multiplexing, one or more of the pattern projection or imaging channels may have a different polarization from other channels. Polarization multiplexing may be implemented by using radiation sources with different polarizations, such as orthogonally-oriented laser diodes, or by employing polarization filters, which may be variable with time as in the case of liquid crystal devices.

The object 204 may be macroscopic or microscopic. Merely by way of example, patterns generated using multiple channels 201 may be projected onto a microscopic object 204 using a microscope objective and object radiations 213, 214 may be directed towards the imaging systems 202, 203 using the same or a different microscope objective. The first radiations 210 may be visible and/or invisible, particulate and/or wavelike, polarized or unpolarized, may be temporally and/or spatially coherent, as in the case of laser radiation, or may be partially coherent, as in the case of radiation from an LED or an incandescent source. The multiple-channel locating system 200 may comprise multiple imaging systems as illustrated to improve locating accuracy and avoid or reduce shadowing of regions on the object by other features of the object which may be inherent in single-perspective systems. To attain the same goals, the system 200 may instead include multiple pattern projectors and a single imaging system, as illustrated for the system of FIG. 3 below for example, or a combination of multiple pattern projectors and multiple imaging systems, as in the system of FIG. 4 below for example. Alternatively, as illustrated for the time-multiplexed system of FIG. 1 above for example, the spectrum-multiplexed system 200 may use a single pattern projection system and a single imaging system, which may include but is not limited to either of the systems 202 or 203.

The spectrum-multiplexed multiple-channel locating system 200 may make it possible to project multiple patterns and to acquire the resulting images simultaneously compared to systems that rely on a single reconfigurable element to project multiple patterns and a single detector array to capture multiple images. This makes it possible to capture single-shot events on very small timescales in three-dimensions. The speed of such a single-shot system may be substantially limited only by the intensity of the illumination provided by the sources and the strength of the object's response. As in other systems and embodiments herein, the image data may be processed to estimate each object location independently from other object locations in parallel to provide a three-dimensional representation of the object using algorithms such as those described in FIG. 6, FIG. 9, FIG. 10, and FIG. 11 below for example. Moreover, one or more of the processing steps may be pre-computed for a variety of measurement values and stored in a lookup table, which may be rapidly accessed to estimate object locations as they are being measured, making possible real-time three-dimensional locating and object surface measurement. Furthermore, the multiple-channel pattern projector 201 and imaging systems 202 and 203 may be manufactured inexpensively as compact multiple-layer arrays of radiation sources 207, modulation structures 211, filters 209, 215, 222, detectors 221, 217, and other optical elements, 208, 212, 216 that may consume little space and power and may be integrated into mobile electronic devices such as a mobile telephone, which may also comprise a processor 224 and a display device 228.

Figure 3:
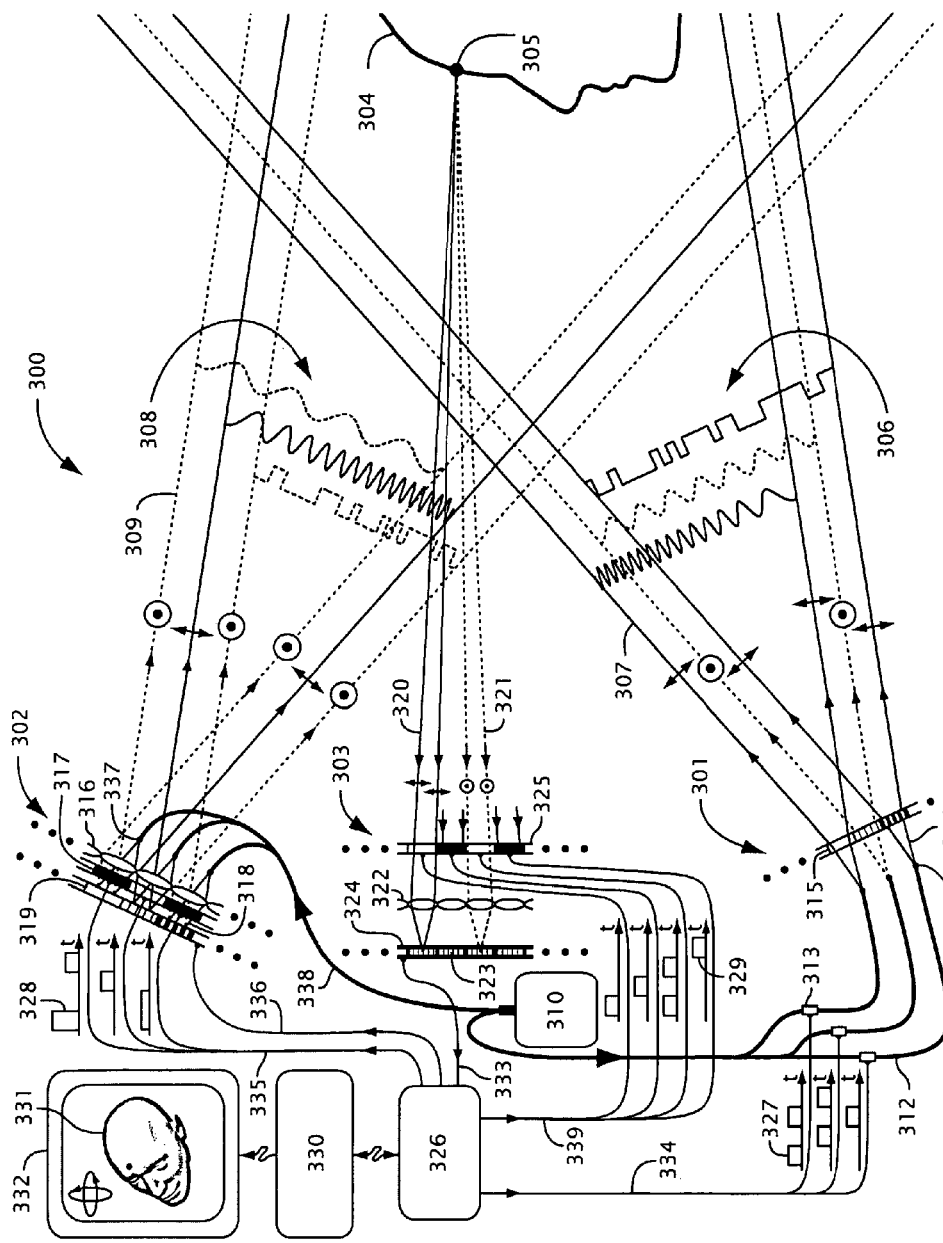
FIG. 3 illustrates a time- and polarization-multiplexed multiple-channel locating system, in accordance with various embodiments.

FIG. 3 illustrates a time- and polarization-multiplexed multiple-channel locating system 300 in accordance with various embodiments. In system 300, an object 304 in a three-dimensional scene may be illuminated with patterns 306, 308, which may include patterns with orthogonal polarizations and may be generated sequentially using different multiple-channel pattern projectors 301, 302. Pattern projector 301 may include multiple radiation sources 311, such as outputs of optical fibers 312 or other types of waveguides, which may be derived from the same source 310, such as a fiber laser, and my be modulated in time using source modulators 313. The pattern projector 301 may also include multiple modulating structures 315 spatially modulating the first radiations 314 from the radiation sources to produce the patterns 306 in the far field having horizontal polarization, merely by way of example. Another multiple-channel pattern projector 302, illuminating the object 304 from a different direction, may also comprise multiple radiation sources 337, such as outputs of optical fibers 338 or other types of waveguides, which may be derived from the same source 310 as the sources in the other projector 301. The sources may be collimated using lenses 316 and may be modulated in time using source gating devices 317 to produce the first radiations 318. The first radiations may be incident at an angle onto reflective modulating structures 319. The reflected spatially-modulated radiation may again pass through the source shuttering devices 317 and may be projected onto the object 304 using lenses 316, illuminating the object with patterns 308 which may be vertically polarized, merely by way of example. Object radiations 320 and 321 from a location 305 on the object 304, which may be scattered and hence differently polarized in response to the illuminations 307 and 309 may be detected using a multiple-channel imaging system 303. The imaging system may include imaging lenses 322 that may produce images of the location 305 on different regions 323 of a single detector array 324. Detector amplitude and/or polarization-gating devices 325 may be used to expose each region of the detector array to radiations from the object sequentially or may pass orthogonally-polarized object radiations 320, 321 due to orthogonally-polarized patterns to multiple detector array regions 323 simultaneously. A controller 326 may coordinate the timing 327 of the source modulators, the timing 328 of the source shuttering devices 317, and the timing 329 of the image gating devices 325 and may be in communication with and pass image data 333 from the detector array 324 to a processor 330. Provided the image data 333, the projected patterns 306, 308, and the locations and orientations of the multiple-channel pattern projectors 301, 302 and the multiple-channel imaging system 303, the processor may estimate the location 305 on the object 304 in the three-dimensional scene. By estimating additional locations on the object either in parallel or in sequence, the processor 330 may produce a three-dimensional representation 331 of the object on a display 332.

In some embodiments, each channel of the multiple-channel pattern projector 301 may comprise a separate radiation source 311 and a separate modulating structure 315 spatially modulating the first radiation 314 from the source to produce a radiation pattern 306. The radiation sources may be separate coherent or incoherent emitters, or may be derived from the same source. Furthermore, the radiation sources may be derived from one or more sources external to the system. Such external source or sources may be controlled by the controller 326 or they may be controlled by an external controller which may be synchronized to and/or in communication with the system controller 326. In some embodiments, the radiation sources may comprise outputs of optical fibers split from a single fiber laser source 310, where the radiation splitting ratio may be different for each channel and may be variable. The modulating structure 315 may modulate the amplitude, phase, and/or polarization of the first radiation and may comprise a single diffractive element and/or hologram (which may be considered to be the same) which may be computer-generated and may be designed to convert a spherical wavefront emanating from a point source into a pattern projected onto the object. Furthermore, the modulating structures may be designed collectively so that the patterns produced by multiple channels appear to emanate from a shared virtual location. Each modulating structure may comprise multiple layers and may be variable. The polarization, phase, or amplitude of the illumination produced by each channel may be modulated in time using a source modulator, which may include but is not limited to an electro-optic modulator (EOM), an acousto-optic modulator (AOM), a mechanical device such as a fiber stretcher, or a thermal modulator. In some embodiments, each channel may include additional devices such as polarizer to convert phase or polarization modulation into amplitude modulation. Each sequential pattern illuminating the object may be generated by one or more channels and my have one or more polarizations by activating one or more source modulators at a time using the controller 326 as illustrated in the timing plots 327. Moreover, the relative strength of the illuminations produced by each channel may be varied by controlling each source modulator in an analog fashion via control signals 334. When the radiation sources are derived from the same coherent source, multiple patterns projected simultaneously that are not orthogonally polarized may interfere with each other, making it possible to produce many more high-contrast patterns than there are channels.

In some embodiments, a waveguide-based multi-channel pattern projector such as the illustrated projection system 301 may include a compact diffractive element array 315 and may be positioned at the end of a flexible waveguide bundle. This configuration may make it easy to manually configure the orientation of the pattern projector. Furthermore, when combined with a miniature camera, such a system may enable an endoscopic three-dimensional imaging system for medical applications such as laparoscopic surgery.

In some embodiments, each channel of the multiple-channel pattern projector 302 may comprise a separate radiation source 337 and a separate reflective modulating structure 319 spatially modulating the first radiation 318 from the source to produce a radiation pattern 308. Additionally, a separate lens 316 may be included in the channel to substantially collimate the first radiation and/or to project an image of the modulating structure onto the object. A separate source gating device 317 may also be included in each channel to modulate the amplitude, phase, and/or polarization of the first radiation 318. The radiation sources may be separate coherent or incoherent emitters, or may be derived from the same source. In some embodiments, the radiation sources may comprise outputs of optical fibers split from a single fiber laser source 310, which may be the same source used by the other multiple-channel pattern projector 301. In some embodiments, multiple radiation sources comprising outputs of optical fibers may be provided by actively switching a single fiber laser source 310 between multiple optical fibers. For each channel, the modulating structure may modulate the amplitude, phase, and/or polarization of the first radiation and in some embodiments may comprise a region of reconfigurable digital micromirror device (DMD) positioned near the Fourier plane of the collimating lens 316. The first radiation may be directed at an angle onto the DMD such that the spatially modulated radiation may be projected onto the object 304 using the same collimating lens 316 as shown without being blocked by the radiation source 337. The source gating device may modulate in time the polarization, phase, and/or amplitude of the illumination produced by each channel and in some embodiments may comprise one or more liquid crystal (LC) and polarizer elements. Each sequential pattern illuminating the object may be generated by one or more channels and may have one or more polarizations by activating one or more source gating devices at a time using the controller 326 as illustrated in the timing plots 328. Moreover, the relative strength of the illuminations produced by each channel may be varied by controlling each gating device in an analog fashion via control signals 335. In some embodiments, the amplitudes and timing of the projected patterns may be varied by controlling the modulation strength the modulating structure itself using control signals 336. In this case the source gating devices may not be needed. When the radiation sources of both pattern projectors 302 and 301 are derived from the same coherent source 310, multiple patterns projected simultaneously by the projectors that are not orthogonally polarized may interfere with each other, making it possible to produce many more high-contrast patterns than there are channels in both projectors. For macroscopic objects, the interference of patterns from different projectors will likely be too small to resolve by the imaging system if the illumination directions are substantially different. However, in the case of microscopic three-dimensional imaging, the interference patterns due to both projectors may be resolved and may be useful for triangulation. The pattern projector channels may be elements of an integrated compact multiple-layer array structure, which merely by way of example may comprise a DMD array layer, an LC array layer, a microlens array layer, and an array of waveguide outputs.

In some embodiments, each channel of a multiple-channel imaging system 303 may comprise a separate region 323 of a single detector array 218 and an imaging lens 322 producing an image of the object on the detector array region. The image data 333 captured by each detector array region may include a view of the object from nearly the same perspective and may be registered with respect to each other by the processor 330, as in the system of FIG. 6 below for example, to produce a record of sequential measurement values of the object radiations 320, 321 for each location 305 on the object illuminated by the patterns 306, 308. The detector arrays may include, but are not limited to, charge coupled devices (CCDs), complementary metal-oxide-semiconductor (CMOS) imagers, bolometers, arrays of photodiodes, and/or other radiation sensing devices. A separate image gating device 325 may also be included in each channel to modulate the amplitude, phase, and/or polarization of the image in time so that each imaging detector array may record the object radiations at a different time in synchrony with pattern projection timing resulting in an image of a different pattern on each detector array. In some embodiments, however, multiple detector arrays may integrate the object radiations simultaneously, as illustrated in the timing plots 329. When a polarization-gating device 325 is used, the multiple simultaneous images may have different polarizations and therefore may be due to different radiation patterns. However, even when purely amplitude-gating devices 325 are used, imaging of the same pattern from slightly different viewpoints may be useful in calibrating of the system 300 and/or achieving improved location estimation accuracy. The duration and starting time of the integration of each detector region may be coordinated by a controller using signals 339 to control the image gating devices 325.

It should be apparent to those skilled in the art that FIG. 3 represents just one of many possible embodiments of the invention. The lenses 316, 322 in the pattern projection and imaging systems are illustrated merely by a way of an example and may represent other optical systems which may include, but are not limited to, lenses, mirrors, prisms, beam splitters, gratings, gradient index lenses, diffractive lenses, or waveguides. Furthermore, depending on the design of the modulating structures, each channel of the pattern projection system 301 may include additional collimating optics and/or projection optics. The detector arrays may be located in a Fourier plane of the imaging optics rather than in the image plane, or in any other location allowing images of the object to be computed.

The pattern projection timing 327, 328 and/or image recording timing 329 may be synchronized with periodic changes in the object and/or the scene including object motion as well as changes in orientation, scaling, lighting, or the object's response to the illumination. The object may be macroscopic or microscopic. Merely by way of example, patterns generated using multiple channels 301, 302 may be projected onto a microscopic object 304 using a microscope objective and object radiations 320, 321 may be directed towards the detection system 303 using the same or a different microscope objective.

The multiple-channel locating system 300 may comprise multiple pattern projectors and a single imaging system, as illustrated, to improve locating accuracy and avoid or reduce shadowing of regions on the object by other features of the object which may be inherent in single-perspective systems. To attain the same goals, the system 300 may include multiple time-multiplexed imaging systems and a single time-multiplexed pattern projection system, as illustrated for the spectrum-multiplexed system of FIG. 2 above for example, or a combination of multiple time-multiplexed pattern projectors and multiple time-multiplexed imaging systems as in the system of FIG. 4 below for example. Alternatively, as illustrated for the system of FIG. 1 above for example, the system 300 may use a single imaging system and a single pattern projection system, which may include but is not limited to either of the systems 301 or 302. Additionally, multiple pattern projectors may be used to implement the method of FIG. 12 below for example, wherein locations in the scene may be uniquely encoded by three-dimensional patterns projected from multiple directions without relying on the location and orientation of the imaging system for triangulation.

The time-multiplexed multiple-channel locating system 300 may make it possible to project multiple patterns and to acquire the resulting images very rapidly, potentially in a matter of microseconds or faster compared to systems that rely on a single reconfigurable element to project multiple patterns and a single detector array to capture multiple images. This makes it possible to capture a rapidly moving or changing object or scene in three-dimensions. The image data may be processed to estimate each object location independently from other object locations in parallel to provide a three-dimensional representation of the object using algorithms such as those described FIG. 6, FIG. 9, FIG. 10 and FIG. 11 below. Moreover, one or more of the processing steps may be pre-computed for a variety of measurement values and stored in a lookup table, which may be rapidly accessed to estimate object locations 305 as they are being measured, making possible real-time three-dimensional locating and object surface measurement. Furthermore, the multiple-channel pattern projector 302 and imaging system 303 may be manufactured inexpensively as compact multiple-layer arrays of radiation sources, reflective modulating structures 319, detectors 323, and other optical elements, 322, 316 that may consume little space and power and may be integrated into mobile electronic devices such as a mobile telephone, which may also comprise a processor 330 and a display device 332. Moreover, the multiple-channel pattern projector 301 may be implemented at the end of a waveguide bundle, and as a result may be well suited for endoscopic three-dimensional imaging applications or other applications that may benefit from the ability to flexibly reposition and reorient a compact pattern projector.

Figure 4:
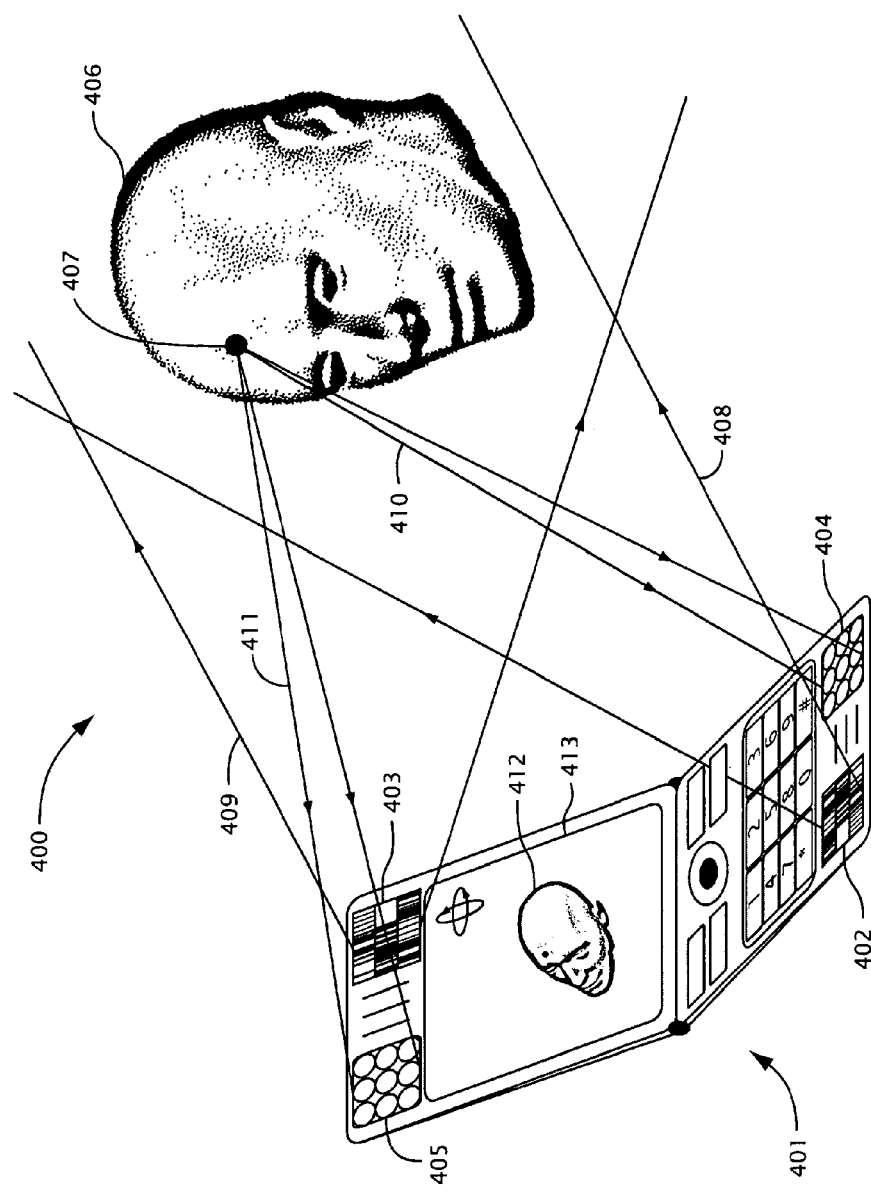
FIG. 4 illustrates a mobile multiple-channel locating system, in accordance with various embodiments.

FIG. 4 illustrates a mobile multiple-channel locating system 400 in accordance with various embodiments. In system 400, an object 406 that may be in a three-dimensional scene may be illuminated using one or more multiple-channel pattern projectors such as 402 and 403 embedded in a mobile device 401. The pattern projectors may comprise a variety of compact integrated multiple-channel pattern projection implementations within the spirit and scope of this invention, including the pattern projection systems of FIGS. 1, 2, and 3 above and FIGS. 5 and 6 below for example as well as their various embodiments and elements. The projected patterns may be time-multiplexed, spectrum-multiplexed, polarization-multiplexed, or multiplexed using a combination of time, spectrum, and/or polarization. Object radiations 410 and 411 from a location 407 on the object 406, which may be produced in response to the illuminations 408 and 409 may be detected using one or more multiple-channel imaging systems 404, 405 embedded in the mobile device 401. The imaging systems may comprise a variety of compact integrated multiple-channel detector array implementations within the spirit and scope of this invention, including the imaging systems of FIGS. 1, 2, and 3 above and FIG. 7 below for example as well as their various embodiments and elements. The imaging channels may include separate detector arrays, regions of a single detector array, and/or interleaved sub-arrays and may record images of the object with different spectra or polarizations or may be exposed to the object radiations at different times in accordance with various embodiments. One or more controllers, which may be located within the mobile device 401, may coordinate the timing of pattern projection and image acquisition and may be in communication with and pass image data from the imaging systems 404, 405 to one or more processors, which may also be embedded within the mobile device 401. Provided the image data, the projected patterns, and the locations and orientations of the multiple-channel pattern projectors 402, 403 and the multiple-channel imaging systems 404, 405, the processor may estimate the location 407 on the object 406 in the three-dimensional scene. By estimating additional locations on the object either in parallel or in sequence, the processor may produce a three-dimensional representation 412 of the object on a display 413, which may also be part of the mobile device 401.

In some embodiments, the multiple channel pattern projectors 402, 403 and multiple channel imagers 404, 405 may be manufactured as compact integrated devices and may comprise multiple thin layers of miniature arrays of such devices as laser diodes, vertical cavity semiconductor lasers, light emitting diodes, microlenses, diffractive optical elements, liquid crystal cells, micromirrors, spectral filters, polarizers, CCD's, and CMOS imaging detectors. The multiple channel pattern projectors and imagers may have millimeter-scale or even sub-millimeter-scale dimensions, may consume little electrical power, may be inexpensive to manufacture in large quantities, and may therefore be well-suited for integration in a variety of mobile battery-powered devices such as cellular telephones, PDA's, laptop computers, portable gaming systems, as well as photo- and video-cameras. In some embodiments, a multiple channel pattern projector and a multiple channel imager may be embedded at substantially separated locations in a mobile telephone, for example above the screen and below the keypad of a folding device, as illustrated in the figure, and may be used to measure the three-dimensional surface of an object 406, such as a human face, which may be located in proximity to the mobile device 401. One or more controllers and processors within the mobile device may be used to control the multiple channel pattern projector and imager, to apply a triangulation algorithm to the detected images in order to measure the three-dimensional surface of the object, and to display the measured surface with the desired lighting and perspective to the user via the integrated mobile screen 413. The mobile display screen 413 may include a capability to simulate a three-dimensional view of the object to the user, who may be wearing polarizing glasses, merely by way of example. Furthermore, some embodiments may include one or more multiple-channel pattern projectors, multiple-channel imagers, controllers, and/or processors that may be external to the mobile device.

In some embodiments, a plurality of multiple channel pattern projectors and imaging systems may be included in a single mobile device. Although two pattern projectors and two imaging systems with nine channels each are illustrated, the mobile device 401 may include one, two, or more than two pattern projectors, one, two, or more than two imaging systems, and the number of channels may be fewer or greater than nine. Each multiple channel pattern projector and imager pair may be used to measure the object surface from a different perspective and/or using a distinct combination of patterns to attain better surface coverage, improve triangulation accuracy, and/or reduce shadowing effects. Merely by way of example, when the pattern projector 402 is used with the imager 405 a surface of the human face may be reconstructed containing shadowed regions to the right of the nose and underneath the chin. However, the pattern projector 403 used with the imaging system 405 may be able to reconstruct the surface to the right of the nose to but may contain a shadowed region below the nose. By combining and registering the two surface reconstructions using the processor, the surface around the nose may be reconstructed without shadowing. Similarly, projector 402 may be used with imaging system 404 to the fill in the shadowed region below the chin. Furthermore, by combining the surface data from multiple projector/imager pairs, a more accurate surface reconstruction may be obtained. Depending on the location of the imaging system, a given multiple-channel projector may need to project patterns varying in different directions for proper triangulation. This may be accomplished by using reconfigurable modulating structures or by including several groups of channels, one channel group projecting patterns that vary in a different (potentially orthogonal) direction with respect to another channel group. Moreover, by combining location and/or surface data from multiple mobile devices containing multiple-channel locating systems, better surface coverage and/or more accurate reconstruction of the object surface may be obtained. Conversely, multiple surface reconstructions of substantially the same object by mobile devices with unknown locations may be used to calculate the location of the devices relative to the object and relative to each other. Mobile multiple-channel locating systems may also be used in robot navigation systems.

The mobile multiple-channel locating system 401 may use highly-integrated electronic and optical elements that may consume very little space and power and at the same time may make it possible to project multiple patterns and to acquire the resulting images simultaneously or in very rapid sequence, potentially in a matter of microseconds or faster. In comparison, some wide-field active illumination three-dimensional imaging and surface profiling systems rely on bulky pattern projection systems using high-power illumination sources and use a single reconfigurable element to project multiple patterns and a single detector array to capture multiple images, and may thus be incompatible with compact high-speed mobile devices. High acquisition speed may not only make it possible to capture a rapidly moving or changing object or scene in three-dimensions, but may also help avoid artifacts due to vibration of the mobile device during three-dimensional image acquisition. The image data may be processed to estimate each object location 407 independently from other object locations in parallel to provide a three-dimensional representation of the object using algorithms such as those described FIG. 6, FIG. 9, FIG. 10, and FIG. 11 below for example. Such location-independent three-dimensional sensing may enable robust three-dimensional imaging of objects with gaps, shadows, spikes, steps, coloration and reflectivity variations and other discontinuities that may pose difficulties for some active illumination techniques that rely on phase unwrapping across the surface of the object. Furthermore, in comparison to other high-speed three-dimensional imaging techniques based on stereo vision that may be integrated into a mobile device, the multiple-channel active illumination locating system may be more robust to the variety of object structures, textures, and lighting conditions that may be typical of mobile device imaging targets such as human faces. Moreover, one or more of the processing steps may be pre-computed for a variety of measurement values and stored in a lookup table, which may be rapidly accessed to estimate object locations 407 as they are being measured, making possible real-time three-dimensional locating and object surface measurement. A lookup table approach to processing three-dimensional data may also consume less power and require processing resources in the mobile device that a full triangulation computation for each measurement.

Figure 5:
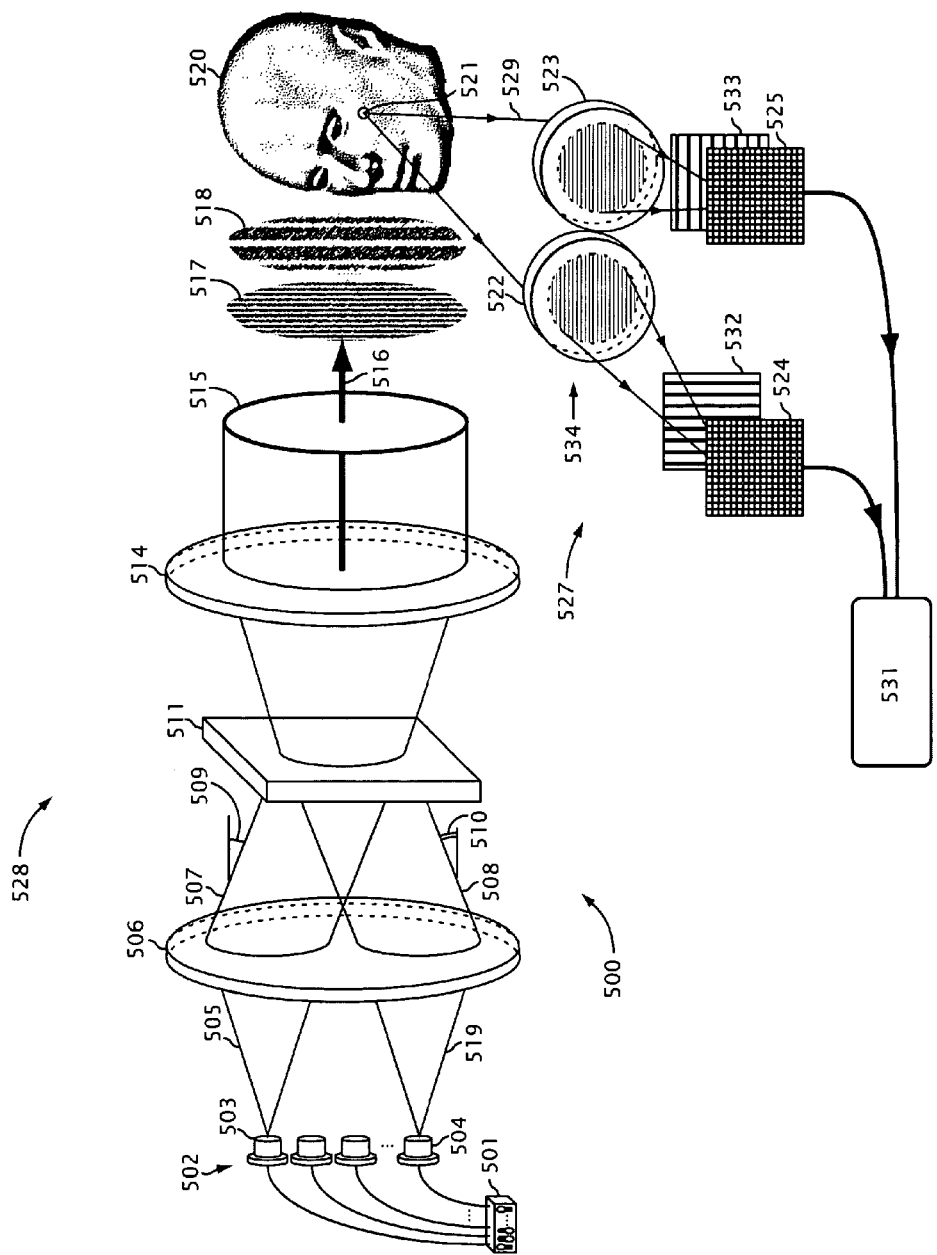
FIG. 5 illustrates a holographic multiple-channel locating system, in accordance with various embodiments.

FIG. 5 illustrates a multiple-channel locating system 528, in accordance with various embodiments. System 528 contains a multiple-channel pattern projection system 500 and a multiple-channel imaging system 527. In the pattern projection system 500, multiple modulating structures are included in a volume hologram 511. Radiation incident on volume hologram 511 substantially interacts with a subset of the modulating structures depending on the incident angle such as 509 and 510 due to phase matching constraints. Radiation incident at different angles may be activated either sequentially, simultaneously, randomly, or in some other activation pattern. If two or more radiation sources 502 producing first radiations incident at different angles are activated simultaneously, the output may be a superposition 515 of multiple radiation patterns such as 517 and 518. These radiation patterns may be used to illuminate an object 520. A location 521 on the object may produce object radiations 529 in response to one or more radiation patterns. This radiation may be collected by multiple-channel imaging system 527, producing data arrays that may be used to estimate the coordinates of location 521 within the three-dimensional scene. By estimating the coordinates of additional locations 521 on the object 520 either in parallel or in sequence, a three-dimensional representation of the object or scene may be produced.

In some embodiments, the radiation sources 502 may be laser diodes. An array of four laser diodes is shown, but the number of laser diodes could also be more or less than four. The amplitude of the output of each radiation source may be controlled by a controller 501. At any given time either zero, one, two, or more than two sources may emit first radiations. In FIG. 5, two sources 503 and 504 are shown emitting first radiations 505 and 519 respectively. These first radiations may be directed by a lens 506 in order to be incident on volume hologram 511 substantially at specific angles 509 and 510. The incident angle of radiation 507 and 508 on the volume hologram 511 may be dependent on the location of the radiation source within the source array 502. Furthermore, the angles of incidence of radiations 507, 508 may be such that the undiffracted light does not fall along the illumination axis. Volume hologram 511 may include a superposition of multiple diffracting structures, which may also be referred to as modulating structures. Because the first radiations may impinge upon the volume hologram 511 at different angles, each first radiation may interact with a distinct diffracting structure within the volume hologram, producing a distinct projected pattern such as 517 and 518 in the far field. A second lens 514 may be used to reduce the propagation distance necessary to reach the far field condition. The active sources may differ in polarization from one another and may produce intensity patterns such as 517 and 518 that have different spatial frequencies and different polarizations. These patterns may be directed along an illumination axis 516 and may be used to illuminate a three-dimensional scene containing one or more objects 520 as a part of a multiple-channel locating system.

Object radiations 529 from the location 521 in response to the radiation patterns 517 and 518 may be collected by multiplexed imaging system optical system 527, which may include one or more objective lenses such as 522 and 532. The radiation collected by the optical system 534 may be filtered by one or more filters. For example, filter 532 may filter the radiation collected by objective lens 522 such that radiation with polarization consistent with the first active source 503 is transmitted and radiation with polarization consistent with the second active source 504 is blocked. Similarly, filter 533 may filter the radiation collected by the objective lens 523 such that radiation with polarization consistent with the second active source 504 is transmitted and radiation with polarization consistent with the first active source 503 is blocked. Radiation transmitted by filter 532 may form an image of the location 521 on a detector array 524. Likewise, radiation transmitted by filter 533 may form an image of the location 521 on a detector array 525. Each detector array may record an image of the scene containing the object 520 and the location 521 thereby producing an image data array, wherein each data array element contains a value measured by one or more distinct detector elements. Such a multiple-channel imaging system is not limited to detector arrays, and may include one detector array, two detector array, or more than two detector arrays. Each detector array may have a corresponding filter and objective lens distinct from other filters and objective lenses, or one or more detector arrays may share one or more filters and/or objective lenses with other detector arrays. The detector arrays may be in electrical communication with one or more processors 531, which may register and process the image data arrays produced by detector arrays 524 and 525 and any additional detector arrays to produce a record of measured values for each location in the scene illuminated by the patterns. Furthermore, additional radiation patterns may be projected by activating different or additional sources in the laser diode array 502 and the resulting radiation 529 from location 521 in response to these radiation patterns may be detected by the multiple-channel imaging system 527 in sequence or in parallel. All such detected data may be registered by the processor 531 in the manner described. The processor may compute the coordinates of location 521 using one or more of the algorithms described herein or using one or more other algorithms.

It should be apparent to those skilled in the art that FIG. 5 represents just one of many possible embodiments of the invention. For example, the multiple-channel pattern projector 500 may be used with a detection system other than the illustrated multiple-channel detection system 527. The radiation sources 502 may include, but are not limited to, laser diodes, light emitting diodes (LEDs), outputs of optical fibers or other types of waveguides, may comprise an array of illuminated apertures, or may represent focal points of a multiple-channel optical system. The radiation sources may be activated sequentially, simultaneously, randomly, or in some other activation pattern. The first radiations, such as radiations 505 and 519, may be visible and/or invisible, particulate and/or wavelike, polarized or unpolarized, and/or may be temporally and/or spatially coherent, as in the case of laser radiation, and/or partially coherent, as in the case of radiation from an LED or an incandescent source. The first radiations may be produced by splitting radiation from a single source, such as a laser coupled into multiple optical fibers, or could be derived from a single source with a time-variable output spectrum, such as a tunable laser. In the latter case, the hologram 511 may be designed such that each spectrum output by the source interacts with a different combination of diffracting structures within the hologram. Some of the first radiations may have different polarizations and the hologram 511 may be designed such that each polarization interacts with a different combination of diffracting structures within the hologram. Furthermore, the hologram 511 may be a volume hologram or a substantially thin hologram, may be a diffractive element, may comprise multiple diffracting layers, may comprise multiple diffracting regions, and/or may be computer-generated. The hologram 511 may be shaped as a sphere, a cylinder, or it may contain more or less than six facets. The diffracting structures within the hologram 511 may spatially modulate the amplitudes, phases, and/or polarizations of the first radiations. The hologram 511 may also be variable in time mechanically, opto-electronically, acousto-optically, chemically, and/or optically, as in the case of a photorefractive crystal. The optical subsystems illustrated as lenses 506 and 514 may be absent or instead utilize one or more other optical elements including, but not limited to, lenses, mirrors, gratings, beam splitters, prisms, or filters. The projected patterns such as 517 and 518 may be periodic or non-periodic, may vary continuously and/or abruptly, may vary in amplitude, phase, and/or polarization, and may vary along one or more directions. Furthermore, the patterns may be projected sequentially and/or simultaneously, and may have different spectra and/or polarizations. The projected patterns such as 517 and 518 may be strobed or pulsed and may be synchronized with the motion of an object in the scene. The multiple-channel pattern projector 500 may be integrated into a mobile electronic device such as a mobile telephone.

The three-dimensional scene may include one or more objects 520 and may be fully or partially illuminated by the radiation patterns. The portion of the object 520 illuminated by the patterns may fit fully or partially within the fields of view of the imaging system 527. The object 520 being measured may be reflective, absorbing, and/or partially transparent. Radiation 529 from the location 521 on the object may be scattered, reflected, transmitted, fluoresced, or otherwise generated by the object in response to the illumination. The object 520 may be stationary or moving and its response to the illumination may be changing in time.

The illustrated multiple-channel imaging system 527 may be used with a multiple-channel pattern projection system other than the illustrated pattern projection system 500. The imaging system may comprise one or more detector arrays. Several images of the scene may be recorded simultaneously using multiple detector arrays, where each imaging detector array may comprise distinct imaging devices or may comprise a sub-array of a larger detector array. Images of the scene may also be recorded sequentially using one or more detector arrays employing electronic or optical shutters. The imaging system 527 is merely illustrated using polarization filters to selectively transmit or block radiation 521 from the object due to patterns having different polarizations, but could also employ one or more wavelength filters to selectively transmit or block radiation due to patterns having different spectra. Two filters are shown, but zero, one, two, or more than two filters may be used. The filters are shown following the imaging optical system 534, but the filters may also precede the imaging optics or lie at an intermediate location within the optical system 534. The imaging devices such as 524 and 525 may transmit data to the processor 531 digitally or as an analog signal and may be under the control of the processor 531 or another controller, or may be autonomous. The imaging optics illustrated as lenses 522 and 523 may instead utilize one or more other optical elements including, but not limited to, lenses, mirrors, gratings, beam splitters, prisms, or filters. The fields of view of each imaging detector array may coincide or may be different, as long as they all contain the location 521 on the object. The physical locations and orientations of the imaging detectors and the pattern projector may change in time, as in a vibrating system, and may be measured during the motion. The detector arrays may be located in a Fourier plane of the imaging optics rather than in the image plane, or in any other location allowing images of the object to be computed. Image recording may be synchronized with the motion of an object in the scene. The multiple-channel imaging system 527 may be integrated into a mobile device such as a mobile telephone, merely by way of example.

Figure 6:
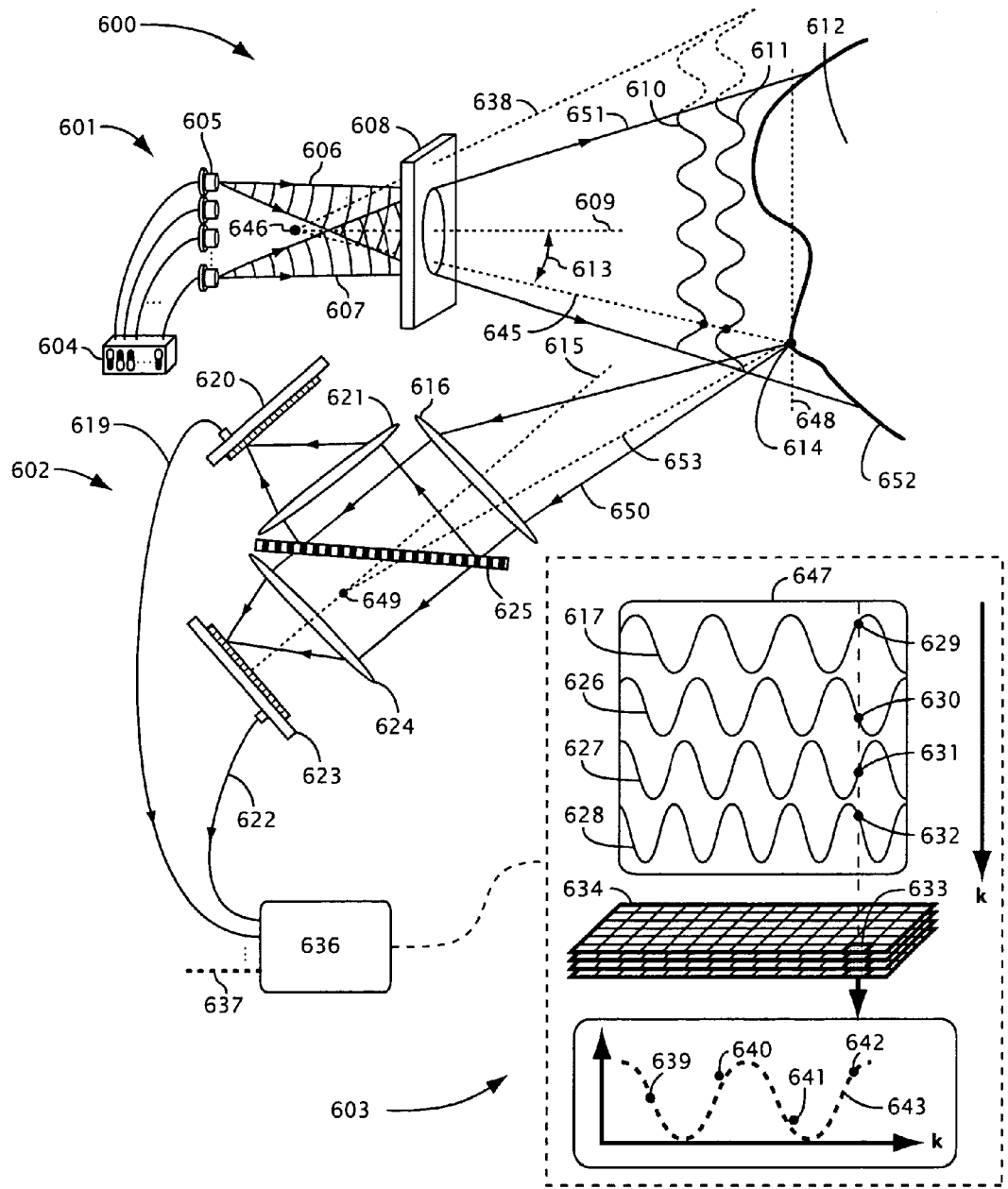
FIG. 6 illustrates a holographic multiple-channel locating system and an illumination angle estimation method, in accordance with various embodiments.

FIG. 6 illustrates a multiple channel locating system 600, in accordance with various embodiments. In system 600, an object 612 that may be in a three-dimensional scene may be illuminated with multiple patterns such as 610 and 611 generated using a multiple channel pattern projection system 601 including multiple radiation sources 605, which may comprise an array, and a volume hologram 608. Radiation 650 from a location 614 on the object 612 produced in response to the illumination may be detected using a multiple-channel imaging system 602 comprising multiple detector arrays such as 623 and 620. The detected radiation may be processed using an algorithm 603 based on frequency-shifted periodic patterns to estimate the location 614 on the object 612. A surface 652 of the object may be reconstructed by estimating multiple locations 614 on the object 612 in parallel using different elements of the imaging arrays. In this system, multiple patterns may be projected and imaged simultaneously making possible rapid measurement of a three-dimensional surface of an object.

In some embodiments, the radiation sources 605 may be laser diodes. An array of four laser diodes is shown, but the number of laser diodes could also be more or less than four. The amplitude of the output of each radiation source may be controlled by a controller 604. At any given time either zero, one, two, or more than two sources may emit first radiations. In the FIG. 6, two sources are shown emitting first radiations 606 and 607, merely by way of example. These first radiations may be incident on volume hologram 608, which may include multiple diffracting structures that may also be referred to as modulating structures. Because the first radiations may emanate from sources 605 at different locations in a radiation source array, the wavefronts of these first radiations may impinge upon the volume hologram 608 at different angles and may have different curvatures. As a result, due to phase-matching constraints, each first radiation may interact with a distinct diffracting structure within the volume hologram 608, producing distinct projected patterns such as 610 and 611 in the far field. The two active sources, for example, may differ in polarization from one another and may produce two sinusoidal intensity patterns such as 610 and 611 that have different spatial frequencies and different polarizations. These patterns may be directed along an illumination axis 609 to illuminate the object 612. The direction of the sinusoidally-varying patterns 610 and 611 may be perpendicular to the illumination axis 609. Together, the illumination axis and the direction of sinusoidal variation define the illumination plane.

The multiplexed imaging system 602 may collect radiations from the object 612 in response to the radiation patterns 610 and 611 substantially along an imaging axis 615. Radiation 650 from the location 614 in response to the radiation patterns 610 and 611 may be collected by an optical system 616, which may be an objective lens. Following the optical system 616, a polarization beam splitter 625 may split the collected radiation 650 based on polarization. The radiation with polarization consistent with the first active source may be transmitted, while radiation with polarization consistent with the second active source may be reflected. The transmitted radiation may be relayed by another optical system 624, such as a lens, to form an image of the location 614 on detector array 623. Likewise, the reflected radiation may be relayed by a lens 621 to form an image of the location 614 on detector array 620. Each detector array may record an image of the scene containing the object 612 and the location 614 thereby producing an image data array, wherein each data array element contains a value measured by one or more distinct detector elements. The two detector arrays 623 and 620 may be in electrical communication via connections 622 and 619, respectively, with a processor 636. Such a multiple channel imaging system is not limited to two detector arrays, and additional detector arrays may be connected to the processor 636 as indicated by the dotted connection 637. The processor 636 may register and process the image data arrays produced by detector arrays 623 and 620 and any additional detector arrays to produce a record of measured values for each location in the scene illuminated by the patterns. Furthermore, additional radiation patterns may be projected by activating different or additional sources in the laser diode array 605 and the resulting radiation 650 from location 614 in response to these radiation patterns may be detected by the multiple channel imaging system 602 in sequence or in parallel. All such detected data may be registered by the processor 636 in the manner described.

The processor 636 may compute an illumination angle 613 between the imaging axis and a direction 645 from a pattern divergence location 646 on the illumination axis 609 to the location on the object 614 projected onto the illumination plane using an angle estimation method 603. Box 647 shows plots 617, 626, 627, and 628 of values that may be measured by a row of detector elements when a planar object 648 is illuminated by each of multiple patterns varying sinusoidally with angle from the illumination axis in the illumination plane and having different periods. Radiations 650 from the object 612 due to each sinusoidal pattern may be imaged simultaneously by different detector arrays, such as detector arrays 620 and 623, or different sub-arrays of a single detector array, or may be imaged sequentially using a single detector array. The processor may assemble the resulting image data arrays into a data array stack 634, wherein each element 633 may be a record of measured values 629, 630, 631, 632 for each location in the scene. The sinusoidal patterns may be chosen such that they have a common phase along a direction 638 lying substantially far outside of the illumination field 651. The sinusoidal patterns may also be chosen such that the measured values 639, 640, 641, 642 in the measurement record 633 for each location 614 on the object vary substantially sinusoidally. The period and phase of the sinusoidal variation 643 may correspond to the illumination angle 613. For each location on the object 614, the processor may compute the illumination angle 613 with fine resolution by estimating the phase of the sinusoidal variation for each record 633. However, this computation may result in angle ambiguity due to periodic dependence of phase on the illumination angle. To resolve such angle ambiguities, the processor may estimate the period of the sinusoidal variation for each record 633 thereby computing the illumination angle with coarse resolution but without said periodic dependence. In this method, the angular resolution may be limited by the period of the radiation patterns and the accuracy of phase estimation in the presence of measurement noise. Furthermore, by keeping the variation between the periods of the illumination patterns within the illumination field 651 sufficiently small, every measured angle may be disambiguated. The processor may estimate the phase and frequency for each record 633 using a variety of methods, including but not limited to constrained function fitting algorithms, Fourier transform methods, Hilbert transform methods, as well as analytical trigonometric methods. Furthermore, the mapping between measured values and illumination angle may be pre-computed and stored in a lookup table, making possible real-time three-dimensional surface measurement and reconstruction.

The angle estimation method 603 described above may also be used with non-sinusoidal periodic patterns. In this case the variation of the measured values in each record 633 corresponding to each location 614 on the object may be periodic but may not be sinusoidal, however by estimating the phase and period of such a non-sinusoidal periodic variation by function fitting, transform, or analytical methods, the illumination angle may be estimated in the same way as described above for sinusoidal patterns. Furthermore, even non-periodic patterns may be represented as a combination of sinusoidal patterns. Therefore, method 603 may be extended to apply to multiple non-periodic patterns scaled relative to each other. In this case, each record 633 may be Fourier-transformed to extract one or more sinusoidal variation components whose phase and frequency may be estimated to compute the illumination angle as above.

The processor may also compute an imaging direction 653 from a known focal point 649 on the imaging axis 615 to each measured location 614 on the object from the position of the detector elements within the detector arrays receiving radiation 650 from that location. From the computed imaging direction 653 and the illumination angle 613, and the known illumination axis 609, illumination plane, imaging axis 615, pattern divergence point 646, and imaging focal point 649, the location on the object may be estimated using geometric triangulation. In some embodiments, a more accurate non-paraxial triangulation method may be used taking into account aberrations in the pattern projecting system 601 and imaging system 602, such as methods commonly used in the field of three-dimensional profilometry. Because each location on the object may be estimated independently from other locations, this method may be applied to reconstruct three-dimensional objects with discontinuous surfaces, or even objects with no surfaces at all, such as an array of pins or strands or point-scatterers embedded within a medium.

It should be apparent to those skilled in the art that FIG. 6 represents just one of many possible embodiments. The number of patterns and the number of corresponding measured values, k, may be less than or greater than the four shown. The illustrated multiple-channel pattern projection system 601 is not limited to projecting sinusoidal patterns, can be used with a detection system other than the illustrated detection system 602, and/or may be used with other locating methods than the illustrated angle estimation method

603. The radiation sources 605 may include, but are not limited to, laser diodes, light emitting diodes (LEDs), outputs of optical fibers or other types of waveguides, may comprise an array of illuminated apertures, or may represent focal points of a multiple-channel optical system. The first radiations, such as radiations 606 and 607, may be visible and/or invisible, particulate and/or wavelike, polarized or unpolarized, and/or may be temporally and/or spatially coherent, as in the case of laser radiation, and/or partially coherent, as in the case of radiation from an LED or an incandescent source. The first radiations may be produced by splitting radiation from a single source, such as a laser coupled into multiple optical fibers, or could be derived from a single source with a time-variable output spectrum, such as a tunable laser. In the latter case, the hologram 608 may be designed such that each spectrum output by the source interacts with a different combination of diffracting structures within the hologram. Some of the first radiations may have different polarizations and the hologram may be designed such that each polarization interacts with a different combination of diffracting structures within the hologram. Furthermore, the hologram 608 may be a volume hologram or a substantially thin hologram, may be a diffractive element, may comprise multiple diffracting layers, and/or may be computer-generated. The diffracting structures within the hologram 608 may spatially modulate the amplitudes, phases, and/or polarizations of the first radiations. The hologram 608 may also be variable in time mechanically, opto-electronically, acousto-optically, chemically, and/or optically, as in the case of a photorefractive crystal. The projected patterns may be periodic or non-periodic, may vary continuously and/or abruptly, may vary in amplitude, phase, and/or polarization, and may vary along one or more directions. Furthermore, the patterns may be projected sequentially and/or simultaneously, and may have different spectra and/or polarizations. The projected patterns may be strobed or pulsed and may be synchronized with the motion of an object in the scene. The multiple-channel pattern projector 601 may be integrated into a mobile electronic device such as a mobile telephone.

Moreover, the illustrated multiple-channel imaging system 602 can be used with a multiple-channel pattern projection system other than the illustrated pattern projection system 601, and may be used with other locating methods than the illustrated angle estimation method 603. The imaging system may comprise one or more detector arrays. Several images of the scene may be recorded simultaneously using multiple detector arrays, where each imaging detector array may comprise distinct imaging devices or may comprise a sub-array of a larger detector array. Images of the scene may also be recorded sequentially using one or more detector arrays employing electronic or optical shutters. The imaging system 602 is merely illustrated using a polarization beam splitter to separate radiation 650 from the object due to patterns having different polarizations, but could also employ one or more dichroic beam splitters to separate radiation due to patterns having different spectra. A single beam splitter with two output ports is shown, but a beam splitter with more than two output ports could also be used, as well as a combination of beam splitters. The imaging devices such as 620 and 623 may transmit data to the processor 636 digitally or as an analog signal and may be under the control of the processor 636 or another controller, or may be autonomous. The imaging optics illustrated as lenses 616, 621, and 624 may instead utilize one or more other optical elements including, but not limited to, lenses, mirrors, gratings, beam splitters, prisms, or filters. The fields of view of each imaging detector array may coincide or may be different, as long as they all contain the location on the object. The physical locations and orientations of the imaging detectors and the pattern projector may change in time, as in a vibrating system, and may be measured during the motion. The detector arrays may be located in a Fourier plane of the imaging optics rather than in the image plane, or in any other location allowing images of the object to be computed. Image recording may be synchronized with the motion of an object in the scene. The multiple-channel imaging system 602 may be integrated into a mobile device such as a mobile telephone.

The three-dimensional scene may include one or more objects and may be fully or partially illuminated by the radiation patterns. The portion of the object illuminated by the patterns may fit fully or partially within the fields of view of the imaging system. The object being measured may be reflective, absorbing, and/or partially transparent. Radiation 650 from the location on the object may be scattered, reflected, transmitted, fluoresced, or otherwise generated by the object in response to the illumination. The object may be stationary or moving and its response to the illumination may be changing in time.

Furthermore, the illustrated angle estimation method 603 may be used with many other pattern projection and imaging systems than those illustrated and the holographically projected patterns may be used with other angle estimating methods, including methods of FIGS. 9-12. The angle estimation method may also be used with patterns varying along multiple directions. For example, the patterns may vary radially with different periods rather than varying within an illumination plane. In this case, the location on the object may be constrained to a cone of directions about the illumination axis by applying this method 603 rather than a plane of directions as in the case of sinusoidal patterns varying in one dimension. A triangulation algorithm may be used to constrain the location on the object further. Alternatively, each period-scaled pattern may comprise multiple periodic components, each component varying along a different direction. In this case, Fourier analysis of measured values for each location on the object may be used to estimate the phase and period corresponding to each direction of variation, and may thereby constrain the location on the object to a single direction from the pattern divergence location 646. Furthermore, the direction 638 along which the phases of the patterns coincide was introduced as an illustrative construct and may not need to be well defined for the method to be valid. In some embodiments the periods of the sinusoidal patterns may be derived from prime numbers.

Figure 7:
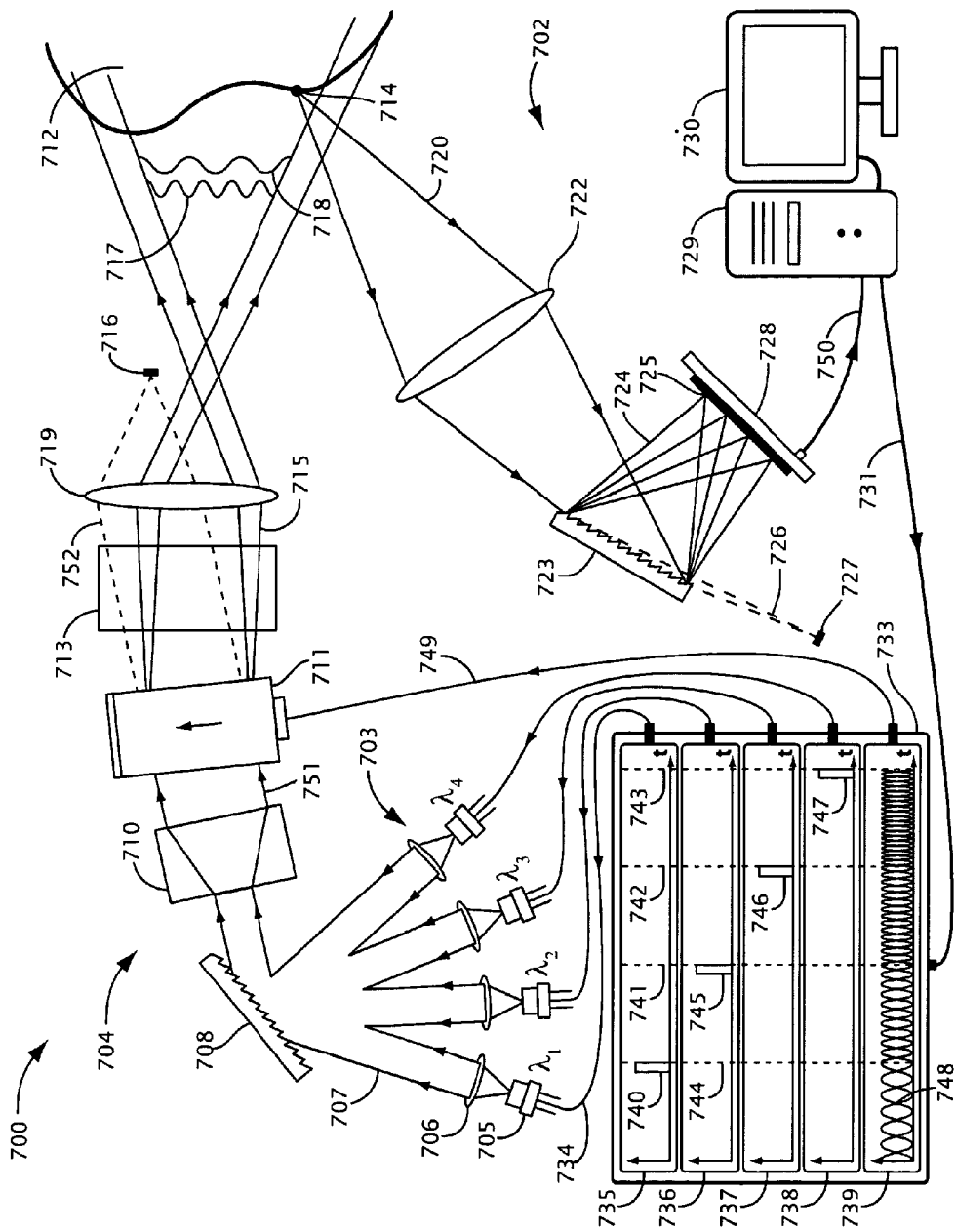
FIG. 7 illustrates a spectrum and time multiplexed multiple-channel locating system using an acousto-optic pattern projector and a spectrally-dispersed single-shot imaging system, in accordance with various embodiments.

FIG. 7 illustrates a multiple channel locating system 700 in accordance with various embodiments. In system 700, an object 712 in a three-dimensional scene may be illuminated with a rapid sequence of multiple patterns such as 717 and 718 generated using a multiple channel pattern projector 704, which includes multiple radiation sources 703 having different spectra and a spatial modulator such as an acousto-optic Bragg cell 711. Object radiations from a location 714 on the object produced in response to the illumination may be directed according to its spectrum onto different regions on an imaging detector array 728. A surface of the object 712 may be reconstructed by estimating multiple locations on the object in parallel using different elements within each of the regions of the imaging array. In this system, multiple patterns may be projected and multiple images of the resulting object radiations may be acquired during a single integration time of the imaging detector array, making possible rapid measurement of a three-dimensional surface of an object.

In some embodiments, the multiple radiation sources 703 may be laser diodes 705 with different spectra denoted $\lambda_1$, $\lambda_2$, $\lambda_3$, and $\lambda_4$. An array of four laser diodes is shown, but the number of laser diodes could also be more or less than four. Alternatively, the radiation sources may include, but are not limited to, LEDs, other types of lasers, or derived from a single source with a variable spectrum. The output of each radiation source may be collimated by a lens 706, and directed towards a beam combining optical element, which may be a dispersive element such as a grating 708. The beam combining element may direct the first radiation 707 from each source along a common path toward the spatial modulator 711, which may be an acousto-optic Bragg cell. A Bragg cell may be an existing commercially-available device that may include an electrically driven acoustic transducer bonded to an optical crystal. An electrical signal 749 driving the transducer may produce an acoustic pressure wave moving through the crystal at the velocity of sound. The acoustic pressure wave may create a phase perturbation within the crystal via the photoelastic effect, which may spatially modulate the first radiations 751 passing through the crystal. The first radiations 751 spatially modulated by the Bragg cell 711 may be shaped by an anamorphic beam shaper 710 to compress the radiation. A complementary beam shaper 713 may be positioned at the output of the Bragg cell to expand the output radiation. The spatial modulation in the Bragg cell causes each first radiation beam to diffract. The driving signal 749 may comprise a combination of frequencies to produce a combination of diffracted 1st order radiation beams 715 along with other order beams including a 0th order beam 752. The 0th order beam may be blocked by a stop 716. When made to interfere using a lens 719 or another optical system, the 1st order diffracted radiation beams may produce the radiation pattern 717 at the object 712.

The output amplitude of each radiation source 705 may be controlled via control signal 734 by a controller 733 that may also provide a driving signal to the Bragg cell 711. The controller may be in electrical communication with a processor 729 via a connection 731. The sources may be activated in sequence according to the timing plots 735, 736, 737, 738 as indicated by the signals 740, 745, 746, 747, producing a sequence of patterns having different spectra. In some embodiments, the pattern produced by the Bragg cell may be changed completely in the amount of time it takes the acoustic wave to fully propagate across the radiation beam 751, henceforth referred to as the acousto-optic access time, corresponding to the interval between each of the vertical dotted lines 744, 741, 742, and 743. In some embodiments, one source may be active during each acousto-optic access time as shown. Plot 739 illustrates a corresponding drive signal waveform 748 that changes once during each acousto-optic access time. The radiation pattern may be changed entirely during each acousto-optic access time by synchronously pulsing each radiation source and changing drive signal. Momentary activation, or pulsing, may be needed to stop the motion of the radiation pattern due to the propagating acoustic wave within the Bragg cell 711. The duration of the pulses 740, 745, 746, 747 applied to the radiation sources may be such that the propagation distance of the acoustic wave during the activation time is less than the minimum resolvable feature size in the traveling acoustic wave. Furthermore, the time delay of the pulse relative to the driving signal used to generate the acoustic wave may determine the angular position, or shift, of the radiation pattern. For example, radiation pattern 717 may be projected by activating the radiation source with spectrum $\lambda_1$ and driving the Bragg cell 711 with the portion of the drive signal 748 to the left of the line 744, and radiation pattern 718 may be projected by activating the radiation source with spectrum $\lambda_2$ and driving the Bragg cell 711 with the portion of the drive signal 748 between lines 744 and 741. Similarly, other radiation patterns may be projected by activating radiation sources with other spectra and changing the Bragg cell drive signal 748. The radiation pattern may also be changed by changing the Bragg cell drive signal 748 without changing the active radiation source. Furthermore, if it is only necessary to slightly shift a radiation pattern between the activation of each radiation source, the delay between the radiation source pulses may be much shorter than the acoustic access time, making it possible to project multiple shifted patterns in a matter of nanoseconds as in the system of FIG. 8 below for example. Merely by way of example, a drive signal 748 comprising two frequencies may be used to produce sinusoidal radiation patterns such as 717 and 718. However, many other kinds of radiation patterns may be produced by using other drive signals, including periodic and nonperiodic patterns, as well as patterns that vary continuously or that vary with discrete steps.

The multiple channel imaging system 702 may collect the radiation emitted from the object 712 in response to the projected radiation patterns 717 and 718 and any other projected radiation patterns. A location 714 lies on the surface of the object 712, and object radiations 720 produced from this location may be collected by an optical subsystem 722 that may comprise an imaging lens. A beam splitting element, which may be a dispersive element such as a grating 723, may then direct the image 725 of the location 714 towards a specific region of an imaging detector array 728 depending on the spectrum of the object radiations. The directed object radiations may comprise the first order diffracted radiations from the grating, while the zero order radiation 726 may be blocked by a stop 727. For example, object radiations emitted from location 714 due to the projected pattern 717 at spectrum $\lambda_1$ may be directed onto the detector array along a distinct path 724 with respect to object radiations due to patterns with different spectra. The image of location 714 illuminated by spectrum $\lambda_1$ may lie at a point 725 on the imaging detector array, while images of location 714 illuminated by other spectra may lie at other points on the detector array. The dispersive element 723 may alternatively be placed before the imaging subsystem 722. Also, the dispersive element may direct images of different spectra to different discrete imaging arrays rather than to different areas of a single imaging array. If a single imaging array 728 is used, the activation of the various radiation sources 703 via their respective drive signals 740, 745, 746, 747 and the corresponding variations in the Bragg cell drive signal 748 may occur on a time scale shorter than the integration time of the imaging array 728 in order to collect images of all projected patterns in a single acquisition event. The imaging array may be in electrical communication via connection 750 with a processor 729, which may process the data collected by the detector array in order to estimate the location 714, as in the method of FIG. 6, merely by way of example. Other locations on the object 712 may be estimated in parallel using additional detector elements in each region of the detector array. The processor may then compute a three-dimensional representation of the object surface which may be displayed on a monitor 730 or other display device.

It should be apparent to those skilled in the art that FIG. 7 represents just one of many possible embodiments of the invention. Another traveling-wave spatial modulator, such as a reflective surface acoustic wave (SAW) device, may be used instead of the Bragg cell 711 to generate the patterns in substantially the same way as described above. Alternatively, a liquid crystal (LC) device, a digital micromirror device (DMD), a micro-electro-mechanical system (MEMS) array, a photorefractive crystal, or any other reconfigurable spatial radiation modulator may be used instead of the Bragg cell 711 for modulating the radiation to form radiation patterns. The spatial modulator may spatially modulate the amplitude, phase, or polarization of the first radiations 751. The radiation patterns may be formed by interference, diffraction, or by imaging a modulating structure onto the object scene. The drive signals 748 for the modulating device may be other periodic or nonperiodic functions than those shown. Instead of synchronously modulating the amplitude of the radiation sources, it may be possible to modulate the spectrum, polarization, or even coherence of the first radiations in time, thereby modulating the diffraction efficiency spatial modulator 711. Alternatively, a shuttering device may be placed before or after the spatial modulator to attain the illumination strobing effect. In some embodiments, the stroboscopic radiation pattern generation may be synchronized to a periodically-moving object 712 such as a vibrating drum or a rotating turbine in order to stop or substantially slow down its apparent motion relative to the radiation pattern and measure one or more locations on its surface.

The projected patterns may be periodic or nonperiodic, vary continuously or with discrete steps, and may vary in amplitude, phase, or polarization. In some embodiments diffraction orders other than the $1^{st}$ diffraction orders may be used to form the patterns. For example, to achieve better diffraction efficiency, an radiation pattern may be generated by interfering a $1^{st}$ diffraction order with a portion of the $0^{th}$ diffraction order. Moreover, the spatial modulator 711 may modulate the incident first radiation 751 along one or more dimensions. For example, two dimensional patterns may be produced using a two-dimensional acousto-optic Bragg cell, which may also be an existing commercially-available device, in substantially the same way as with the one-dimensional Bragg cell described above.

The patterns may be separated by polarization instead of or in addition to their spectra. In this case, the radiation sources may have different polarizations. The beam combining elements 708 and beam splitting elements 723 may include dispersive elements such as gratings or prisms, or may include spectrum or polarization selective beam splitters. Furthermore, spectral or polarization filters may be used to filter the radiation sources and may be used to separate images by spectrum or polarization instead of the dispersive element 723. The filters may be variable, including but not limited to mechanical filter wheels, acousto-optic tunable filters, rotating gratings. The dispersive beam combining and splitting elements may also be reconfigurable devices such as Bragg cells, surface acoustic wave devices, or MEMS arrays such as a grating light valve (GLV). If reconfigurable devices are used, then it is not necessary for the sources to have different spectra, and the radiation 720 from the location 714 may be redirected along different paths based on timing rather than based on spectrum. In another embodiment, the radiation sources may be derived from a single source with a variable spectrum, such as a tunable laser. In this case, the dispersive element 708 may not be necessary since each spectrum may be produced at a common location and travel along a common path. A variable spectrum source may be used with either a static or reconfigurable element in place of the illustrated grating 723. In the illustrated system 700, an arrangement of anamorphic prisms 710 may be used to compress the input first radiation beam in one dimension so that it intercepts primarily the main lobe of the acoustic radiation pattern, thereby reducing the effect of acoustic diffraction on the uniformity of the diffracted radiation. In some embodiments one or more gratings, cylindrical lenses, or cylindrical mirrors may be used instead of the anamorphic prisms. Lenses 706 and 719 are illustrated merely by way of a simple example. Instead, other optical systems may be used including but not limited to lenses, mirrors, gratings, beam splitters, prisms, or filters.

Figure 8:
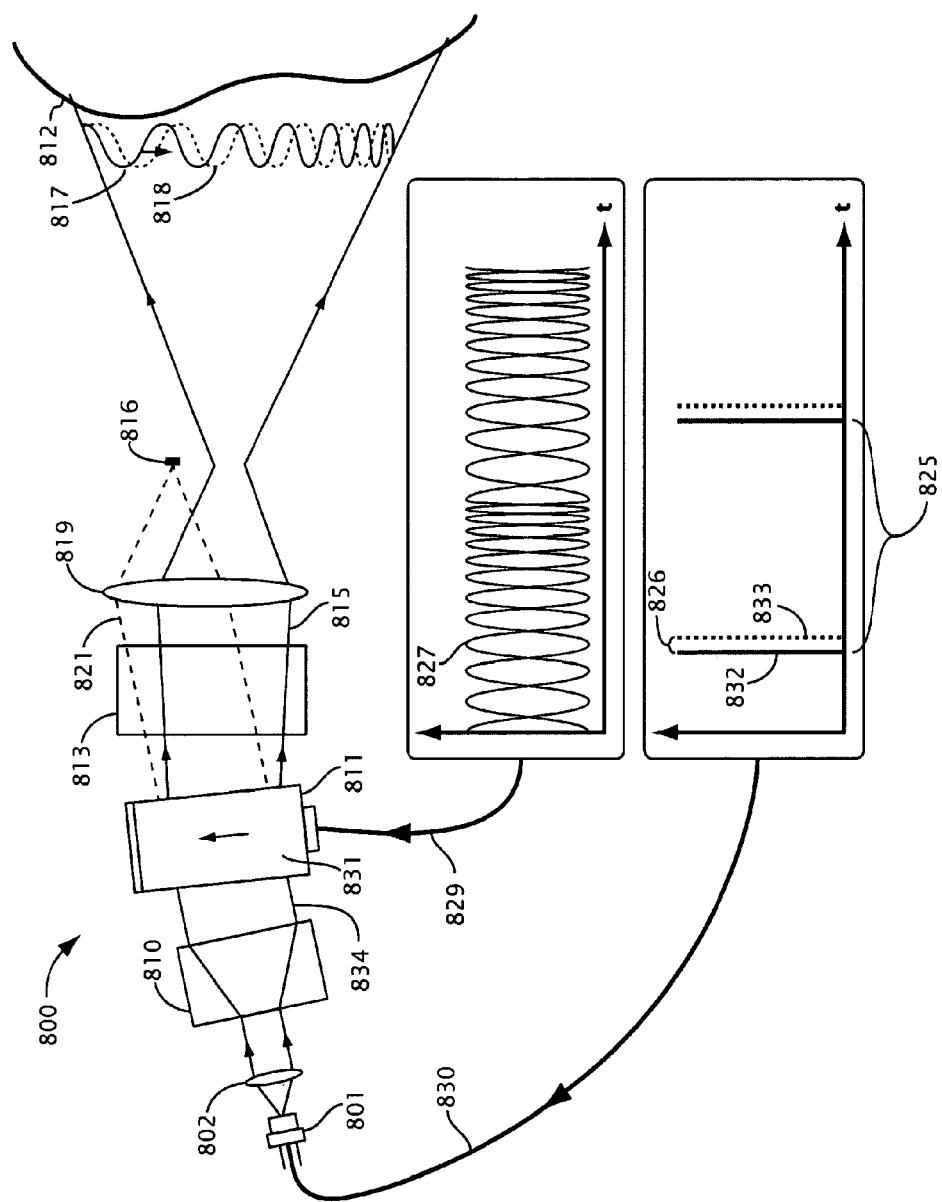
FIG. 8 illustrates an acousto-optic non-periodic pattern projection system, in accordance with various embodiments.

FIG. 8 illustrates an acousto-optic pattern projection system 800 for projecting non-periodic radiation patterns in accordance with various embodiments. The system 800 may be used with multiple synchronized illumination sources and a multiple-channel imaging system, as in the system of FIG. 7 above for example, and may be used with a locating algorithm based on shifted patterns, such as the method of FIG. 9 below for example, to provide a high-speed multiple channel locating system, potentially enabling three dimensional surface measurement on nanosecond timescales.

The system 800 may be based on an acousto-optic Bragg cell 811. A Bragg cell may be an existing commercially-available device that may include an electrically driven acoustic transducer bonded to an optical crystal. An electrical waveform 829 driving the transducer may produce an acoustic pressure wave 831 moving through the crystal at the velocity of sound. The acoustic pressure wave 831 may create a phase perturbation within the crystal via the photoelastic effect, which may spatially modulate a beam of radiation 834 passing through the crystal. Merely by way of example, the radiation may be provided by a radiation source 801, such as a laser, LED, or another source of coherent or incoherent radiation. Multiple radiation sources, as in the system of FIG. 7 above for example, may also be used. The radiation 834 emitted by the source 801 may be collimated by a lens 802 and shaped by an anamorphic beam shaper 810 to compress the radiation. A complementary beam shaper 813 may be positioned at the output of the Bragg cell to expand the output radiation. The spatial modulation in the Bragg cell causes the radiation beam to diffract. The driving signal 829 may comprise a combination of frequencies to produce a combination of diffracted 1st order radiation beams 815 along with other order beams including a 0th order beam 821. The 0th order beam may be blocked by a stop 816. When made to interfere using a lens 819 or another optical system, the 1st order diffracted radiation beams may produce a radiation pattern 817 at the object 812. The spatial frequency spectrum of the radiation pattern 817 may be substantially an autocorrelation of the power spectrum of the driving signal 829. Furthermore, the number of resolvable features in the radiation pattern may be determined approximately by the time-bandwidth product of the Bragg cell, which may be as high as several thousand, depending on the design of the Bragg cell.

In some embodiments, merely by way of example, an electronic double-sided chirp waveform 827, comprising two frequencies varying in opposite directions with time, may be used to produce a chirped radiation pattern 817 having a spatially-varying period. However, many other kinds of radiation patterns may be produced by using other drive signals, including periodic and non-periodic patterns, as well as patterns that vary continuously or that vary with discrete steps. The drive signal 829 may be synthesized using a digital waveform generator or a direct digital synthesis (DDS) integrated circuit with very high precision and repeatability, thereby producing patterns with a typical relative phase accuracy of one part in $10^4$ and a typical relative frequency accuracy of one part in $10^9$, merely by way of example. In order to stop the motion of the radiation pattern due to the propagating acoustic wave 831 within the Bragg cell 811, the radiation source may modulated in amplitude or pulsed momentarily using a coordinated control signal 830 during the time it takes the acoustic wave to fully propagate across the radiation beam 834, henceforth referred to as the acoustic access time. The waveform 827 may be periodic with a period longer than the acoustic access time. The duration of the pulse 832 applied to the radiation source may be such that the propagation distance of the acoustic wave during the activation time is less than the minimum resolvable feature size in the acoustic wave. The time delay of the pulse 832 relative to the driving signal 829 used to generate the acoustic wave may determine the angular position, or shift, of the radiation pattern. By pulsing the source periodically with a time delay 825 equal to the acoustic access time, which is typically several microseconds, a stationary radiation pattern 817 may be projected. The synchronous strobing of the radiation source combined with electronic programming of the acoustic waveform makes it possible to produce a variety of radiation patterns with very high speed and precision. Moreover, shifted radiation patterns 818 may be produced in quick succession by modulating the amplitude of the radiation source with one or more additional pulses 833 each delayed with respect to the first pulse 832 by a time 826 shorter than the acoustic access time, making it possible to shift non-periodic patterns in a matter of nanoseconds. In a system utilizing multiple sources with different spectra, as in the system of FIG. 7 above for example, the sources may be pulsed sequentially to provide multiple shifted patterns, each with a different spectrum. A multiple-channel imaging system, as in the system of FIG. 7 above for example, may be used to acquire separate images illuminated by each pattern in parallel during a single integration time.

In some embodiments, the radiation source 801 may be a pulsed laser diode designed to output high optical power in short bursts—for example, outputting 30 Watts with a 0.1% duty cycle. In some other embodiments, the radiation source may be broadband or may have a spectral distribution. The acoustic perturbation in the Bragg cell may be considered as a traveling volume phase grating and the system may be considered as a common-path grating interferometer, where the acoustic beat pattern is essentially imaged onto the scene. As a result, the scaling of the projected pattern may be substantially independent of wavelength, making it possible to use a broadband radiation source. In this case, some wavelengths in the spectral distribution of the source may be diffracted with lower efficiency than other wavelengths due to wavelength-dependent Bragg phase mismatch, however the Bragg cell may be designed to diffract a large portion of the visible spectrum with high efficiency, producing a "white-light" interference pattern. Furthermore, due to the common-path configuration, it is possible to use an extended radiation source such as an LED that may be spatially incoherent or partially coherent to generate broadband interference patterns. In this case, some incident angles in the partially-coherent incident wavefront 834 may be diffracted with lower efficiency than other incident angles due to angle-dependent Bragg phase mismatch, however the Bragg cell and the collimation optical system 802 may be designed so that a substantial portion of the emitted radiation 834 is diffracted. Merely by way of example, a Bragg cell with a time-bandwidth product of more than one thousand may be designed to diffract several percent of the light emitted by a "white" LED with an emission area measuring one square millimeter. Using an LED may be advantageous not only because these devices may be available at low cost, with high average power outputs (up to several Watts), and with a wide selection of emission spectra, but also because the resulting incoherent radiation patterns do not produce coherent artifacts such as speckle, a significant source of noise in three-dimensional locating and surface measurement techniques using coherent illumination.

Figure 9:
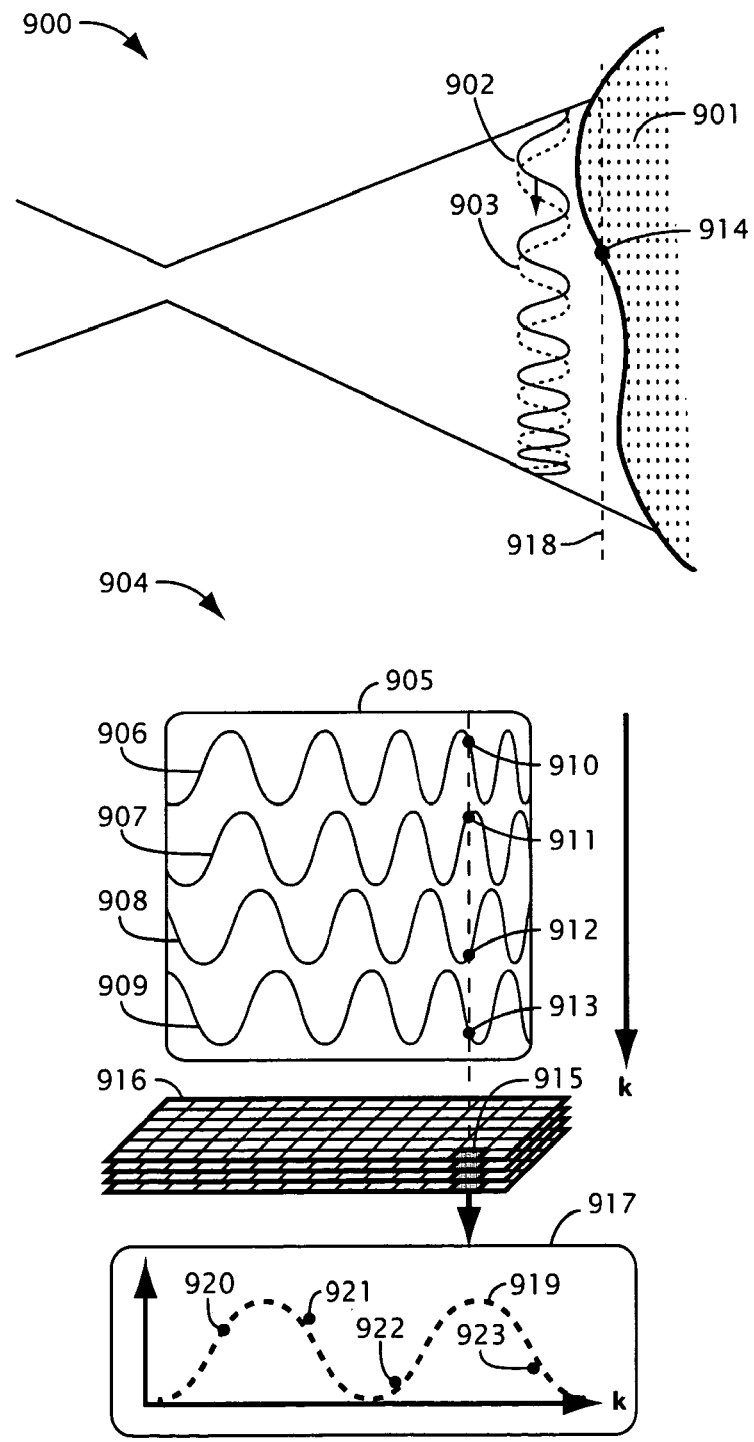
FIG. 9 illustrates an alternate method for estimating the illumination angle using shifted chirp patterns, in accordance with various embodiments.

It should be apparent to those skilled in the art that FIG. 8 represents just one of many possible embodiments of the invention. In the illustrated system 800, an arrangement of anamorphic prisms 810 may be used to compress the input radiation beam in one dimension so that it intercepts primarily the main lobe of the acoustic radiation pattern, thereby reducing the effect of acoustic diffraction on the uniformity of the diffracted radiation. In some embodiments, a grating, a cylindrical lens, or a cylindrical mirror may be used instead of the anamorphic prisms. Lenses 802 and 819 are illustrated merely by way of a simple example. Instead, other optical systems may be used including but not limited to lenses, mirrors, gratings, beam splitters, prisms, or filters. Furthermore, other traveling-wave spatial modulators, such as a reflective surface acoustic wave (SAW) device, may be used instead of the Bragg cell to generate the patterns in substantially the same way as described above. In some embodiments diffraction orders other than the $1^{st}$ diffraction orders may be used to form the patterns. For example, to achieve better diffraction efficiency, a radiation pattern may be generated by interfering a $1^{st}$ diffraction order with a portion of the $0^{th}$ diffraction order and strobing the radiation source synchronously with the drive signal. Moreover, the spatial modulator 811 may modulate the incident radiation 834 along one or more dimensions. For example, two dimensional patterns may be produced using a two-dimensional acousto-optic Bragg cell, which may also be an existing commercially-available device, in substantially the same way as with the one-dimensional Bragg cell described above. Non-periodic patterns produced with the acousto-optic pattern projection system 800 may be used with various locating methods, including but not limited to the methods described in FIG. 9, FIG. 10, and FIG. 11, below FIG. 9 illustrates an alternate method 904 for estimating the illumination angle compared to the angle estimation method 603 of FIG. 6 in a multiple-channel locating system 900 wherein the object 901 is illuminated with shifted swept-period chirp patterns 902, 903 as in the system 800 of FIG. 8, for example. Box 905 shows plots 906, 907, 908, and 909 of values that may be measured by a row of detector elements, such as those of imaging system 602 of FIG. 6, for example, when a planar object 918 is illuminated by the shifted chirp patterns 902, 903. Radiations from the object due to each sinusoidal pattern may be imaged simultaneously by different detector arrays, such as detector arrays 620 and 623 of FIG. 6, or different sub-arrays of a single detector array, or may be imaged sequentially using a single detector array. The processor, such as processor 636 of FIG. 6, may assemble the resulting image data arrays into a data array stack 916, wherein each element 915 may be a record of measured values 910, 911, 912, 913 for each location 914 in the scene. The shifted chirp patterns may also be chosen such that the measured values 920, 921, 922, 923 in the measurement record 915 for each location 914 on the object vary substantially sinusoidally, as illustrated in box 917. The period and phase of the variation may correspond to the illumination angle, as defined for the system of FIG. 6. As in the method 603 of FIG. 6, for each location on the object 914, the processor may compute the illumination angle with fine resolution by estimating the phase of the sinusoidal variation 919 for each record 915. However, this computation may result in angle ambiguity due to the repetitive dependence of phase on the illumination angle. To resolve such angle ambiguities, the processor may estimate the period of the sinusoidal variation for each record 915 thereby computing the illumination angle with coarse resolution but without said periodic dependence. In this method, the angular resolution may be limited by the local period of the chirped radiation patterns and the accuracy of phase estimation in the presence of measurement noise. Furthermore, the variation of the period across the chirped pattern may be kept small enough so that every measured angle may be disambiguated and so that the measured values 920, 921, 922, 923 in each record 915 vary substantially sinusoidally. Merely by way of example, the fractional change of the period across the chirped pattern may be approximately the inverse of the number of chirp oscillations across the pattern. The processor may estimate the phase and frequency for each record 915 using a variety of methods, including but not limited to constrained function fitting algorithms, Fourier transform methods, Hilbert transform methods, as well as analytical trigonometric methods. Furthermore, the mapping between measured values and illumination angle may be pre-computed and stored in a lookup table, making possible real-time three-dimensional surface measurement and reconstruction.

It should be apparent to those skilled in the art that FIG. 6 represents just one of many possible embodiments of the invention. The number of patterns and the number of corresponding measured values, k, may be less than or greater than the four shown. The illustrated angle estimation method 904 may be used with many other pattern projection and imaging systems besides those illustrated in FIG. 6 or FIG. 8. The angle estimation method may also be used with chirped patterns varying along multiple directions. For example, the shifted chirped patterns may vary radially rather than varying within an illumination plane. In this case, the location on the object may be constrained to a cone of directions about the illumination axis by applying this method 904 rather than to a plane of directions as in the case of shifted chirped patterns varying in one dimension. A triangulation algorithm may be used to constrain the location on the object further. Alternatively, each shifted chirp pattern may comprise multiple chirped components, each component varying along a different direction. In this case, Fourier analysis of the measured values for each location on the object may be used to estimate the phase and period corresponding to each direction of variation, and may thereby constrain the location on the object to a single direction from the pattern divergence location.

Figure 10:
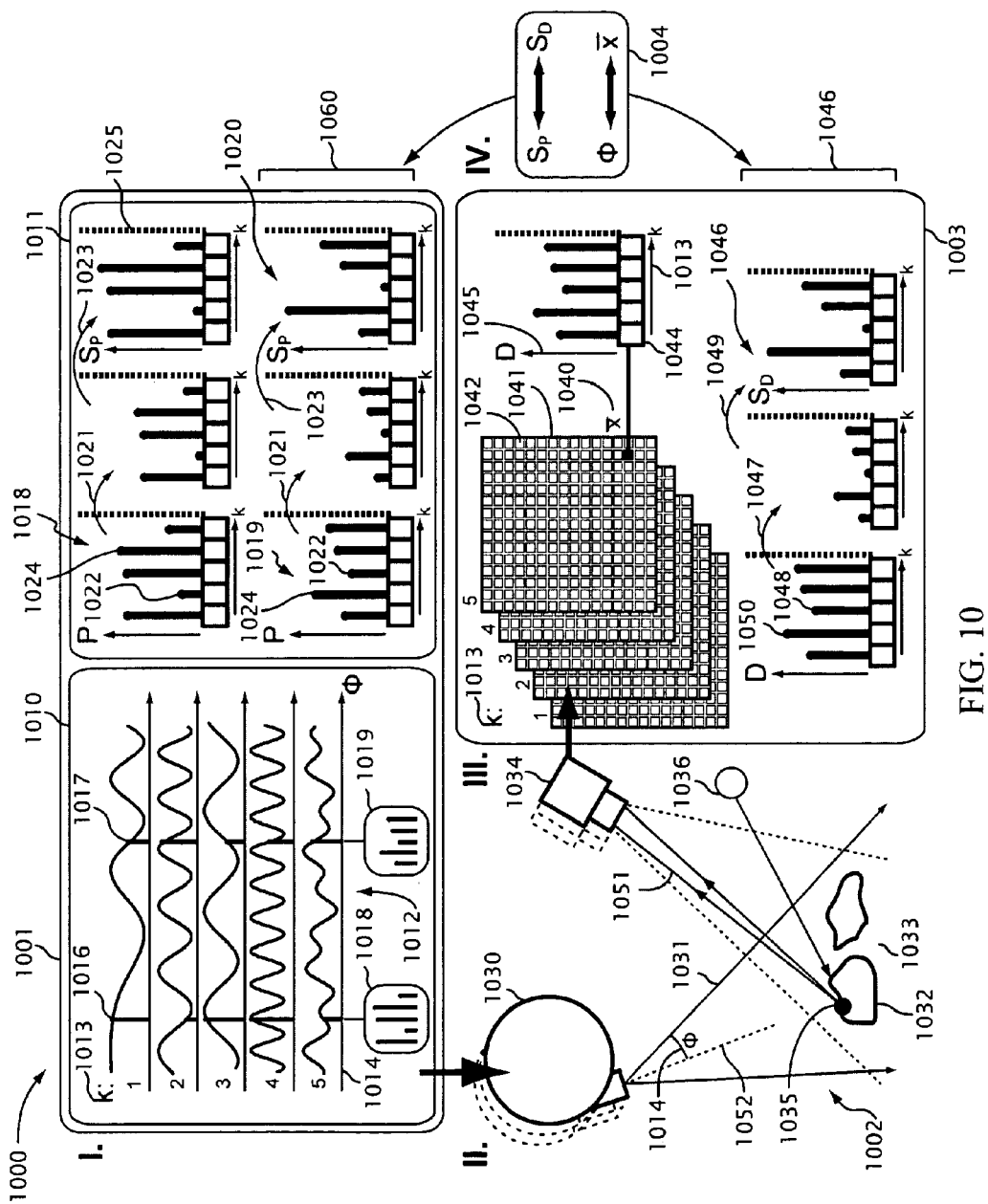
FIG. 10 illustrates a method for estimating the illumination angle by illumination pattern symbol encoding and decoding, in accordance with various embodiments.

FIG. 10 illustrates a multiple-channel differential encoding and decoding method 1000 in accordance with various embodiments, which can be used in a multiple-channel locating system 1002 or the other systems of FIGS. 1-9. The pattern encoding process 1001 may provide a set patterns 1012, which may be projected by a multiple-channel projection system 1030 within the system 1002 and may illuminate an object 1032. A location 1035 on the object may produce object radiations 1051 in response to the illumination 1031 which may be collected by a multiple-channel detection system 1034 and fed to a decoding step 1003 which may map the measured values 1044 to a detection symbol 1046. According to the method 1000 described herein, a correspondence 1004 may be found between the detector location 1040 and the illumination angle 1014 as measured from the illumination axis 1052. The correspondence 1004 between the detector location 1040 and illumination angle 1014 may be used within a triangulation algorithm to determine the location 1035 on the object 1032 in three dimensions. Furthermore, the method 1000 may be applied to reconstruct a surface of the object in three dimensions by estimating multiple locations on the object in parallel using different detector elements of the multiple-channel detection system.

In the method 1000 shown, merely by way of example, the patterns 1012 may consist of five one-dimensional patterns varying as a function of the illumination angle 1014. However, the patterns may be more or less than five in number, may be periodic or non-periodic, may vary in amplitude, phase, and/or polarization, and may vary along one or more directions. Each pattern may be henceforth referred to as a channel or a channel number 1013. The collection of patterns comprising all illumination angles and all channels is defined as the illumination pattern set 1010. The illumination pattern set across all channels for a single angle 1016 and 1017 is henceforth referred to as an illumination vector 1018 and 1019. The illumination vector as a function of the illumination angle $\Phi$ is expressed herein as $P(\Phi)$. As a part of the encoding process 1001, each illumination vector 1018 and 1019 may be mapped using a mapping process 1011 to an offset-independent and scale-independent vector henceforth referred to as an illumination symbol 1020. In the method 1000 shown, this mapping process may include the step 1021 of subtracting a minimum value 1022 from each value in the illumination vector 1018 and 1019. This step may remove any offset in the illumination vector common to all vector elements. Furthermore, the mapping process may include the step 1023 of dividing all values resulting from the first step by the difference between a maximum value 1024 and a minimum value 1022. This step may remove any scale factor that may be common to all elements of the illumination vector and may produce an illumination symbol 1020 for each illumination angle 1014. This illumination symbol 1020, Sp, may be expressed as a function of the illumination angle 1014:

$$\overline{S}_P(\Phi, \overline{x}) = \frac{\overline{P}(\Phi) - \min[\overline{P}(\Phi)]}{\max[\overline{P}(\Phi)] - \min[\overline{P}(\Phi)]}.$$

In this method 1000 the illumination pattern set 1010 may be chosen such that no illumination symbol is repeated for a given set of resolvable illumination angles 1014 and a given number of resolvable value levels 1025. For greater angular range and/or resolution of the illumination, the number of resolvable value levels 1025 or the number of channels 1013 may need to be increased to produce a non-redundant illumination pattern set 1010.

In some embodiments, a multiple-channel projector 1030 may illuminate an object 1032 within a measurement volume 1033 containing multiple disjoint surfaces with an illumination pattern set 1010. In this method 1000, the pattern may vary as a function of the illumination angle 1014 and each location on the object 1035 may produce a response to the incident portion of the illumination pattern set. The object may not respond uniformly to the radiation due to shading, angle, and/or texture that varies with location. Furthermore, object radiations 1051 produced in response to the illumination may vary with the location of the detector array element 1042, the illumination angle 1014, and relative object surface orientation. In addition, the object may be illuminated by another source 1036 or the object itself may emit radiation. Moreover, the illumination 1031 itself may have a variable intensity and offset due to effects including but not limited to intensity falloff with distance, non-uniformity across the illumination field, loss of contrast from defocus, or diffraction artifacts and interference pattern visibility in the case of coherent illumination. The object radiations 1051 received by the detector system may therefore have an absolute scaling and offset and may be represented mathematically as:

$$\overline{U}(\Phi, \vec{\chi}) = A_O(\Phi, \vec{\chi})\overline{P}_O(\Phi) + B_O(\Phi, \vec{\chi})$$

where $A_O$ represents the absolute scaling of the received radiation intensity, $B_O$ represents the intensity offset, and the vector $\vec{\chi}$ represents the location of the detector. The offset and scaling factors, which be unknown a priori, may be removed when the measured values 1044 from the detector are mapped to a detection symbol 1046, as described below.

The multiple-channel detector system 1034 may collect radiations from the object 1032. In some embodiments, object radiations 1051 received by the detection system 1034 from a location 1035 on the object 1032 produced in response to the illumination 1031 may be represented by the value of a single pixel 1042 in each of multiple recorded images 1041 of the scene. The record of measured pixel values for each location 1035 on the object is henceforth referred to as the measured value vector 1044. The values 1045 within this measured value vector 1044 may also include variations of the detector gain and bias. The measured value vector may be represented mathematically as:

$$\overline{D}(\Phi, \vec{\chi}) = A(\Phi, \vec{\chi})\overline{P}(\Phi) + B(\Phi, \vec{\chi})$$

where A and B may be written in terms of the offset and scaling vectors of the received object radiations, $A_o$, $B_O$, and the detector gain and offset vectors, $A_D$, $B_D$:

$$A(\Phi, \vec{\chi}) = A_D(\vec{\chi})A_O(\Phi, \vec{\chi})$$

$$B(\Phi, \vec{\chi}) = A_D(\vec{\chi})B_O(\Phi, \vec{\chi}) + B_D(\vec{\chi})$$

Note that it may be possible to compensate for the detector gain and offset by calibrating the detector system.

The measured value vector 1044 may be mapped to an offset-independent and scale-independent vector henceforth referred to as a detection symbol 1046. The mapping may be performed using the same mapping process 1011 used to generate the illumination symbols. This mapping process may include the step 1047 of subtracting a minimum value 1048 from each value in the measured value vector 1044 to remove any common offset. The mapping process may also include the step 1049 dividing all values resulting from the first step by the difference between a maximum value 1050 and a minimum value 1048 to remove any scale factor that may be common to all elements of the measured value vector. These steps may produce the detection symbol 1046, $S_D$, for each measured value vector and may be expressed mathematically by substituting the measured value vector into the illumination symbol calculation formula presented earlier:

$$\overline{S}_D(\Phi, \overline{x}) = \frac{A(\Phi, \overline{x})\overline{P}(\Phi) + B(\Phi, \overline{x}) - \min[A(\Phi, \overline{x})\overline{P}(\Phi) + B(\Phi, \overline{x})]}{\max[A(\Phi, \overline{x})\overline{P}(\Phi) + B(\Phi, \overline{x})] - \min[A(\Phi, \overline{x})\overline{P}(\Phi) + B(\Phi, \overline{x})]}$$

-continued $$= \frac{A(\Phi, \overline{x})\overline{P}(\Phi) - \min[A(\Phi, \overline{x})\overline{P}(\Phi)]}{\max[A(\Phi, \overline{x})\overline{P}(\Phi)] - \min[A(\Phi, \overline{x})\overline{P}(\Phi)]}$$

The detector gains and offsets or any scaling or offsets present in the object radiations 1051 may be cancelled to produce a scale-independent and offset-independent symbol:

$$\overline{S}_D(\Phi, \overline{x}) = \frac{\overline{P}(\Phi) - \min[\overline{P}(\Phi)]}{\max[\overline{P}(\Phi)] - \min[\overline{P}(\Phi)]}$$

Notice that the detection symbol is independent of. A correspondence between the illumination symbol and the detection symbol may be established by finding an illumination symbol in the illumination symbol set $S_P$, such that:

$$\overline{S}_D(\Phi, \overline{x}) = \frac{\overline{P}(\Phi) - \min[\overline{P}(\Phi)]}{\max[\overline{P}(\Phi)] - \min[\overline{P}(\Phi)]}$$

$$= \overline{S}_P(\Phi)$$

In a realizable system, however, the correspondence may not be exact due to the presence of noise, nonlinear distortions in the pattern projection 1030 and/or detection 1034 systems, and/or other effects. For such systems, the correspondence 1004 may be found by searching for the closest illumination symbol to the detection symbol within the illumination symbol set. In some embodiments, the search for the closest symbol may be accomplished by finding the smallest vector norm of the vector difference between the detection symbol 1046 and each of the illumination symbols. Once the symbol correspondence is established for a location on the object, the illumination angle for this location may be determined from the one-to-one map of illumination angles and illumination symbols established as described earlier. The each location on the object may then be estimated from the corresponding illumination angle, the position of the corresponding detector element or elements and the known positions and orientations of the pattern projection and detection systems using geometric triangulation as described for the system of FIG. 6 above for example. Furthermore, one or more of the processing steps may be pre-computed for a variety of measurement values or symbol vector values and stored in a lookup table, which may be rapidly accessed to estimate object locations as they are being measured, making possible real-time three-dimensional locating and object surface measurement.

It should be apparent to those skilled in the art that FIG. 10 represents just one of many possible embodiments of the method 1000 described herein. Other embodiments may use more or fewer patterns and may utilize different patterns than the patterns 1012 illustrated. In some embodiments one or more illumination symbols may be repeated within an illumination symbol set and may allow greater freedom in other design constraints, potentially at the expense of added ambiguity in the correspondence between a detection symbol and an illumination angle. In some embodiments, the correspondence between illumination symbols and detection symbols may be unambiguous only for specific locations or regions of interest on the object or in the three-dimensional scene. Furthermore, in some embodiments other techniques 1011 for mapping illumination vectors and measured value vectors to illumination and detection symbols, respectively, may be used provided that the resulting symbols 1020 are substantially independent of absolute offset and scaling and a correspondence between the symbols may be established.

Other embodiments of the method 1000 may utilize other kinds of locating systems 1002 and patterns 1031, including but not limited to those of FIGS. 1-8 above and FIG. 12 below. In some embodiments, the multiple-channel pattern projector 1030 and the multiple-channel detector system 1034 may be replaced with a single channel pattern projector and a single channel detector system, the radiation patterns and the resulting images may be produced sequentially, and the channels 1013 may represent moments in time. In some embodiments, the detection system 1034 may comprise multiple detectors at disparate spatial locations and the object radiations 1051 may be received from multiple directions. The illumination angle may be encoded in the spatially-varying intensity, amplitude, and/or phase of the illumination. Furthermore, the method 1000 may be utilized with coherent, incoherent, or partially coherent illumination.

In some embodiments the illumination pattern set 1010 may be directly measured at multiple locations in an illuminated scene as part of a calibration step. This direct measurement makes it possible to compensate for nonlinear distortions of the illumination pattern set 1010 due to the pattern projection system. The measured illumination pattern set allows the encoding step 1001 to test for unique illumination symbols in the presence of nonlinear projector distortions. In addition, the illumination symbols 1020 mapped from the measured illumination pattern may be stored and used as a calibrated set of illumination symbols 1020 which can be used to find a correspondence 1004 between the detection symbol 1046 and an illumination symbol 1060.

Figure 11:
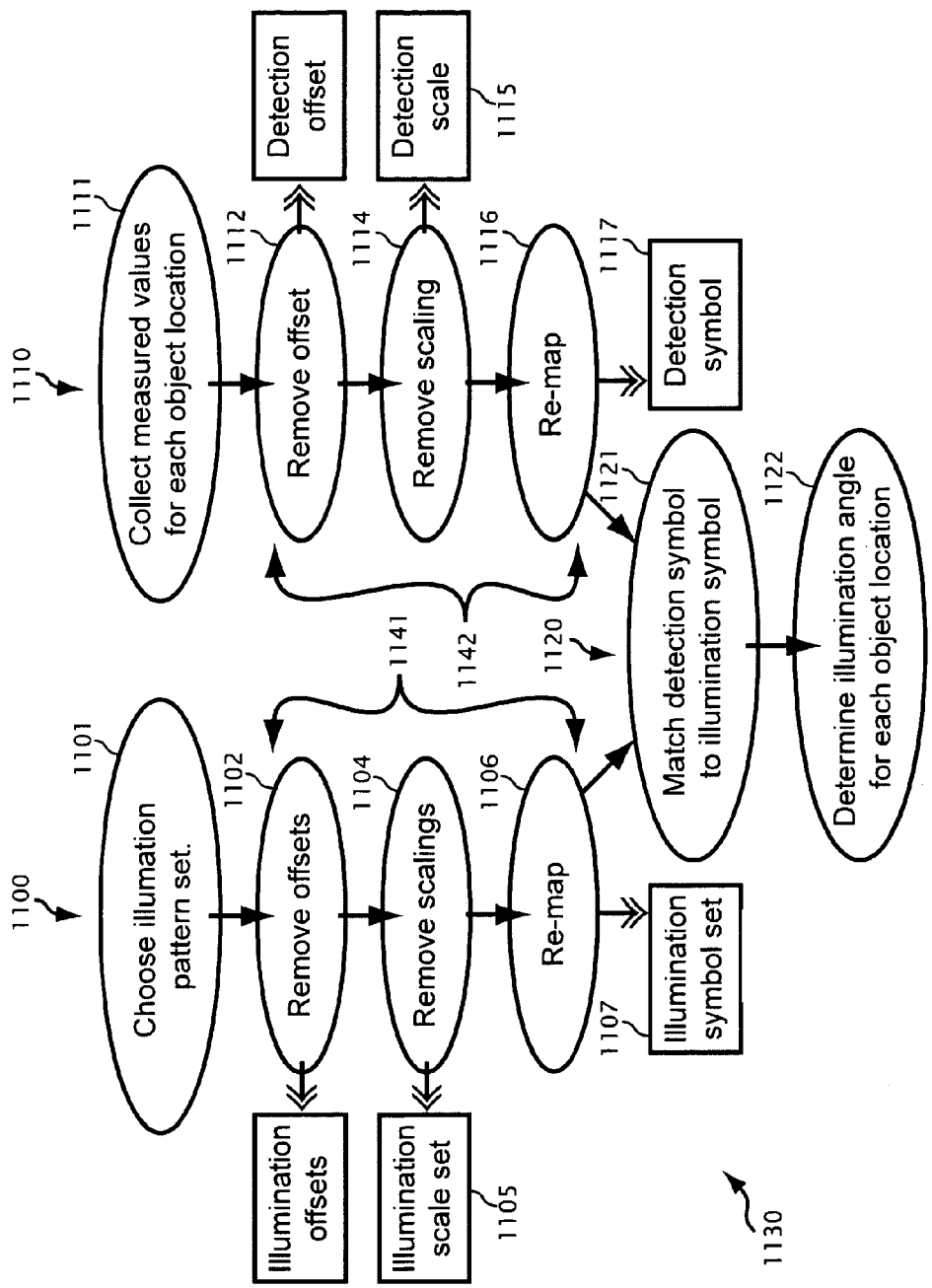
FIG. 11 illustrates a flow chart of a method for estimating the illumination angle by illumination pattern symbol encoding and decoding, in accordance with various embodiments.

FIG. 11 illustrates a multiple-channel differential encoding and decoding method 1130 in accordance with various embodiments, which may be used in conjunction with multiple-channel locating systems such as those illustrated in FIGS. 1-9 and 12 or in conjunction with other pattern projection and image collection systems. The method 1130 may be comprised of steps that may be organized into three branches: an illumination encoding branch 1100, a measurement encoding branch 1110, and a decoding branch 1120. The illumination encoding branch 1100 may be performed during system calibration while the measurement encoding branch 1110 may be performed for every measured value vector 1044 in FIG. 10. The method 1130 may be used to determine the illumination angle 1014 in FIG. 10 corresponding to the location 1035 on the surface of the object 1032. Once this angle has been determined, it may be used by a triangulation algorithm to estimate the three dimensional coordinates of the location 1035 on the object. Furthermore, the method 1130 may be applied to reconstruct a surface of the object in three dimensions by estimating multiple locations on the object in parallel using different detector elements of the multiple-channel system.

Within method 1130, one set of processes may be repeated in both the illumination encoding branch 1100 and the measurement encoding branch 1110. This set of processes is referred to herein as the illumination vector encoding calculation 1141 and detection vector encoding calculation 1142. The input to the vector encoding calculations 1141 and 1142 is called the source vector, which may be either an illumination vector such as 1018 and 1019 in FIG. 10 from the illumination pattern set 1010 in FIG. 10 or the measured value vector 1044 in FIG. 10. The output from the vector encoding calculations 1141 and 1142 is the symbol, which may be either an illumination symbol 1020 in FIG. 10 or a detection symbol 1046 in FIG. 10. The vector encoding calculations 1141 and 1142 may contain three processes: offset removal process 1102 or 1112, amplitude scale removal process 1104 or 1114, and re-mapping process 1106 or 1116.

The offset removal process 1102 or 1112 may remove any constant added value, or offset, which may be common to all values of the source vector. There may be two components to the process; one may produce an offset-free vector $G_1$ and the other produces an offset-free value $G_2$. One or both of the offset-free vector and the offset-free value may be used in the vector encoding calculations 1141 and 1142. In one embodiment, an offset-free vector $G_1$ may be created by subtracting the minimum value from the source vector. Other example embodiments of the offset-free vector may be expressed mathematically as follows, merely by way of example:

$$\overline{G}_{1A}(\overline{V}) = \overline{M}_A \overline{V},$$

$$\overline{G}_{1B}(\overline{V}) = \overline{M}_B[\overline{V} - M_C(\overline{V})]$$

where the vector V is the source vector and subscripts A and B denote two variations. The first variant A is a differential calculation. The matrix $M_A$ has two or more nonzero elements in each row, has linearly independent rows, and exhibits the property that the sum of all elements in every row is zero. The product of such a matrix $M_A$ with any source vector will be an offset-free vector. The second variant B takes the difference between the vector V and the result of an operation $M_C$ on the elements of a vector V. $M_C$ may be an operation including, but not limited to, a mean, a minimum, a maximum, a median, an average, or a standard deviation. As long as $M_C$ does not scale or distort the offset value, the difference may produce an offset-free vector. The matrix $M_B$ maps the result to another vector space.

An offset-free value may be calculated by subtracting the minimum value of the illumination vector from the maximum value of the illumination vector. Other variations of the offset-free value may include the following, merely by way of example:

$$G_{2A}(\overline{V}) = \overline{M}_D \cdot \overline{G}_1(\overline{V}),$$

$$G_{2B}(\overline{V}) = M_{C1}(\overline{V}) - M_{C2}(\overline{V})$$

where subscripts A and B denote the following variations. The first variant A is the inner product between a vector $M_D$ having at least one nonzero value and an offset-free vector $G_1$, so the result is an offset-free value.

The second variant B takes the difference between two different types of offset-preserving operations $M_C$ on the elements of a vector V. Each operation type is denoted by a subscript, 1 or 2, and the difference removes the offset common to the two operations.

After the offset-free vector and offset-free value have been found in the offset removal process 1102, 1112, any constant multiplication factor, referred to herein as the scale, may be removed in the scale removal process 1104, 1114. In some embodiments, this may be done by dividing the offset-free vector $G_1$ by the offset-free value $G_2$. The result may be an offset-independent, scale-independent vector.

After generating an offset-independent and scale-independent illumination vector, some embodiments may adjust the values of the vector within the re-mapping process 1106. This may be done by applying an additional re-mapping function of the offset-independent, scale-independent vector values to form the final illumination symbol 1107. The re-mapping function may be injective across the domain of offset-independent, scale-independent vector values, resulting in a substantially unique illumination symbol 1107 for each illumination angle when the offset-independent, scale-independent vector for each illumination angle is sufficiently unique.

After generating an offset-independent and scale-independent detection vector, some embodiments may adjust the values of the vector within the re-mapping process 1116, This may be done by applying an additional re-mapping function of the offset-independent, scale-independent vector values to form the final illumination symbol 1117. The re-mapping function may be injective across the domain of offset-independent, scale-independent vector values, resulting in a substantially unique detection symbol 1117 for each object location.

After performing offset removal process such as 1102 or 1112, amplitude scale removal process such as 1104 or 1114, and re-mapping process 1106 or 1116 in the vector encoding calculations 1141 and 1142, the symbol may be represented as follows in some embodiments:

$$\overline{S}_V(\overline{V}) = H\left[\frac{\overline{G}_1(\overline{V})}{\overline{G}_2(\overline{V})}\right]$$

where H is the re-mapping function applied to each element in the vector in the re-mapping step. This particular embodiment of the vector encoding calculations 1141 and 1142 may be insensitive to the linear distortions of radiation patterns caused by the apparatus and object of a multiple-channel locating system. The re-mapping function may include, but is not limited to, an arctangent, an inversion, or a polynomial. The symbol may be generated in both the illumination encoding branch 1100 and the measurement encoding branch 1110, as discussed in the following paragraphs.

The first process 1101 in the illumination encoding branch 1100 may be a choice of an illumination pattern set 1010 in FIG. 10. The illumination pattern set may be chosen such that each illumination angle 1016, 1017 in FIG. 10 may be uniquely represented by an illumination symbol within the illumination symbol set 1107. The illumination encoding branch 1100 may then calculate the illumination symbol set 1107 from the illumination patternradiation pattern set 1010 in FIG. 10 by performing the vector encoding calculation 1141 on every illumination vector 1044 in FIG. 10 in the illumination pattern set 1010 in FIG. 10. The illumination coding branch may need to be performed as often as the choice of illumination symbol set 1107 varies. In one alternate embodiment, the illumination coding branch 1100 may be performed during the algorithm assembly process. In another embodiment, the illumination coding branch 1100 may be performed regularly in order to update the illumination symbol set. In some embodiments, the illumination coding branch may be performed repeatedly for constant or varying illumination symbol sets.

The first process 1111 in the measurement encoding branch may be used to collect measured data arrays 1041 in FIG. 10 and to compile a measured value vector 1044 in FIG. 10 for each registered data array element. The measured value vector 1044 in FIG. 10 may be processed by the vector encoding calculation 1142 to produce the detection symbol 1117. Notice that the measurement encoding branch 1110 may calculate a single detection symbol 1117 while the illumination encoding branch 110 may calculate multiple illumination symbols 1107. In addition, the measurement encoding branch 1110 may need to be performed for every measured value vector 1044 in FIG. 10, while the illumination encoding branch 1100 may not.

Each detection symbol 1117 may be matched to a unique illumination symbol in the decoding branch 1120. The decoding branch 1120 may begin with a symbol matching process 1121. In some embodiments, the symbol matching process 1120 may start by finding the vector norm value of the vector difference between the detection symbol 1117 and one illumination symbol in the illumination symbol set 1107. This vector norm calculation may be repeated once for every illumination symbol in the illumination symbol set 1107. These norm values may be used as a measure of the vector separation between the detection symbol and all possible illumination symbols. The minimum norm value may indicate which two symbols are most closely related, and therefore may be used to indicate which illumination symbol corresponds to the detection symbol. This symbol correspondence is the output of the symbol matching process 1121. Because each illumination symbol may be unique, the angle matching process 1122 may use the symbol correspondence to establish a correspondence between a detecting direction and the illumination angle. The detecting direction and the illumination angle may then be used by a triangulation algorithm to estimate the three dimensional coordinates of the location on the object. Furthermore, one or more of the processing steps may be pre-computed for a variety of measurement values or symbol vector values and stored in a lookup table, which may be rapidly accessed to estimate object locations as they are being measured, making possible real-time three-dimensional locating and object surface measurement.

In some embodiments, the method 1130 may calculate the relative object scaling, the relative object offset, or the relative object phase shift. In 3D imaging systems, this information may be used to shade the object or isolate the external lighting. As an example, consider the amplitude scaling. Once the detecting direction and the illumination angle correspondence is found, a process may find the stored detection scale 1115 and the stored illumination scale set 1105 value for the corresponding illumination angle. A second process may then take the ratio of the detection scale 1115 and the stored illumination scale value in order to produce the relative object shading.

In some embodiments, the choice of radiation pattern process 1101 may be performed through an iterative design process which may be driven by an evaluation of the illumination symbol set 1107. In an alternate embodiment, the choice of illumination pattern process 1101 may build the illumination pattern set 1010 in FIG. 10 one pattern at a time; the selection of each additional pattern may be driven by the evaluation of the illumination symbol set 1107. In one embodiment, the choice of illumination pattern set 1107 may be pre-determined or fixed. In another embodiment, the choice of illumination pattern set 1107 may be driven by an evaluation of other parameters including, but not limited to, the detection fidelity, one or more properties of the object, or a prior estimate of a plurality of three dimensional locations on the object.

In some embodiments, the method 1130 may be adapted to work with systems that encode patterns into the illumination field amplitude, the illumination intensity, the illumination phase, the illumination polarization, or a combination thereof. The method 1130 may be applied as described herein for both illumination field amplitude systems and intensity systems. An adaptation of this method 1130 may be applied for phase-only systems when the vector encoding calculations 1141 and 1142 include an offset phase removal step in place of steps 1102 and 1112, respectively that accounts for phase wrapping and may exclude scale removal steps 1104 and 1114, respectively when the if the object response is linear. An adaptation of this method 1130 may be applied to phase-and-amplitude combination systems when the vector encoding calculation 1141 or 1142 accounts for the amplitude offset, the amplitude scaling, and the phase offset in the presence of phase wrapping.

Figure 12:
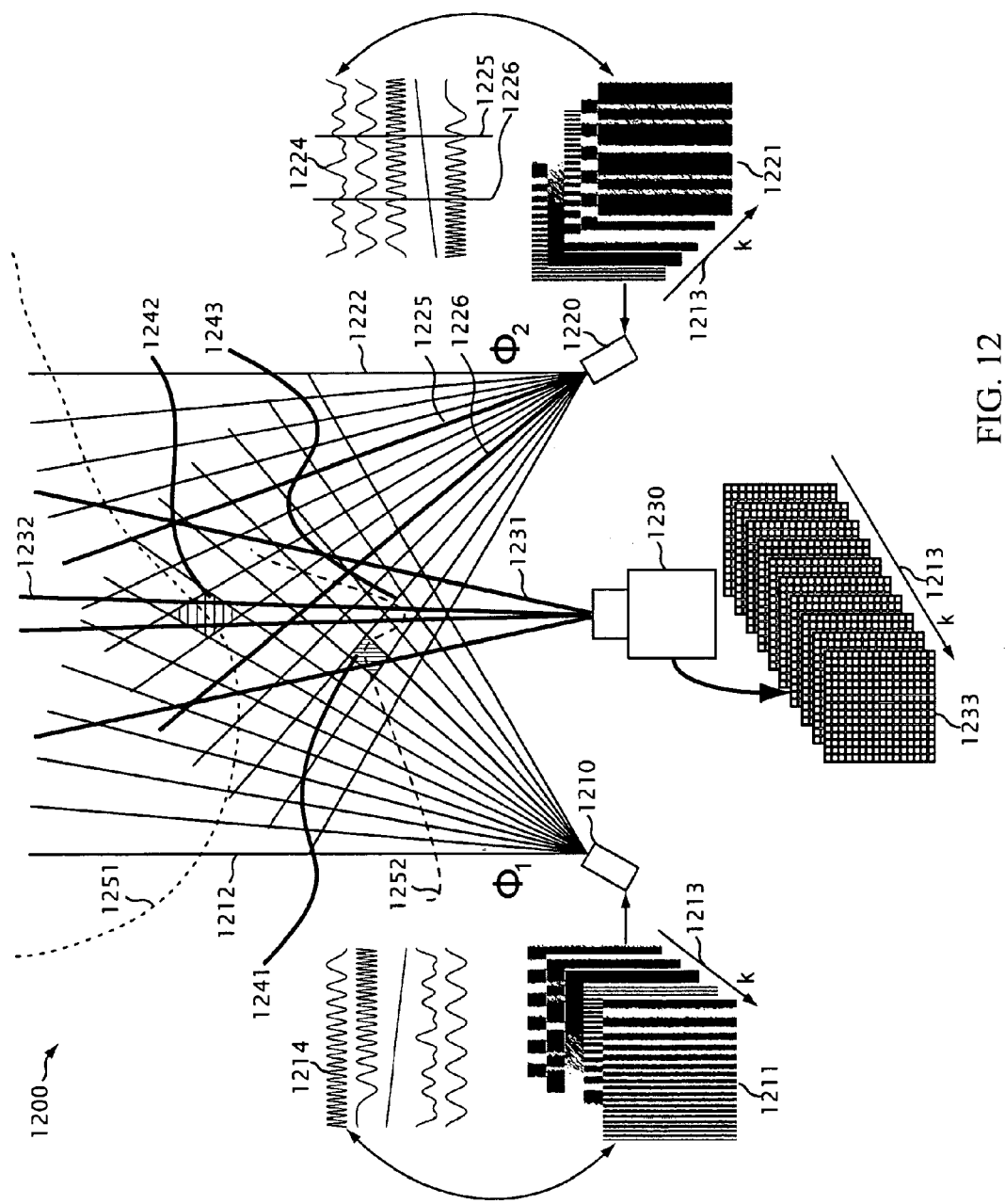
FIG. 12 illustrates a multiple-channel locating system utilizing multiple pattern projectors to illuminate the scene with spatially-coded projection patterns which may be used to measure multiple surfaces at different depths in three dimensions, in accordance with various embodiments.

FIG. 12 illustrates a multiple channel locating system 1200 utilizing multiple projectors in accordance with various embodiments. The system 1200 may include two or more multiple-channel projectors such as 1210 and 1220 along with one or more multiple-channel imaging system 1230. In some embodiments, multiple-channel projectors 1210,1220 may emit a two-dimensional illumination pattern set 1211, 1221 that may vary substantially across an illumination angle $\Phi_1$ 1212, $\Phi_2$ 1222 and that may be described by several pattern cross-sections such as 1214, 1224. The multiple-channel imaging system 1230 may be a CCD but other embodiments may include multiple-channel imaging systems as described in FIG. 1 through FIG. 9. In some embodiments, projectors such as 1210, 1220 may emit a illumination pattern set 1211, 1221 respectively such that each projector utilizes a distinct, non-overlapping group of channels. These groups of channels may be clustered or interspersed. The imaging system may collect object radiations from multiple locations on an object across multiple channels 1233 for both illumination pattern sets. The following paragraphs describe how various embodiments of this system may be used to form three-dimensional surface images. These systems may enable mitigation of shadowing effects and the ability to record three-dimensional images of objects with multiple semi-transparent surfaces.

To illustrate mitigation of shadowing, an example object surface 1252 is shown where illumination from a projector 1220 may be blocked from one or more locations 1241 on the object. This effect is called shadowing, and it may result in a three-dimensional surface image with missing features. In some embodiments, locations on the object may be determined where the channels 1213 from multiple-channel projectors such as 1210 and 1220 may be distinct and may be collected by a multiple-channel imaging system 1230. In one embodiment, locations on the object within the field of view 1231 may be illuminated by at least one of the projectors 1210, 1220 to prevent shadowing. Projectors 1210 and 1220 may emit illumination pattern sets 1211 and 1221 at distinct groups of channels 1213. The object response to each projector 1210, 1220 may be separated by the multiple-channel imaging system 1230. For example, the systems and methods of FIG. 6, FIG. 9, FIG. 10, and/or FIG. 11 may be used to form distinct surface images of the object—one surface image using the channels of the first projector 1210 and one surface image using the channels of the second projector 1220. The two distinct surface images may be combined into a single shadow-free surface image.

As another example, a second object surface 1251 is shown behind surface 1252. Surface 1252 may be partially transparent. The multiple-channel imaging system 1230 may collect radiations from a narrow field of view 1232. The first projector 1210 may emit a illumination pattern set across all illumination angles 1212 such that the object response from region 1242 and 1243 may be superimposed at the imaging system 1230. The resulting measured value vector 1044 in FIG. 10 may be described as a superposition of two measured value vectors, while another example object embodiment with more than two surfaces may be described as the superposition of multiple measured value vectors. A superposition of multiple measured value vectors may be referred to herein as a composite vector. In some embodiments, the illumination pattern set such as 1211 or 1221 may be chosen such that a linear transform of the composite vector may be used to extract multiple measured value vectors. As an example, the swept frequency pattern 902 described in FIG. 9 above may result in a superposition of sinusoidal measured value vectors for a multiple-surface object; these may be extracted using a Fourier decomposition of the composite vector. In other embodiments of the pattern, the type of superimposed measured value vector may be an orthogonal vector set that may be extracted from the illumination pattern set such as 1211 or 1221 using a Gram-Schmidt orthonormalization process. In another embodiment, the illumination pattern set may be chosen such that deterministic calculations among the values of a compound vector can uniquely extract each measured value vector. In yet another embodiment with a sufficient number of channels 1213 and for an appropriate illumination pattern set, iterative methods including independent component analysis may be used to extract each measured value vector from the composite vector. Algorithms such as those described in FIG. 6, FIG. 9, FIG. 10, and/or FIG. 11 above for example may use each extracted measured value vector to estimate a single illumination angle. Processes such as triangulation may then calculate the three-dimensional surface location at both locations 1242 and 1243. When repeated for multiple locations on the object, this method may form surface images of the object. This multiple-projector, multiple-channel method may be used for objects with multiple overlapping, semi-transparent surfaces.

In some embodiments of system 1200, the second projector 1220 may be constructed from one of the projector embodiments as in FIG. 1, FIG. 2, FIG. 3, FIG. 5 and/or FIG. 6 above, for example. These projector embodiments may include a set of parallel radiation pattern channels. In some embodiments, the parallel illumination channels may be chosen so that distinct groups of channels correspond to different spans of illumination angle. The interface between adjacent groups of channels such as 1225 and 1226 may be clearly delineated or may use gradual transitions. With such a system, the object response due to the back object surface 1251 may fall in a different group of channels than the object response from the front object surface 1252. Collected radiations from the narrow object span 1232 may then fall into two distinct groups of channels within a multiple-channel imaging system 1230. In such an embodiment, the multiple-channels may communicate illumination angle by both the group of channels and by the multiple-channel illumination pattern set. Each group of channels may indicate the rough illumination angle 1222 between the two regions delineated by the second interface 1226. Each measured value set within the two groups of channels may be processed independently using algorithms described in FIG. 6, FIG. 9, FIG. 10, and/or FIG. 11 above for example or some other algorithm to extract the fine illumination angle resolution. By using the illumination angles and the detecting direction in a process such as a triangulation algorithm, the system may determine the three-dimensional coordinates of the locations 1242 and 1243. When repeated for multiple locations on the object, this method may form surface images of the object. This multiple-projector, multiple-channel method may be used for objects with multiple overlapping, semi-transparent surfaces.

Figure 13:
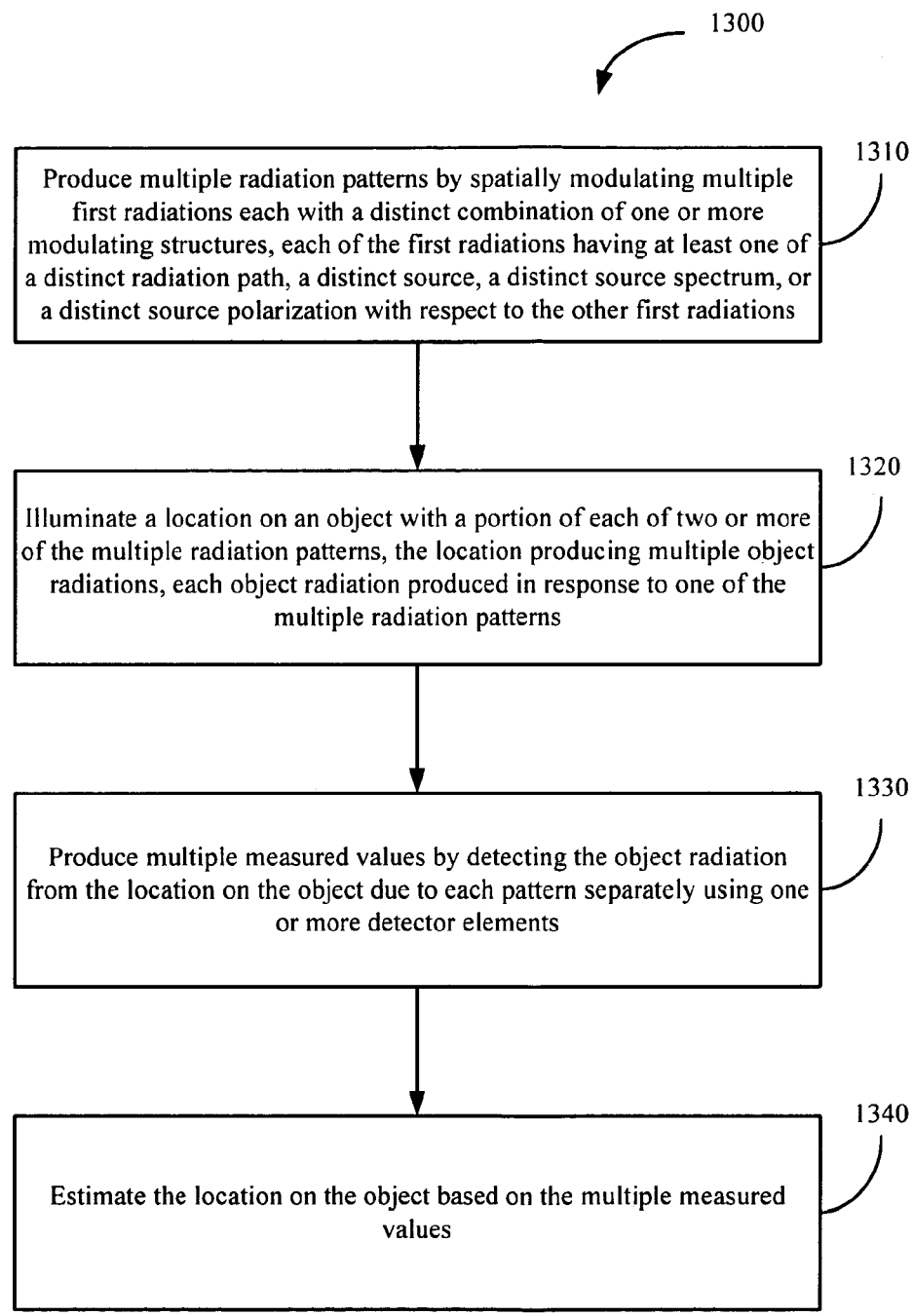
FIG. 13 is a flowchart of estimating a location on an object in a three-dimensional scene, in accordance with various embodiments.

FIG. 13 is a flow chart illustrating a method 1300 of estimating a location on an object in a three-dimensional scene. The method 1300 may, for example, be performed in whole or in part within the systems of FIGS. 1-8 and may be reflected in the methods described within FIGS. 6 and 9-12. Further aspects and additional embodiments of method 1300 may be more thoroughly discussed within the description provided within these systems and methods and are thus not necessarily repeated here.

At block 1310, multiple radiation patterns are produced by spatially modulating multiple first radiations with a distinct combination of one or more modulating structures, each of the first radiations having at least one of a distinct radiation path, a distinct source, a distinct source spectrum, or a distinct source polarization with respect to the other first radiations. In some embodiments, at least one of the first radiations comprises a distinct portion of a radiation field with respect to at least one of the other first radiations. In some embodiments, at least one of the first radiations has at least one of a distinct spectrum or a distinct polarization with respect to at least one of the other first radiations. In some embodiments, at least one of the first radiations has a spectral distribution. In some embodiments, at least one of the first radiations is partially spatially coherent. In some embodiments, at least two of the first radiations are generated sequentially by varying at least one of a spectrum or a polarization of a single radiation source. In some embodiments, at least two of the first radiations are generated by altering a path of one or more portions of radiation from a single radiation source. In some embodiments, at least one of the first radiations may be directed onto at least one of the modulating structures using at least one of a dispersive element or a polarization-selective element.

In some embodiments, the multiple first radiations are produced by multiple distinct radiation sources. At least one of the multiple radiation sources may have at least one of distinct spectrum or a distinct polarization with respect to at least one of the other radiation sources. The multiple distinct radiation sources may includes multiple elements of at least one of an array of laser diodes or an array of light emitting diodes. In some embodiments, the multiple distinct radiation sources may include multiple elements of an array of waveguide outputs. In some embodiments, the waveguide outputs may be elements of a flexible optical waveguide array radiation channel and the modulating structures include an array of at least one of a diffractive element or a pattern mask modulating the first radiations from the waveguide outputs at the end of the flexible waveguide array radiation channel to produce the multiple radiation patterns. The flexible waveguide array radiation channel may be part of an endoscope.

In some embodiments, each of the modulating structures spatially modulates at least one of an amplitude, a phase, or a polarization of one or more of the first radiation. In some embodiments, at least one of the modulating structures includes a diffractive element. In some embodiments, at least one of the modulating structures is reflective. In some embodiments, the multiple modulating structures include multiple elements of an array of structures. The multiple modulating structures may include one or more multiple layer structures. In some embodiments, at least one of the modulating structures may vary in time.

In some embodiments, the modulating structures may include a hologram. In some embodiments, at least one of the first radiations may illuminate the hologram from a distinct direction with respect to at least one other first radiation illuminating the hologram. At least one of the first radiations illuminating the hologram may have at least one of a distinct spectrum or a distinct polarization with respect to at least one other first radiation illuminating the hologram.

In some embodiments, at least one of the modulating structures comprises a propagating acoustic perturbation in an acousto-optic device. In some embodiments, at least one of the first radiations has a spectral distribution. In some embodiments, at least one of the first radiations is partially spatially coherent. In some embodiments, at least one of the modulating structures comprises a reconfigurable pattern in at least one of a liquid crystal array or a digital micromirror device array.

At block 1320, the location on the object is illuminated with a portion of each of two or more of the multiple radiation patterns, the location producing multiple object radiations, each object radiation produced in response to one of the multiple radiation patterns. In some embodiments, at least two of the radiation patterns illuminate the object in sequence. The sequential illumination may be effected by controlling at least one of a radiation source, one or more of the modulating structures, or a shuttering device.

In some embodiments, at least one of an amplitude, a position, a scaling, or an orientation of one or more of the radiation patterns varies in time. The at least one of the amplitude, the position, the scaling, or the orientation variation in time of the one or more of the radiation patterns may be substantially correlated with at least one of a motion, a scaling, a change in orientation, or a change in the illumination response of the object In some embodiments, each of at least one of the radiation patterns has at least one of a distinct spectrum or a distinct polarization with respect to at least one of the other radiation patterns. The at least one of the distinct spectrum or the distinct polarization of a radiation pattern may be due to at least one of a radiation source, a filter, a dispersive element, or one or more of the modulating structures. At least one of the distinct spectrum or the distinct polarization may vary in time.

At block 1330, multiple measured values are produced by detecting the object radiations from the location on the object due to each pattern separately using one or more detector elements. In some embodiments, the object radiations from the location on the object in response to the illumination are detected by a plurality of detector elements, each detector element belonging to one of a plurality of detector arrays, each detector array recording an image of the object. In some embodiments, at least two of the detector arrays record images of the object in sequence. The sequential recording may be effected by electronically controlling the start time and duration of radiation integration for each said detector array. In some embodiments, the sequential recording is effected by modulating the amplitude of the object radiations by each said detector array using a shuttering device. The shuttering device may comprise a liquid crystal device.

In some embodiments, each of at least two of the detector arrays records an image of the object, the image having at least one of a distinct spectrum or distinct polarization with respect to the other recorded images. The at least one of distinct spectrum or distinct polarization of the image may be due to a filter filtering object radiation by the detector array. The filter may comprise a liquid crystal device. In some embodiments, the at least one of the distinct spectrum or the distinct polarization of the image is due to a dispersive element dispersing object radiation. In some embodiments, the at least one of the distinct spectrum or the distinct polarization of the image is varied in time.

At block 1340, the location on the object is estimated based on the multiple measured values. In some embodiments, the radiation patterns are directed at the object substantially along an illumination axis, vary substantially periodically along a direction that is substantially orthogonal to the illumination axis, and have distinct spatial frequencies along said direction. Estimating the location on the object based on the plurality of measured values includes the estimating a periodic function from the plurality of measured values; estimating with coarse angular resolution, using a frequency of the periodic function, an illumination angle between the illumination axis and a direction from a known location on the illumination axis to the location on the object geometrically projected onto an illumination plane, the illumination plane including the direction of pattern variation and the illumination axis; estimating the illumination angle with fine angular resolution using a phase of the periodic function, the fine resolution estimate having an ambiguous angular offset; and resolving the ambiguous angular offset using the coarse angular resolution estimate. The one or more detector elements may detect object radiations from the object directed substantially along an imaging axis and estimating the location on the object based on the plurality of measured values may further include estimating a locating direction from a known location on the imaging axis to the location on the object using the known location of the one or more detector elements and estimating the location on the object from the estimated illumination angle, the estimated location direction, and the known locations on the illumination and imaging axes by triangulation. In some embodiments, at least one of the radiation patterns varies along a plurality of directions. In some embodiments, at least one of the periodic radiation patterns is a Fourier component of a non-periodic radiation pattern.

In some embodiments, multiple locations on the object may be estimated based on the multiple measured values for each location. Some embodiments may include estimating a three dimensional surface of the object based on the multiple estimated locations.

Figure 14:
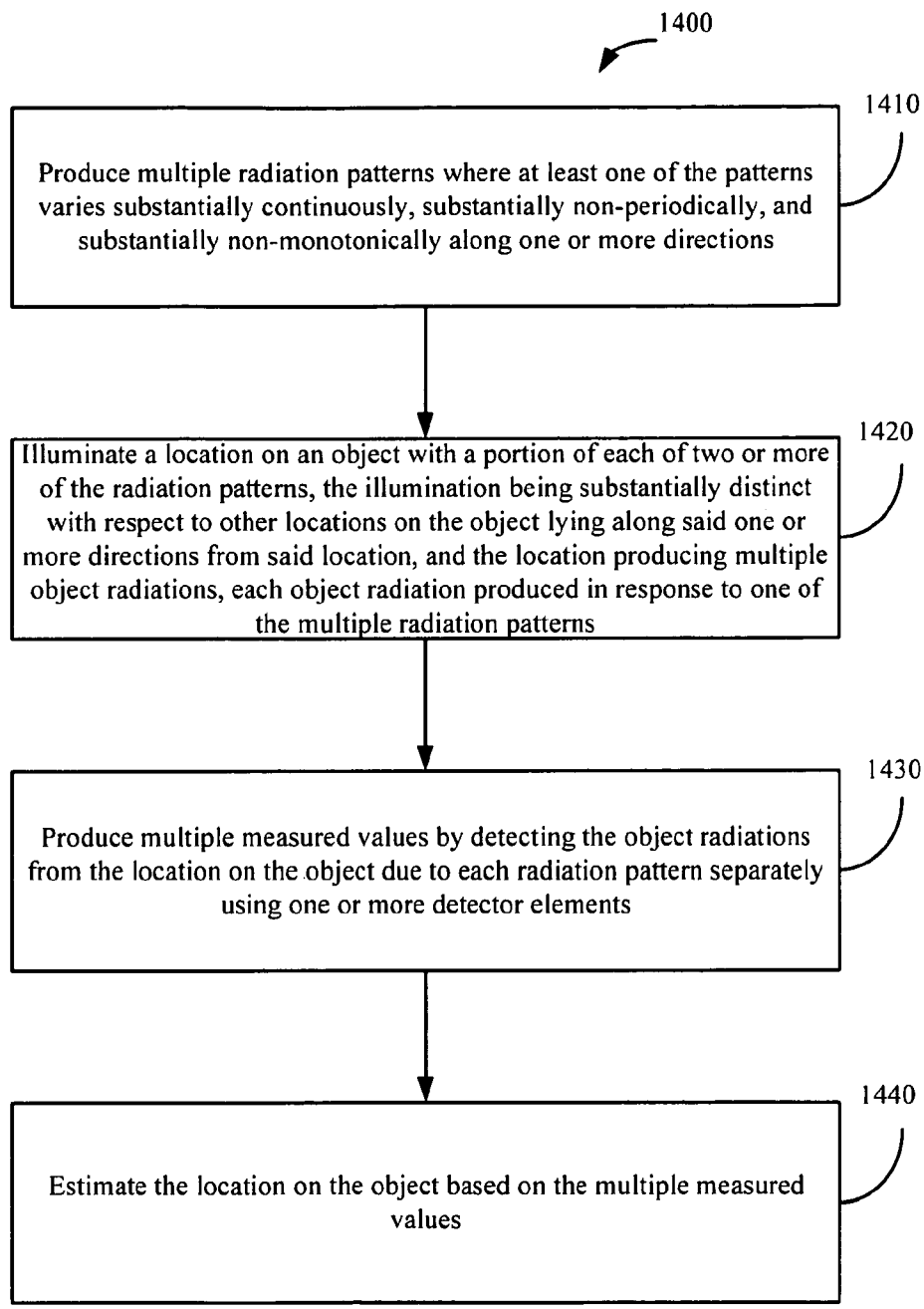
FIG. 14 is a flowchart of a method of estimating a location on an object in a three-dimensional scene, in accordance with various embodiments.

FIG. 14 is flow chart illustrating a method 1400 of estimating a location on an object in a three-dimensional scene. The method 1400 may, for example, be performed in whole or in part within the systems of FIGS. 1-8 and may be reflected in the methods described within FIGS. 6 and 9-12. Further aspects and additional embodiments of method 1400 may be more thoroughly discussed within the description provided within these systems and other methods and are thus not necessarily repeated here.

At block 1410, multiple radiation patterns are produced, at least one of the patterns varying substantially continuously, substantially non-periodically, and substantially non-monotonically along one or more directions.

At block 1420, the location on the object is illuminated with a portion of each of two or more of the radiation patterns, the illumination being substantially distinct with respect to other locations on the object lying along said one or more directions from said location, and the location producing multiple object radiations, each object radiation produced in response to the one of the multiple radiation patterns.

At block 1430, multiple measured values are produced by detecting the object radiations from the location on the object due to each radiation pattern separately using one or more detector elements.

At block 1440, the location on the object is estimated based on the multiple measured values. In some embodiments, two or more of the patterns are produced by shifting a first pattern along one or more directions of pattern variation. The first pattern may have a spatially varying period along the shifting direction that is substantially orthogonal to an illumination axis, the two or more shifted patterns may be directed at the object substantially along the illumination axis, and estimating the location on the object may include estimating a periodic function from the plurality of measured values; estimating with coarse angular resolution, using a period of the periodic function, an illumination angle between the illumination axis and a direction from a known location on the illumination axis to the location on the object geometrically projected onto an illumination plane, the illumination plane including the direction of the period variation of the first pattern and the illumination axis; estimating with fine angular resolution the illumination angle using a phase of the periodic function, the fine resolution estimate having an ambiguous angular offset; and resolving the ambiguous angular offset using the coarse angular resolution estimate. In some embodiments, the one or more detector elements detect the object radiations from the object directed substantially along an imaging axis, and estimating the location on the object may further include estimating a locating direction from a known location on the imaging axis to the location on the object using a known location of the one or more detector elements and estimating the location on the object from the estimated illumination angle, the estimated locating direction, and the known locations on the illumination and imaging axes by triangulation. In some embodiments, at least one of the radiation patterns varies along a plurality of directions. In some embodiments, at least two of the multiple patterns illuminate the location on the object from substantially different directions, the illumination being substantially distinct with respect to other locations on the object lying along the one or more directions of pattern variation from said location. In some embodiments, estimating the location on the object includes using a lookup table.

In some embodiments, method 1400 may also include computing multiple illumination symbols in a locating symbol space from the multiple patterns, each illumination symbol corresponding to a distinct plurality of illumination values at a location in the scene with respect to other locations in the scene and being independent of an absolute scaling and an offset of the plurality of illumination values at said location in the scene. A detection symbol in the locating symbol space may be computed from the plurality of measured values, the detection symbol being independent of the absolute scaling and the offset of the measured values. A correspondence between the detection symbol and one of the illumination symbols in the locating symbol space may be established.

In some embodiments, two or more of the radiation patterns are directed at the object substantially along an illumination axis and vary in a direction that is substantially orthogonal to the illumination axis. Estimating the location on the object may further include the estimating from the correspondence between the detection symbol and the one of illumination symbols an illumination angle between the illumination axis and a direction from a known location on the illumination axis to the location on the object geometrically projected onto an illumination plane, the illumination plane including a direction of pattern variation and the illumination axis. In some embodiments, the one or more detector elements may detect object radiations from the object directed substantially along an imaging axis. Estimating the location on the object may further include estimating a locating direction from a known location on the imaging axis to the location on the object using the known location of the one or more detector elements and estimating the location on the object from the estimated illumination angle, the estimated locating direction, and the known locations on the illumination and imaging axes by triangulation.

In some embodiments, method 1400 may include measuring the multiple illuminations to produce multiple illumination values at each location of multiple locations in the scene to produce multiple illumination values. In some embodiments, the symbol computation includes computing a symbol vector from a source vector, the source vector comprising the measured values or the illumination values, by computing a ratio of a linear transform of the source vector and a linear combination of the source vector elements. In some embodiments, the symbol computation includes computing a symbol vector from a source vector, the source vector comprising the measured values or the illumination values, the symbol vector comprising a ratio of a difference between the source vector and one or more of the source vector elements and a linear combination of the linear source vector elements. In some embodiments, the locating symbol space maps to a linear vector space and the step of establishing a correspondence between the detection symbol and one of the illumination symbols includes computing for each illumination symbol the vector norm of the vector difference between the detection symbol and the illumination symbol and establishing the correspondence between the detection symbol and the illumination symbol used to compute the minimum vector norm of the computed vector norms.

In some embodiments, method 1400 may further comprise illuminating a propagating acoustic perturbation in an acousto-optic device to produce at least one of the multiple patterns. At least one of the acousto-optically generated patterns may be made substantially stationary during the detecting by varying the amplitude of the pattern in time. In some embodiments, the illumination illuminating the acoustic perturbation has a spectral distribution. In some embodiments, the illumination illuminating the acoustic perturbation is partially spatially coherent. In some embodiments, the multiple patterns includes a plurality of shifted patterns formed by at least one of illuminating the acousto-optic device with a sequence of radiation pulses or modulating the amplitude of radiation diffracted from the acousto-optic device with a sequence of pulses.

Figure 15:
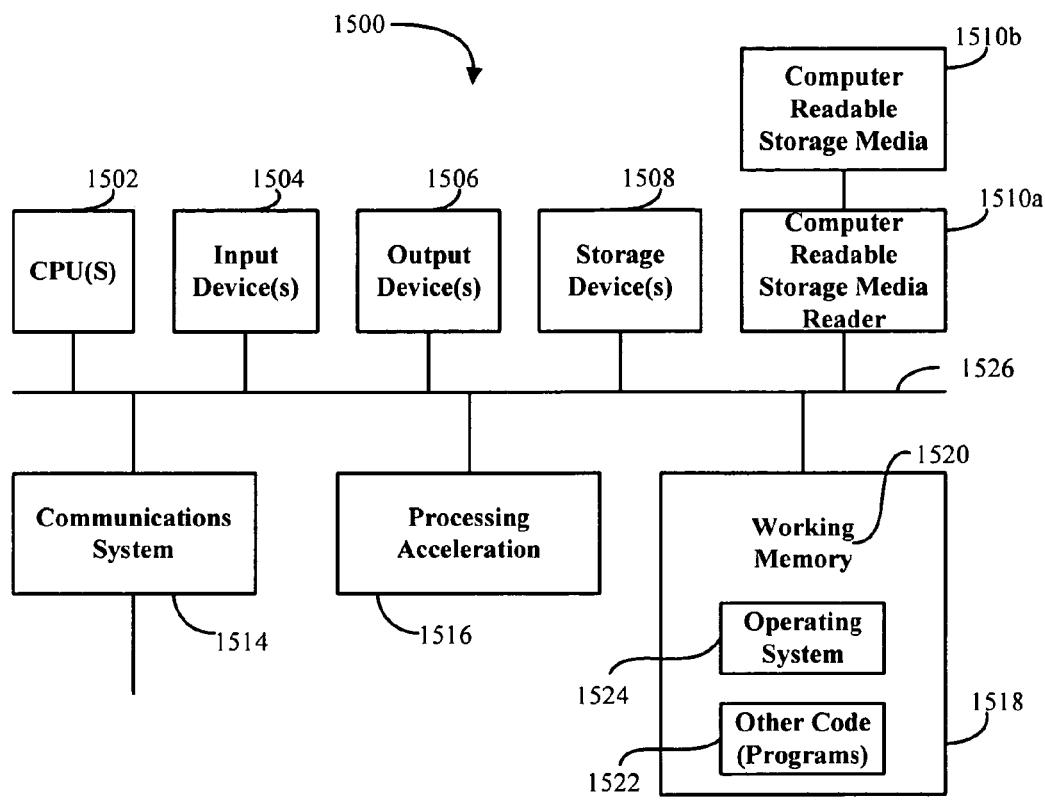
FIG. 15 is a schematic illustration of a computational device that may be used in part to implement multiple channel locating systems, apparatuses, and methods, in accordance with various embodiments.

The methods, apparatuses, and systems described in connection with FIGS. 1-14 may be implemented in part by using a computational device 1500 such as shown schematically in FIG. 15, which broadly illustrates how individual system elements may be implemented in a separated or more integrated manner. The device 1500 is shown comprised of hardware elements that may be electrically coupled via bus 1526. The hardware elements may include a processor 1502, an input device 1504, an output device 1506, a storage device 1508, a computer-readable storage media reader 1510a, a communications system 1514, a processing acceleration unit 1516 such as a DSP or special-purpose processor, and a memory 1518. The computer-readable storage media reader 1510a may be further connected to a computer-readable storage medium 1510b, the combination comprehensively representing remote, local, fixed, and/or removable storage devices plus storage media for temporarily and/or more permanently containing computer-readable information. The communications system 1514 may comprise a wired, wireless, modem, and/or other type of interfacing connection and permits data to be collected from the multiple channel locating systems. In some instances, such data collection may be performed in real time by the communications system. In some instances, merely by way of example, estimating the location on the object may include using a lookup table stored within the memory 1518, storage device 1508, on computer readable storage media 1510, and/or within storage elements embedded within the processor 1502 and/or processor acceleration unit 1516.

The device 1500 may also include software elements, shown as being currently located within working memory 1520, which may include an operating system 1524 and other code 1522, such as a program designed to implement methods of the invention. Merely by way of example, device 1500 may include processing code that may include instructions to estimate a location on an object based on multiple measured values, merely by way of example. Processing code may also be included to reconstruct, synthesize, display, and/or analyze images of the object. Code may also be included to control and/or to implement embodiments of different multiple channel location systems. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention, which is defined in the following claims.

What is claimed is:

1. A method for estimating coordinates of a location on an object in a 3D scene, the method comprising:
   producing one or more radiation patterns varying along at least two directions, wherein the one or more radiations patterns repeat along at least one direction from the at least two directions;
   calculating one or more illumination symbols based on the one or more radiation patterns;
   illuminating a region of the object with the one or more radiation patterns, wherein the region includes a plurality of locations that includes the location whose coordinates are to be estimated and wherein each illuminated location within the region produces one or more object radiations in response to the one or more radiation patterns;
   measuring at least a portion of the one or more object radiations using one or more detector elements to produce a plurality of measured values, wherein measuring at least the portion of the one or more object radiations comprises forming an image of the 3D scene onto one or more camera image sensors such that at least a portion the region of the object including the location whose coordinates are to be estimated is imaged onto two or more pixels on the one or more camera image sensors;
   calculating one or more detection symbols from the plurality of measured values;
   establishing a correspondence between at least one of the one or more detection symbols and at least one of the one or more illumination symbols, wherein establishing the correspondence between at least one of the one or more detection symbols and at least one of the one or more illumination symbols comprises finding a smallest vector norm of a vector difference between the one or more detection symbols and each of the one or more illumination symbols; and
   estimating the coordinates of the location on the object based on the correspondence between the at least one of the one or more detection symbols and the at least one of the one or more illumination symbols.

2. The method of claim 1, wherein:
   the one or more detection symbols are calculated from a subset of pixels on the one or more camera image sensors; and
   finding the smallest vector norm comprises:
      calculating a cross-correlation between two or more illumination symbols from the one or more illumination symbols and the one or more detection symbols; and
      finding a peak cross correlation among the corresponding illumination symbols for each detection symbol.

3. The method of claim 2, wherein the cross-correlation is calculated using a fast Fourier transform.

4. The method of claim 1, wherein:
   the one or more detection symbols are calculated from a subset of pixels on the one or more camera image sensors;
   finding the smallest vector norm comprises:
      calculating a cross-correlation between each illumination symbol from the one or more illumination symbols and the one or more detection symbols, and
      finding a peak cross-correlation among the one or more detection symbols for each illumination symbol from the one or more illumination symbols; and
   establishing the correspondence between at least one of the one or more detection symbols and at least one of the one or more illumination symbols is based on the peak cross correlation.

5. The method of claim 1, wherein estimating the coordinates of the location on the object comprises:
   selecting one or more subsets of elements within the one or more detected symbols;
   establishing a second correspondence between each subset of elements within the one or more detection symbols and a subset of elements within the one or more illumination symbols; and
   estimating the coordinates of the location on the object for each subset based on the second correspondence.

6. The method of claim 1, wherein:
   the one or more detection symbols are calculated from a contiguous set of pixels on the one or more camera image sensors; and
   finding the smallest vector norm comprises:
      calculating a cross-correlation between each illumination symbol from the one or more illuminations symbols and the one or more detection symbols;
      finding a peak cross-correlation among the one or more detection symbols;
      calculating, using the peak cross-correlation, a second detected symbol from a subset of the one or more detectors elements used to calculate the second detection symbol; and
      finding a smallest vector norm of the vector difference between the second detection symbol and a second set of illumination symbols from the one or more illumination symbols.

7. The method of claim 1, wherein:
   the one or more detection symbols are calculated from a subset of pixels on the one or more camera image sensors; and
   finding the smallest vector norm comprises:
      calculating a cross-correlation between a single illumination symbol from the one or more illuminations symbols and the one or more detection symbols; and
      finding a peak cross correlation among the one or more detection symbols.

8. The method of claim 1, wherein at least two radiation patterns from the one or more radiation patterns are projected sequentially, and at least two of the radiation patterns differ by a scaling factor.

9. The method of claim 1, wherein at least calculating the one or more detection symbols or calculating the one of more illumination symbols comprises at least removing a common offset, removing a common scale factor, or applying a remapping function.

10. A method for estimating coordinates of a location on an object in a 3D scene, the method comprising:
producing one or more radiation patterns varying along at least two directions, wherein the one or more radiations patterns repeat along at least one direction from the at least two directions;
calculating one or more illumination symbols based on the one or more radiation patterns;
illuminating a region of the object with the one or more radiation patterns, wherein the region includes a plurality of locations that includes the location whose coordinates are to be estimated and wherein each illuminated location within the region produces one or more object radiations in response to the one or more radiation patterns;
measuring at least a portion of the one or more object radiations using one or more detector elements to produce a plurality of measured values, wherein measuring at least the portion of the one or more object radiations comprises forming an image of the 3D scene onto one or more camera image sensors such that at least a portion the region of the object including the location whose coordinates are to be estimated is imaged onto two or more pixels on the one or more camera image sensors;
calculating one or more detection symbols from the plurality of measured values, wherein the one or more detection symbols are calculated from a contiguous set of pixels on the one or more camera image sensors;
establishing a correspondence between at least one of the one or more detection symbols and at least one of the one or more illumination symbols, wherein establishing the correspondence between at least one of the one or more detection symbols and at least one of the one or more illumination symbols comprises:
calculating a cross-correlation between two or more illumination symbols from the one or more illumination symbols and one or more of the detection symbols;
calculating, using the peak cross-correlation, a second detected symbol from a subset of the detectors elements used to calculate the second detection symbol; and
finding a smallest vector norm of a vector difference between the second detection symbol and a second set of illumination symbols; and
estimating the coordinates of the location on the object based on the correspondence between the at least one of the one or more detection symbols and the at least one of the one or more illumination symbols.

11. A method for estimating coordinates of a location on an object in a 3D scene, the method comprising:
producing one or more radiation patterns varying along at least two directions, wherein the one or more radiations patterns repeat along at least one direction from the at least two directions;
calculating one or more illumination symbols based on the one or more radiation patterns;
illuminating a region of the object with the one or more radiation patterns, wherein the region includes a plurality of locations that includes the location whose coordinates are to be estimated and wherein each illuminated location within the region produces one or more object radiations in response to the one or more radiation patterns;
measuring at least a portion of the one or more object radiations using one or more detector elements to produce a plurality of measured values, wherein measuring at least the portion of the one or more object radiations comprises forming an image of the 3D scene onto one or more camera image sensors such that at least a portion the region of the object including the location whose coordinates are to be estimated is imaged onto two or more pixels on the one or more camera image sensors;
calculating one or more detection symbols from the plurality of measured values;
establishing a correspondence between at least one of the one or more detection symbols and at least one of the one or more illumination symbols; and
estimating the coordinates of the location on the object based on the correspondence between the at least one of the one or more detection symbols and the at least one of the one or more illumination symbols, wherein at least two radiation patterns from the one or more radiation patterns are projected sequentially; and
further comprising:
opening a camera shutter at an end of an acquisition for one frame when a first projected radiation pattern from the at least two projected radiation patterns is active and at a beginning of an acquisition for a following frame when a second projected radiation pattern from the at least two radiation patterns is active.

12. A method for estimating coordinates of a location on an object in a 3D scene, the method comprising:
producing one or more radiation patterns varying along at least two directions, wherein the one or more radiations patterns repeat along at least one direction from the at least two directions;
calculating one or more illumination symbols based on the one or more radiation patterns;
illuminating a region of the object with the one or more radiation patterns, wherein the region includes a plurality of locations that includes the location whose coordinates are to be estimated and wherein each illuminated location within the region produces one or more object radiations in response to the one or more radiation patterns;
measuring at least a portion of the one or more object radiations using one or more detector elements to produce a plurality of measured values, wherein measuring at least the portion of the one or more object radiations comprises forming an image of the 3D scene onto one or more camera image sensors such that at least a portion the region of the object including the location whose coordinates are to be estimated is imaged onto two or more pixels on the one or more camera image sensors;
calculating one or more detection symbols from the plurality of measured values;
establishing a correspondence between at least one of the one or more detection symbols and at least one of the one or more illumination symbols; and
estimating the coordinates of the location on the object based on the correspondence between the at least one of the one or more detection symbols and the at least one of the one or more illumination symbols, wherein coordinates of multiple locations on one or more objects within the 3D scene are estimated using measured values from different groupings of pixels within the one or more camera image sensors.

13. A system for estimating coordinates of a location on an object in a 3D scene, the system comprising:

a pattern projector configured to produce one or more radiation patterns varying along at least two directions and repeating along at least one direction and configured to be oriented such that a region on the object encompassing the location whose coordinates are to be estimated is illuminated;

a detector array configured to measure at least a portion of the object radiations produced by each illuminated location within the region in response to the one or more radiation patterns to produce a plurality of measured values, wherein measuring at least the portion of the one or more object radiations comprises forming an image of the 3D scene onto one or more camera image sensors such that at least a portion the region of the object including the location whose coordinates are to be estimated is imaged onto two or more pixels on the one or more camera image sensors; and one or more processors configured to:
calculate one or more detection symbols from the plurality of measured values;
estimate a correspondence between at least one of the one or more detection symbols and at least one illumination symbol from one or more illumination symbols, wherein estimating the correspondence between at least one of the one or more detection symbols and at least one of the one or more illumination symbols comprises finding a smallest vector norm of a vector difference between the one or more detection symbols and each of the one or more illumination symbols; and
estimate the coordinates of the location on the object based on the correspondence.

14. The system of claim 13, further comprising an integrated three-dimensional sensing system configured to be embedded in a mobile electronic device, wherein the integrated three-dimensional sensing system includes one or more radiation sources, one or more modulating structures, and one or more detector elements.

15. The system of claim 14, wherein the mobile electronic device comprises at least one of a mobile telephone, a mobile computer, a portable gaming system, a photographic camera, or a video camera.

16. The system of claim 14, wherein the one or more processors configured to estimate the three-dimensional surface are further configured to remotely communicate with at least the pattern projector, the detector array, or another one of the one or more processors.

17. The system of claim 14, wherein the one or more processors are further configured to combine a plurality of the three dimensional surfaces to estimate an object model.

18. The system of claim 13, wherein at least one of the one or more processors is configured to remotely communicate with at least the pattern projector, the detector array, or another one of the one or more processors.

19. The system of claim 13, wherein the one or more processors are further configured to estimate a three-dimensional surface of the object from a plurality of location coordinate estimations.

20. The system of claim 13, wherein the pattern projector includes a hologram.

21. The system of claim 13, wherein the pattern projector includes a diffractive optical element.

22. The system of claim 13, wherein the detector array includes a color filter.

23. The system of claim 13, wherein the detector array includes an optical bandpass filter.

24. The system of claim 13, wherein:
the one or more detection symbols are calculated from a subset of pixels on the one or more camera image sensors; and
finding the smallest vector norm comprises:
calculating a cross-correlation between two or more illumination symbols from the one or more illumination symbols and the one or more detection symbols; and
finding a peak cross correlation among the corresponding illumination symbols for each detection symbol.

25. The system of claim 24, wherein the cross-correlation is calculated using a fast Fourier transform.

26. The system of claim 13, wherein:
the one or more detection symbols are calculated from a subset of pixels on the one or more camera image sensors;
finding the smallest vector norm comprises:
calculating a cross-correlation between each illumination symbol from the one or more illumination symbols and the one or more detection symbols, and
finding a peak cross-correlation among the one or more detection symbols for each illumination symbol from the one or more illumination symbols; and
establishing the correspondence between at least one of the one or more detection symbols and at least one of the one or more illumination symbols is based on the peak cross correlation.

27. The system of claim 13, wherein estimating the coordinates of the location on the object comprises:
selecting one or more subsets of elements within the one or more detected symbols;
establishing a second correspondence between each subset of elements within the one or more detection symbols and a subset of elements within the one or more illumination symbols; and
estimating the coordinates of the location on the object for each subset based on the second correspondence.

28. The system of claim 13, wherein:
the one or more detection symbols are calculated from a contiguous set of pixels on the one or more camera image sensors; and
finding the smallest vector norm comprises:
calculating a cross-correlation between each illumination symbol from the one or more illuminations symbols and the one or more detection symbols;
finding a peak cross-correlation among the one or more detection symbols;
calculating, using the peak cross-correlation, a second detected symbol from a subset of the one or more detectors elements used to calculate the second detection symbol; and
finding a smallest vector norm of the vector difference between the second detection symbol and a second set of illumination symbols from the one or more illumination symbols.

29. The system of claim 13, wherein:
the one or more detection symbols are calculated from a subset of pixels on the one or more camera image sensors; and
finding the smallest vector norm comprises:
calculating a cross-correlation between a single illumination symbol from the one or more illuminations symbols and the one or more detection symbols; and
finding a peak cross correlation among the one or more detection symbols.

30. A system for estimating coordinates of a location on an object in a 3D scene, the system comprising:
- a pattern projector configured to produce one or more radiation patterns varying along at least two directions and repeating along at least one direction and configured to be oriented such that a region on the object encompassing the location whose coordinates are to be estimated is illuminated, wherein at least two radiation patterns from the one or more radiation patterns are projected sequentially;
- a detector array configured to measure at least a portion of the object radiations produced by each illuminated location within the region in response to the one or more radiation patterns to produce a plurality of measured values, wherein measuring at least the portion of the one or more object radiations comprises opening a camera shutter at an end of an acquisition for one frame when a first projected radiation pattern from the at least two projected radiation patterns is active and at a beginning of an acquisition for a following frame when a second projected radiation pattern from the at least two radiation patterns is active and forming an image of the 3D scene onto one or more camera image sensors such that at least a portion the region of the object including the location whose coordinates are to be estimated is imaged onto two or more pixels on the one or more camera image sensors; and
- one or more processors configured to:
  - calculate one or more detection symbols from the plurality of measured values;
  - estimate a correspondence between at least one of the one or more detection symbols and at least one illumination symbol from one or more illumination symbols; and
  - estimate the coordinates of the location on the object based on the correspondence.

* * * * *

UNITED STATES PATENT AND TRADEMARK OFFICE
CERTIFICATE OF CORRECTION

PATENT NO. : 9,696,137 B2
APPLICATION NO. : 14/455039
DATED : July 4, 2017
INVENTOR(S) : Braker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 311 days.

Signed and Sealed this
Twenty-fifth Day of September, 2018

Andrei Iancu
*Director of the United States Patent and Trademark Office*